United States Patent

Togawa

(12) United States Patent
(10) Patent No.: US 6,446,067 B2
(45) Date of Patent: *Sep. 3, 2002

(54) INFORMATION PROCESSING UNIT, INFORMATION PROCESSING SYSTEM, METHOD OF CORRECTING ABNORMALITY OF CHRISTIAN CALENDAR YEAR IN INFORMATION PROCESSING UNIT, AND COMPUTER READABLE RECORD MEDIUM HAVING CHRISTIAN CALENDAR YEAR ABNORMALITY CORRECTION PROGRAM RECORDED THEREIN

(75) Inventor: Yoshifusa Togawa, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/047,364

(22) Filed: Mar. 25, 1998

(30) Foreign Application Priority Data

Oct. 1, 1997 (JP) ............................................. 9-268959

(51) Int. Cl.[7] ............................................. G06F 17/30
(52) U.S. Cl. ................................................ 707/6; 707/102
(58) Field of Search ...................................... 707/6, 102

(56) References Cited

U.S. PATENT DOCUMENTS

| 5,600,836 A | * | 2/1997 | Alter | 707/101 |
| 5,630,118 A | * | 5/1997 | Shaughnessy | 707/1 |
| 5,644,762 A | * | 7/1997 | Soeder | 707/6 |
| 5,668,989 A | * | 9/1997 | Mao | 707/101 |
| 5,740,442 A | * | 4/1998 | Cox et al. | 395/704 |
| 5,758,336 A | * | 5/1998 | Brady | 707/6 |
| 5,758,346 A | * | 5/1998 | Baird | 707/101 |
| 5,761,668 A | * | 6/1998 | Adamchick | 707/101 |
| 5,765,145 A | * | 6/1998 | Masiello | 707/1 |
| 5,978,809 A | * | 11/1999 | Bemer | 707/101 |

FOREIGN PATENT DOCUMENTS

| JP | 2-294714 | 12/1990 |
| JP | 4-240590 | 8/1992 |
| JP | 6-103133 | 4/1994 |
| JP | 8-6925 | 1/1996 |

* cited by examiner

Primary Examiner—Wayne Amsbury
(74) Attorney, Agent, or Firm—Staas & Halsey LLP

(57) ABSTRACT

An information processing unit is provided which executes various information processing by using Christian calendar year/date information and comprises a memory part, an application processing part for performing processing by using lower-two-digit Christian calendar year information, and a file access control part for writing/reading file format data to/from the memory part in response to a request from the application processing part. The file access control part includes a judgment part which upon a receipt of a request to read Christian calendar year information within a file from the application processing part, judges whether the Christian calendar year information indicates a predetermined Christian calendar year onward, and a read Christian calendar year information output part which when it is judged that the Christian calendar year information indicates a predetermined Christian calendar year onward, generates Christian calendar year information having identification information indicative of that fact, to output it as read Christian calendar year information. Thus, a distinction between the year 1900 and the year 2000 is effected through only the lower-two-digit management of Christian calendar year information by software and hardware.

14 Claims, 31 Drawing Sheets

FIG. 15

| | |
|---|---|
| 1111 0000 | YEAR: 2000 |
| 1111 1001 | YEAR: 2009 |
| 1100 0000 | YEAR: 2030 |
| 1001 0000 | YEAR: 2060 |

| | |
|---|---|
| 1110 0000 | YEAR: 2010 |
| 1110 1001 | YEAR: 2019 |
| 1011 0000 | YEAR: 2040 |
| 1000 1001 | YEAR: 2069 |

| | |
|---|---|
| 1101 0000 | YEAR: 2020 |
| 1101 1001 | YEAR: 2029 |
| 1010 0000 | YEAR: 2050 |

FIG. 20

| MACHINE NO. | YEAR 2000 PROBLEM CORRECTION INF. | LEAP YEAR PROBLEM CORRECTION INF. | DATE CORRECTION WANTED/ UNWANTED INF. | DATE CORRECTION INF. | TIME CORRECTION WANTED/ UNWANTED INF. | TIME CORRECTION INF. |
|---|---|---|---|---|---|---|
| | | | | | | |
| | | | | | | |
| | | | | | | |

31a-1, 31a-2, 31a-3, 31a-4, 31a-5, 31a-6

31a

US 6,446,067 B2

INFORMATION PROCESSING UNIT, INFORMATION PROCESSING SYSTEM, METHOD OF CORRECTING ABNORMALITY OF CHRISTIAN CALENDAR YEAR IN INFORMATION PROCESSING UNIT, AND COMPUTER READABLE RECORD MEDIUM HAVING CHRISTIAN CALENDAR YEAR ABNORMALITY CORRECTION PROGRAM RECORDED THEREIN

BACKGROUND OF THE INVENTION (1) Field of the Invention

The present invention relates to an information processing unit and information processing system, suitable for use in various information processing using Christian calendar year/date information, a method of correcting abnormality of Christian calendar year in the information processing unit, and a computer readable record medium in which is recorded a Christian calendar year abnormality correction program.

(2) Description of the Related Art

Up to now, information processing units have held date information and Christian calendar year information for use in information processing, although the Christian calendar year information has been often managed merely in lower two digits in such an information processing system that manages collectively file data usable and shared by a plurality of information processing units.

This aims to reduce information redundancy through management of the lower two digits only, since upper two digits of the Christian calendar year information will not change until the year 2000 arrives.

In other words, the above information processing unit or information processing system makes use of lower-two-digit Christian calendar year information to retain data in a file or to execute application processing, thereby achieving an effective resource utilization in both hardware and software.

According as the Christian calendar year approaches the year 2000, however, it has proved to be impossible to judge a difference between the year 1900 and the year 2000 from the above-described two-digit Christian calendar year management, so that any measures are desired which allow for both hardware and software of the information processing system.

In case of hardware specifications allowing automatic count of lower-two-digit only Christian calendar year information by a real time clock, it is possible for the unit with a CMOS (a buffer which saves data even in the event of the electrical source being cut off) in which "19" has been set fixedly as upper two digits to have accurate Christian calendar year information as long as the year 2000 is not reached, but impossible to distinguish between the year 2000 and the year 1900 since the intra-unit Christian calendar year information returns to the year 1900 once the Christian calendar year has reached the year 2000.

Thus, year 2005 information for instance will undesirably be registered as year 1905 information. In this case, any attempt to retrieve information indicative of the year 2005 may result in vain. Also, in case of deleting files having as their keys Christian calendar year comparison or Christian calendar year information through application processing, files undesired to delete may be deleted or files to be deleted may not be deleted because of the use of lower two digits only or erroneous Christian calendar year information as their keys.

In other words, it would be difficult for the user to discriminate from the data itself whether the Christian calendar year information is erroneous or not, so that files using Christian calendar year information as their keys may disappear or files desired to retrieve may not be retrieved the instant that the year 2000 has been reached in spite of ordinary use posing no problem.

In addition, in cases where software is employed to assist the hardware specifications, it would actually be difficult to deal with all the models. There are even cases where erroneous assist would occur.

In order to solve the above problems, at present an alarm may be issued or the software may be amended. However, in amending the software, there may also be a situation where it is actually necessary to completely revise the software installed in the hardware constituting the computer system.

In such an information processing system that includes a server unit accommodating a plurality of client units, with the continued advancement of the information processing system networking, the data management technique is shifting from one in which data are collectively managed at a single site (on the server unit side) toward one in which data are managed in each client unit in a decentralized manner. If each of the client units is located at the sites having different standard times, it is also necessary to adjust accordingly the time generated by a real time clock (RTC) of each client unit.

SUMMARY OF THE INVENTION

The present invention was conceived in view of the above problems. It is therefore an object of the present invention to provide an information processing unit capable of distinguishing between the year 1900 and the year 2000 even through software and hardware-based Christian calendar year information management in lower two digits, not four digits, a method of correcting abnormal Christian calendar year in the information processing unit, and a computer readable record medium having a Christian calendar year abnormality correction program recorded therein.

Another object of the present invention is to provide an information processing system consisting of a plurality of information processing units arranged at sites having different reference times, the system enabling the time management to be universally performed in conformity with the reference times at sites where the information processing units are arranged, while distinguishing between the year 1900 and the year 2000 in the same manner as the above case.

To this end, according to a first aspect of the present invention there is provided an information processing unit comprising a memory part for storing in a file format therein information processing data containing Christian calendar year information having first number of digits; an application processing part for executing application processing by use of Christian calendar year information having second number of digits, of the Christian calendar year information having first number of digits contained in the data stored in the memory part; and a file access control part for writing/reading file format data to/from the memory part in response to a request from the application processing part; the file access control part including a judgment part which upon a receipt of a request to read Christian calendar year information within a file stored in the memory part from the application processing unit, judges whether the Christian calendar year information in the memory part indicates a predetermined Christian calendar year onward; and a read Christian calendar year information output part which when it is judged in the judgment part that the Christian calendar year information indicates the predetermined Christian calendar year onward, generates Christian calendar year information having identification information indicative of that fact, to output it as read Christian calendar year information.

In this case, the predetermined Christian calendar year can be the year 2000. The Christian calendar year information having first number of digits may be four-digit Christian calendar year information, and the Christian calendar year information having second number of digits may be Christian calendar year information having second number of digits of said four-digit Christian calendar year information.

A restoration processing part may be provided which when the identification information is contained in Christian calendar year information constituting file format data in the memory part read by the application processing part, restores said Christian calendar year information into Christian calendar year information having first number of digits through interrupt processing, whereby it is possible even in the event of only lower-two-digit management of Christian calendar year information to distinguish between the year 1900 and a predetermined Christian calendar year.

The read Christian calendar year information output part may include a first read processing part for imparting the identification information to Christian calendar year information having second number of digits, of Christian calendar year information having first number of digits within a file subjected to the read request, to output it as the read Christian calendar year information; and a first storage processing part for correlating at least upper-two-digit Christian calendar year information constituting the Christian calendar year information with file format data subjected to the read request, to store into a predetermined storage area.

Furthermore, the read Christian calendar year information output part may include a first conversion part for converting upper-two-digit Christian calendar year information of Christian calendar year information having first number of digits within a file subjected to the read request, into information containing the identification information; a second read processing part for outputting Christian calendar year information converted by the first conversion part, as Christian calendar year information constituting file format data subjected to the read request, to the application processing part; and a second storage processing part for correlating Christian calendar year information having at least second number of digits, with Christian calendar year information subjected to the read request, to store it into a predetermined storage area.

Alternatively, the read Christian calendar year information output unit may include a second conversion part for converting Christian calendar year information having first number of digits within a file subjected to the read request, into two-digit information containing the identification information; and a third read processing part for outputting Christian calendar year information converted by the second conversion part, as Christian calendar year information constituting file format data subjected to the read request, to the application processing part.

Thus, according to the present invention, by virtue of the provision of the file access control part and the restoration processing part, when the Christian calendar year information within a file or imparted to the file is managed in four digit and the Christian calendar year information for application processing is processed in two digits, it is possible for the application processing part to distinguish between the year 2000 and the year 1900 while performing the application processing using lower-two-digit Christian calendar year information, thus advantageously making it possible to use intactly lower-two-digit data in the application software which has been hitherto used, without any alteration, even after the year 2000 has arrived.

According to a second aspect of the present invention, there is provided an information processing unit comprising a Christian calendar year information generation part for generating most recent Christian calendar year information; a memory part for storing in a file format therein data containing two-digit Christian calendar year information from the Christian calendar year information generation part; an application processing part for executing application processing by use of Christian calendar year information having first number of digits, together with the data stored in the memory part; and a file access control part for writing/reading file format data to/from the memory part in response to a request from the application processing unit; the file access control part including a judgment part which upon a receipt of a request to write Christian calendar year information having first number of digits generated by the Christian calendar year information generation part from the application processing part, judges whether the Christian calendar year information having first number of digits indicates a predetermined Christian calendar year onward; and a write Christian calendar year information output part which when it is judged in the judgment part that the Christian calendar year information having first number of digits indicates a predetermined Christian calendar year onward, generates Christian calendar year information having identification information indicative of that fact, to output it as write Christian calendar year information.

In this case, the predetermined Christian calendar year can be the year 2000. The Christian calendar year information having first number of digits may be four-digit Christian calendar year information, and the Christian calendar year information having second number of digits may be Christian calendar year information having second number of digits of said four-digit Christian calendar year information.

A restoration processing part may be provided which when the identification information is contained in Christian calendar year information constituting file format data in the memory part read by the application processing part, restores said Christian calendar year information into Christian calendar year information having first number of digits through interrupt processing, whereby it is possible even in the event of only lower-two-digit management of Christian calendar year information to distinguish between the year 1900 and a predetermined Christian calendar year.

Thus, according to the present invention, by virtue of the provision of the file access control part and the restoration processing part, when the Christian calendar year information within a file or imparted to the file is managed in four digit and the Christian calendar year information for application processing is processed in two digits, it is possible for the application processing part to distinguish between the year 2000 and the year 1900 while performing the application processing using lower-two-digit Christian calendar year information, thus advantageously making it possible to use intactly lower-two-digit data in the application software which has been hitherto used, without any alteration, even after the year 2000 has arrived.

In this case, the write Christian calendar year information output part may include a first write processing part for imparting the identification information to Christian calendar year information having second number of digits, of the Christian calendar year information having first number of digits, to output it as the write Christian calendar year information; and a third storage processing part for correlating at least upper-two-digit Christian calendar year information constituting the Christian calendar year information with file format data subjected to the write request, to store it into a predetermined storage area.

The write Christian calendar year information output part may also include a third conversion part for converting upper-two-digit Christian calendar year information of the Christian calendar year information having first number of digits into information containing the identification information; a second write processing part for writing Christian calendar year information converted by the third conversion part to the memory; and a fourth storage processing part for correlating Christian calendar year information having at least second number of digits constituting the Christian calendar year information with Christian calendar year information subjected to the write request, to store it into a predetermined storage area.

Furthermore, the write Christian calendar year information output part may include a fourth conversion part for converting the Christian calendar year information into two-digit Christian calendar year information containing the identification information; and a third write processing part for writing Christian calendar year information converted by the fourth conversion part to the memory part.

Thus, according to the present invention, by virtue of the provision of the file access control part and the restoration processing part, when Christian calendar year information within a file or imparted to the file is managed in two digits and Christian calendar year information for application processing is processed in four digits, it is possible for the application processing part to process lower-two-digit Christian calendar year information written to the file while distinguishing between the year 2000 and the year 1900, thereby advantageously making it possible to use intactly the application software which has been hitherto used, without any alteration, even after the year 2000 has been reached.

In the information processing unit of the present invention described above, the Christian calendar year information generating unit may generate date information in addition to the Christian calendar year information, and a supervisory correction part may be provided for fetching Christian calendar year/date information as reference time and supervising on the basis of the reference time abnormality in Christian calendar year/date information generated by the Christian calendar year information generation part to automatically correct it, if any.

In this case, the supervisory correction part may fetch reference time for each country and supervise on the basis of the reference time for each country, abnormality in the Christian calendar year/date information generated by the Christian calendar year information generation part, to automatically correct it if any. The supervisory correction part may lie on a network.

Thus, according to the present invention, it is possible for the reference time posting unit to supervise Christian calendar year/date information generated by Christian calendar year/date information generating part of an information processing unit, to post for correction the client unit on periodic abnormality in Christian calendar year/date information which is expected to occur in advance, thereby making it possible to deal with not only the so-called year 2000 problem and the leap problem but also with the correction for summer time or winter time on country-to-country or state-to-state basis, without becoming conscious of the unit hardware specifications, software versions, etc., as well as ensuring, even when the user uses an information processing unit while moving frequently between sites having different standard time, an easy time control in conformity with the standard time at that site (in respective countries).

According to a third aspect of the present invention, there is provided an information processing unit having a Christian calendar year/date information generation part for generating most recent Christian calendar year/date information on the basis of an internal clock, and a processing part for accessing the Christian calendar year/date information generation part to fetch current Christian calendar year/date information for desired information processing; the information processing unit comprising a standard time generating unit for generating standard time; a comparison circuit which when in the processing part there occurs an access to the Christian calendar year information generation part, compares standard time fetched form the standard time generating unit with Christian calendar year/date information generated by the Christian calendar year/date information generation part; and a gate circuit which on the basis of the result of comparison by the comparison circuit, sets the result of access of the processing part to the Christian calendar year/date information generation part, to post the processing unit.

Thus, according to the present invention, provision of the comparison circuit and correction circuit makes it possible when the processing unit gains access to the Christian calendar year/date information generating unit to provide as access result the time information corrected to have accurate time based on the standard time while apparently using the Christian calendar year/date information generating unit, so that a system accurately conscious of Christian calendar year, date and time can be operated through the automatic correction in case of occurrence of abnormality in the Christian calendar year/date information generated by the Christian calendar year/date information generating unit. In particular, this will contribute to execution of data processing and data compensation by making use of accurate time, and further to prevention of any breakage of a file attributable to time.

According to a fourth aspect of the present invention, there is provided an information processing system comprising a plurality of information processing units each having a memory part for storing in a file format therein data containing Christian calendar year/date information, an application processing part for executing application processing by use of file format data stored in the memory part, a Christian calendar year/date information generation part for generating most recent Christian calendar year/date information, and a file access control part which in response to a request from the application processing part, writes to the memory part file format data containing Christian calendar year/date information from the Christian calendar year/date information generation part, and which reads from the memory part file format data containing Christian calendar year/date information; and a reference time posting unit which fetches Christian calendar year/date information as reference time, and which on the basis of the Christian calendar year/date information as the reference time, generates information for supervising abnormality in Christian calendar year/date information generated by the Christian calendar year/date information generation part of the each information processing unit and for automatic correction to post each information processing unit; the file access control part of each of the information processing units including a judgment part which upon a receipt of a request to read Christian calendar year/date information within a file stored in the memory part from the application processing unit, judges whether the Christian calendar year/date information in the memory part indicates a predetermined Christian calendar year onward; and a Christian calendar year/date information generating part which when it is judged in the judgment part that the Christian calendar year/date information indicates the predetermined Christian calendar year onward, generates Christian calendar year/date information having identification information indicative of that fact, to output it as read Christian calendar year/date information; and each of the information processing units including a restoration processing part which when the identification information is contained in Christian calendar year/date information constituting file format data in the memory part read by the application processing part, restores the Christian calendar year/date information into four-digit Christian calendar year/date information through interrupt processing. The predetermined Christian calendar year can be the year 2000.

In this case, the reference time on which the reference time posting unit posts each information processing unit may correspond to reference time of a country where each information processing unit is located.

Furthermore, the reference time posting unit may include an abnormality occurrence timing storage part in which is previously stored timing information at which abnormality occurs in Christian calendar year/date information generated by the Christian calendar year/date information generation part of each of the information processing units, so that abnormality in Christian calendar year/date information generated by the Christian calendar year/date information generation part can be supervised and automatically corrected on the timing information stored in the abnormality occurrence timing storage part.

Thus, according to the present invention, it is possible for the reference time posting unit to supervise Christian calendar year/date information generated by Christian calendar year/date information generating part of an information processing unit, to post for correction the client unit on periodic abnormality in Christian calendar year/date information which is expected to occur in advance, thereby making it possible to deal with not only the so-called year 2000 problem and the leap problem but also with the correction for summer time or winter time on country-to-country or state-to-state basis, without becoming conscious of the unit hardware specifications, software versions, etc., as well as ensuring, even when the user uses an information processing unit while moving frequently between sites having different standard time, an easy time control in conformity with the standard time at that site (in respective countries).

According to a fifth aspect of the present invention, there is provided a method of correcting abnormality of Christian calendar year information in an information processing unit, upon execution of application processing by use of Christian calendar year information together with data constituting a file stored in a memory in the information processing unit, in order to correct abnormality of Christian calendar year information recognized through the application processing and of Christian calendar year information stored in the memory, the method comprising a judgment step for judging, upon a receipt of a request to read Christian calendar year information within a file stored in the memory from the application processing, whether the Christian calendar year information indicates a predetermined Christian calendar year onward in the memory; a read Christian calendar year information output step for generating, when it is judged in the judgment step that the Christian calendar year information indicates a predetermined Christian calendar year onward, Christian calendar year information having identification information indicative of that fact, to output it as read Christian calendar year information; and a restoration step for restoring, when there occurs an interrupt due to the identification information in the application processing, Christian calendar year information having the identification information into original four-digit Christian calendar year information, to correct abnormality of Christian calendar year information for return to the application processing.

In this case also, the above predetermined Christian calendar year can be the year 2000.

Thus, according to the present invention, in cases where Christian calendar year information within a file or imparted to the file is managed in four digits and Christian calendar year information for application processing is processed in two digits, it is possible for the application processing part to distinguish between the year 2000 and the year 1900 while performing the application processing using lower-two-digit Christian calendar year information, thus advantageously making it possible to use intactly lower-two-digit data in the application software which has been hitherto used, without any alteration, even after the year 2000 has been reached.

Alternatively, in cases where when the Christian calendar year information within a file or imparted to the file is managed in two digits and the Christian calendar year information for the application processing is processed in four digits, it is possible for the application processing part to process lower-two-digit Christian calendar year information written to the file while distinguishing between the year 2000 and the year 1900, thereby making it possible to use application software which has hitherto been used as it is without any alteration even after the year 2000 has been reached.

Furthermore, it is possible to supervise Christian calendar year/date information generated by Christian calendar year/date information generating part of an information processing unit, to post for correction the client unit on periodic abnormality in Christian calendar year/date information which is expected to occur in advance, thereby making it possible to deal with not only the so-called year 2000 problem and the leap problem but also with the correction for summer time or winter time on country-to-country or state-to-state basis, without becoming conscious of the unit hardware specifications, software versions, etc., as well as ensuring, even when the user uses an information processing unit while moving frequently between sites having different standard time, an easy time control in conformity with the standard time at that site (in respective countries).

According to a sixth aspect of the present invention, there is provided a computer readable record medium having a Christian calendar year abnormality correction program recorded therein, wherein recorded in a computer is a Christian calendar year abnormality correction program for implementing a judgment function for judging, upon a receipt of a request to read Christian calendar year information within a file stored in a memory from an application processing function, whether the Christian calendar year information indicates a predetermined Christian calendar year onward in the memory; a read Christian calendar year information output function for generating, when it is judged in the judgment function that the Christian calendar year information indicates a predetermined Christian calendar year onward, Christian calendar year information having identification information indicative of that fact, to output it as read Christian calendar year information; and a restoration function for restoring, when there occurs an interrupt due to the identification information by the application processing function, Christian calendar year information having the identification information into original four-digit Christian calendar year information, to return it to the application processing function.

Thus, according to the present invention, the computer is allowed to implement the judgment function, read Christian calendar year information output function, and restoration function, so that in cases where Christian calendar year information within a file or imparted to the file is managed in four digits and Christian calendar year information for application processing is processed in two digits, it is possible for the application processing part to distinguish between the year 2000 and the year 1900 while performing the application processing using lower-two-digit Christian calendar year information, thus advantageously making it possible to use intactly lower-two-digit data in the application software which has been hitherto used, without any alteration, even after the year 2000 has been reached.

Alternatively, in cases where when the Christian calendar year information within a file or imparted to the file is managed in two digits and the Christian calendar year information for the application processing is processed in four digits, it is possible for the application processing part to process lower-two-digit Christian calendar year information written to the file while distinguishing between the year 2000 and the year 1900, thereby making it possible to use application software which has hitherto been used as it is without any alteration even after the year 2000 has arrived.

BRIEF DESCRIPTION OF THE DRAWINGS

The above and other objects, aspects, features and advantages of the present invention will become more apparent from the following description with reference to the accompanying drawings, in which:

FIG. 15 is a diagram showing a conversion example in which four-digit Christian calendar year information is converted into two-digit information containing interrupt occurrence factor information, in the third embodiment of the present invention;

FIG. 20 is a diagram showing an RTC correction information storage part in the fourth embodiment of the present invention;

DESCRIPTION OF THE PREFERRED EMBODIMENTS

Embodiments of the present invention will now be described with reference to the accompanying drawings.

(a) Description of First Embodiment

Figure 2:
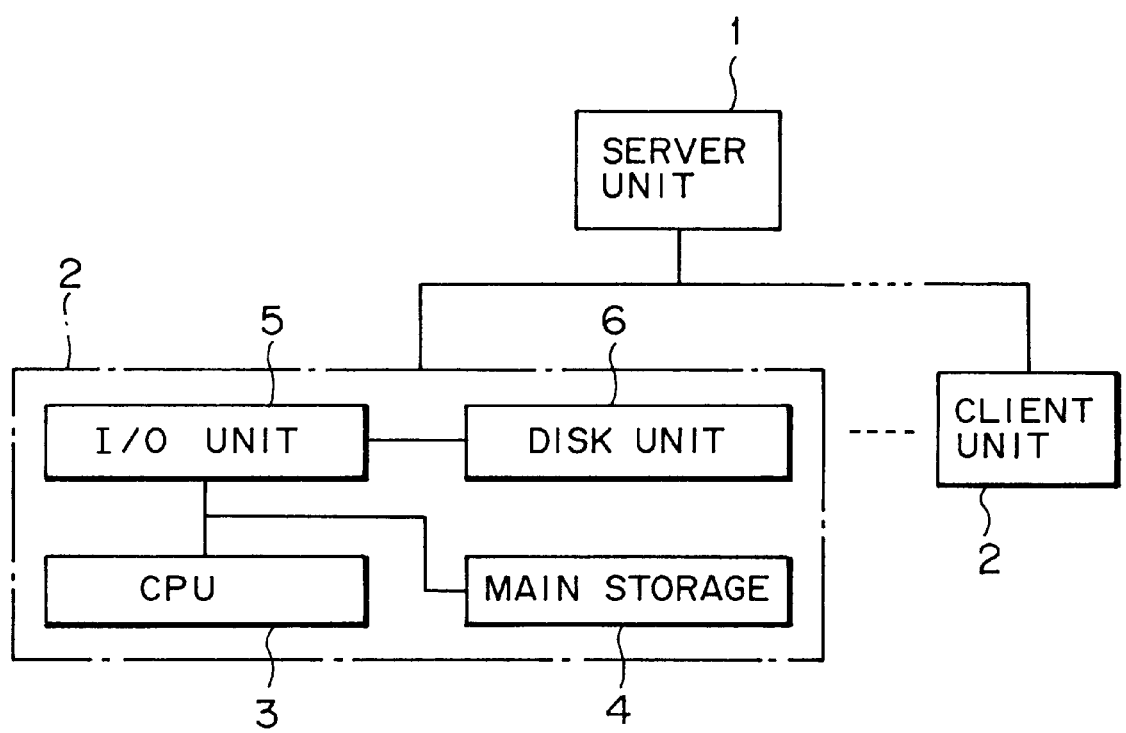
FIG. 2 is a block diagram showing an information processing system to which is applied the information processing unit in accordance with the first embodiment of the present invention.

FIG. 2 is a block diagram showing an information processing system to which is applied an information processor in accordance with a first embodiment of the present invention. To act as a client server system, the information processing system shown in FIG. 2 comprises a server unit 1 and a plurality of client units 2 accommodated in the server unit 1.

The client units 2 each include as the hardware a CPU (Central Processing Unit) 3 for performing information instruction control, arithmetic processing, etc., a main storage 4 for storing therein data, program information, etc., for use in the CPU 3, an input-output unit 5 acting as an external interface for data, and a disk unit 6 acting as an external storage. The server unit 1 is also configured in basically the same manner as the above client units 2.

Figure 1:
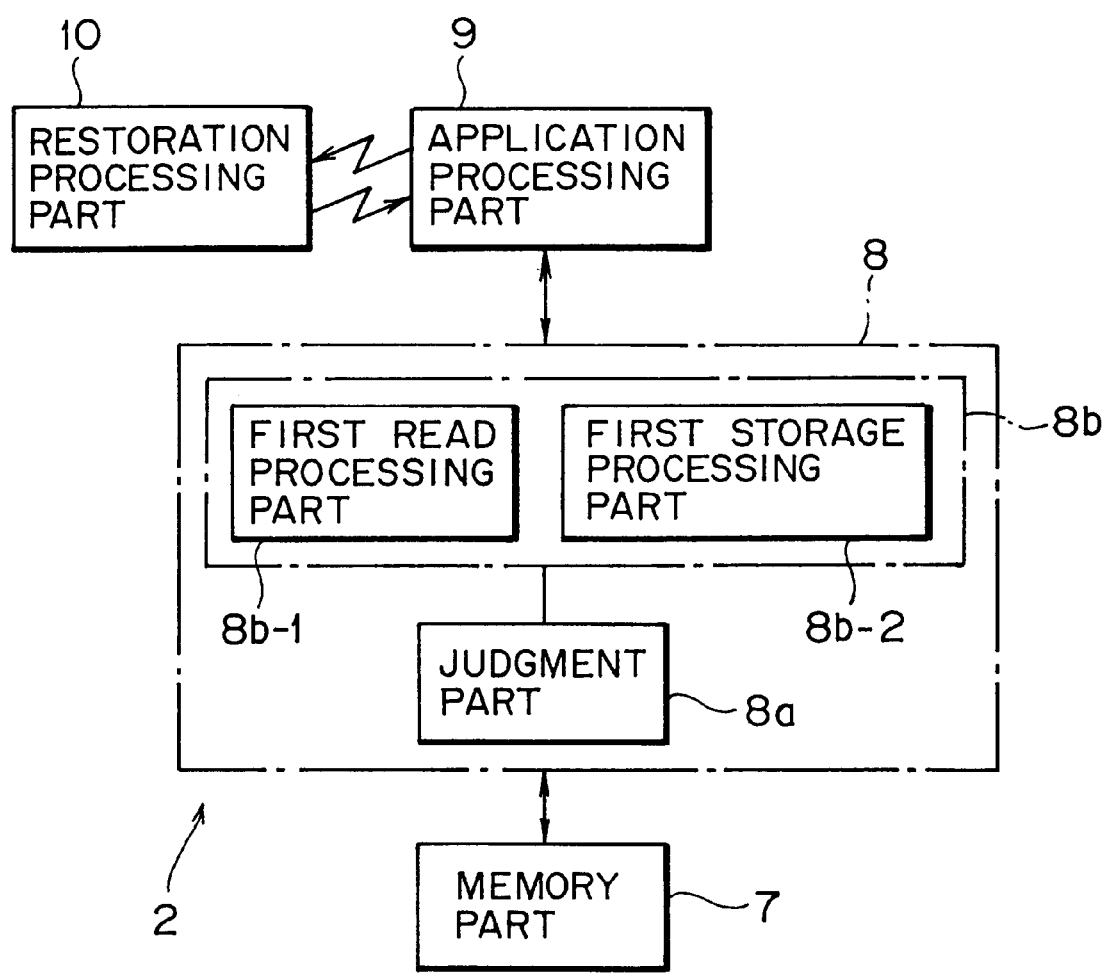
FIG. 1 is a block diagram showing a client unit serving as an information processing unit in accordance with a first embodiment of the present invention.

Each client unit 2 has a function for solving a so-called year 2000 problem:about the Christian calendar year information imparted to a file (or constituting data within the file) for use in information processing in that client unit 2, and as shown in FIG. 1 includes functionally a memory part 7, a file access control part 8, an application processing part 9 and a restoration processing part 10.

Functions of the above. file access control part 8 and the application processing part 9 are implemented by for instance executing through the CPU 3 instruction information or the like stored within the main storage 4. In particular, programs recorded on a record medium such as a disk medium (hard disk), a CD-ROM or a floppy disk may be developed into the main storage 4 and executed by the CPU 3 so that the functions of these file access control part 8 and application processing part 9 can be realized.

The memory part 7 stores file format data used for information processing within the client unit 2 and is primarily implemented by the above main storage 4 and the disk unit 6. This file contains for instance information on the Christian calendar year/date and time (four-digit Christian calendar year information, date information and time information) at the time of writing registration.

The application processing part 9 processes applications by use of file data stored in the memory part 7 and of lower-two-digit Christian calendar year information (Christian calendar year information of second number of digits) of the above-described four-digit Christian calendar year information (Christian calendar year information of first number of digits).

The file access control part 8 functions as a driver which in response to a request from the application processing part 9 writes/reads file format data in/from the memory part 7, and includes from a functional viewpoint of the present invention in particular a judgment part 8*a* and a read Christian calendar year information output part 8*b*.

When accepting from the application processing part 9 a request to read out Christian calendar year information within a file stored in the memory part 7 (for instance, a request to read out Christian calendar year/date information within a file, or a request to read out Christian calendar year/date information written in as a file registered date), the judgment part 8*a* judges whether that intra-file Christian calendar year information in the memory part 7 indicates a predetermined Christian calendar year (e.g., the year 2000) onward.

When it is judged in the judgment part 8*a* that the Christian calendar year information requested to be read indicates the year 2000 onward, the read Christian calendar year information output part 8*b* generates Christian calendar year information having interrupt occurrence factor information (information causing the occurrence of interrupt upon the processing in the application processing part 9) as identification information containing the above fact. The read Christian calendar year information output part 8*b* includes in particular a first read processing part 8*b*-1 and a first storage processing part 8*b*-2.

More specifically, when it is judged that the Christian calendar year information requested to be read by the application processing part 9 indicates the year 2000 onward, the first read processing part 8*b*-1 imparts the interrupt occurrence factor information (e.g., a flag "1" indicating that the year 2000 has been reached) to lower-two-digit Christian calendar year information of the four-digit Christian calendar year information in that file, and sends it to the application processing part 9 as the above read Christian calendar year information.

The first storage processing part 8*b*-2 correlates at least upper-two-digit (e.g., upper-two-digit) Christian calendar year information constituting the four-digit Christian calendar year information in the file, with the file format data requested to be read, and stores it in a predetermined storage area.

This first storage processing part 8*b*-2 is capable for instance of not only registering a constant "20" as the upper-two-digit Christian calendar year information on and after the year 2000, together with the flag corresponding to the interrupt occurrence factor information imparted by the first read processing part 8*b*-1, into a predetermined area on a CMOS or the like not shown, but also of registering a constant "19" as the upper-two-digit Christian calendar year information before the year 2000 into the predetermined area on the CMOS or the like not shown.

If it is judged by the judgment part 8*a* that the read requested Christian calendar year information indicates a year before the year 2000, the first read processing part 8*b*-1 described above sends the lower-two-digit Christian calendar year information of the four-digit Christian calendar year information in the file to the application processing part 9 intactly as the read Christian calendar year information.

When the application processing part 9 writes data to the memory part 7, the data, together with four-digit Christian calendar year/date/time information from an RTC (Real Time Clock) comprised of, e.g., a register in the client unit 2, are recorded in a file through a control by the file access control part 8.

If interrupt occurrence factor information is contained in Christian calendar year information read through the application processing by the application processing part 9 and constituting file format data in the memory 7, the restoration processing part 10 restores it to four-digit Christian calendar year information through interrupt processing.

More specifically, if when comparison of Christian calendar year information is for instance made through the processing within the application processing part 9, Christian calendar year information within a read file contains interrupt occurrence factor information imparted by the first read processing part 8*b*-1 described above, the restoration processing part 10 executes interrupt processing through which it is restored to four-digit Christian calendar year information. That is, the application processing part 9 distinguishes between the 1900s and the 2000s even when it manages only the lower-two-digit Christian calendar year information.

Figure 3:
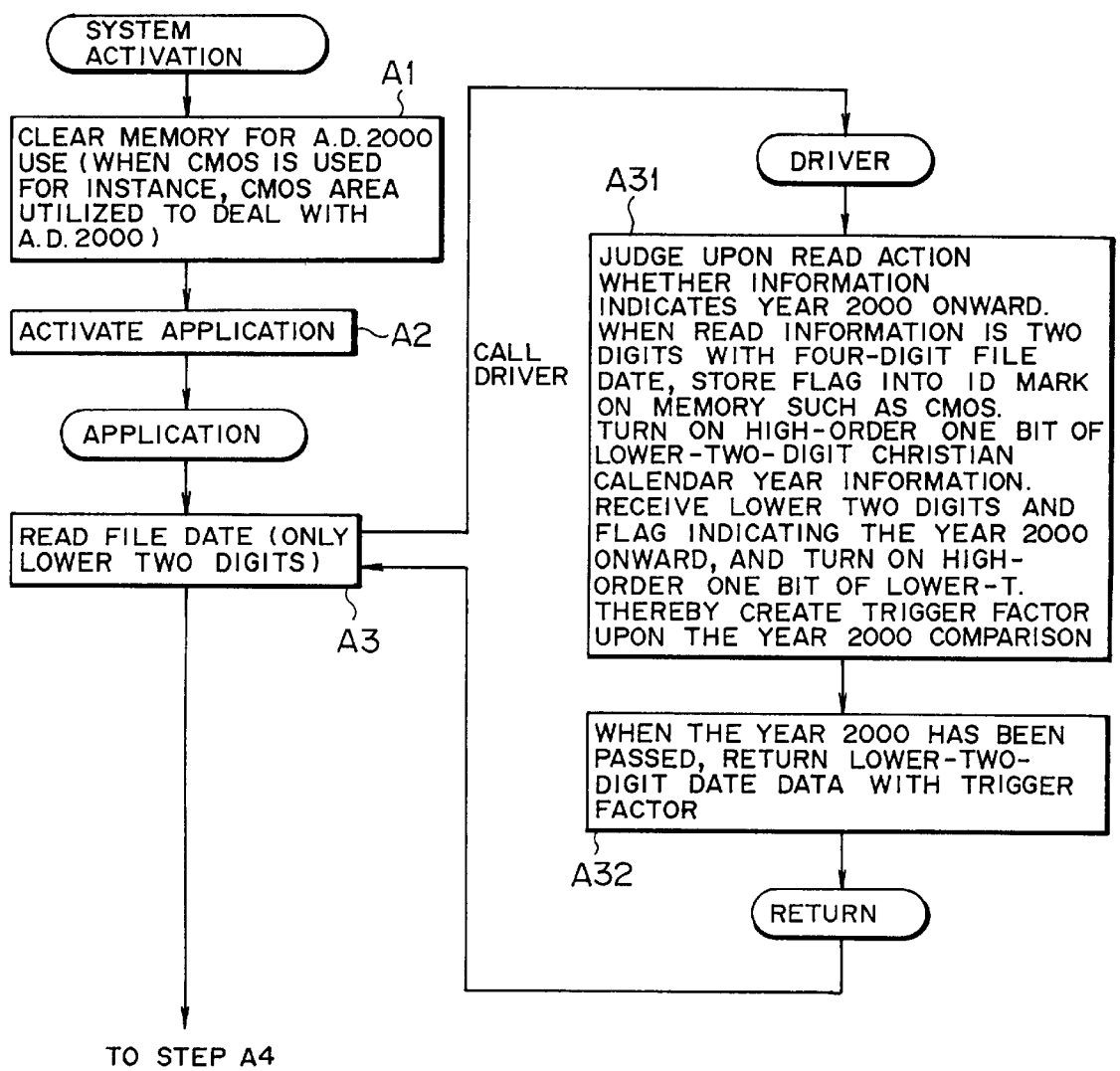
FIGS. 3 and 4 are flowcharts for explaining the operation of the first embodiment of the present invention.

Referring to flow charts of FIGS. 3 and 4, description will be made hereinafter of operation of the first embodiment of the present invention having the above configuration.

When the client server system in accordance with the first embodiment is first activated, various types of programs are developed into the main storage 4 in each client unit 2 as described above, allowing a migration to a program operating state. At that time, there is cleared a predetermined area on the memory such as the CMOS which is utilized to distinguish between the 1900s and the 2000s (step A1 in FIG. 3).

In each client unit 2, a desired application is activated when the initialization is performed (step A2). This allows the application processing part 9 in each client unit 2 to be in operative condition.

When there occurs a read of Christian calendar year/date information on a file stored in the memory part 7 (a file read request to the memory part 7) in the processing by the application processing part 9 (step A3), the file access control part 8 serving as a driver becomes operative.

If as a result of read of the Christian calendar year/date information on the file stored in the memory part 7 it is judged in the judgment part 8*a* of the file access control part 8 that it indicates the year 2000 onward, the first storage processing part 8*b*-2 stores a flag (e.g., "1") indicating the above fact into the area (an identification mark) on the CMOS or the like not shown (step A31).

It is to be appreciated that as long as it is at least correlated with that file, the above flag "1" may have additional information in the same file or may have information in the other medium.

Furthermore, the first read processing part 8*b*-1 turns on high-order one bit of lower two digits constituting four-digit Christian calendar year information of the file (imparts a flag "1" indicating the year 2000 onward) and outputs it as the read Christian calendar year information together with the date information (steps A31 and A32).

If it is judged in the judgment part 8*a* that Christian calendar year information requested to be read indicates a year before the year 2000, the first read processing part 8*b*-1 reads lower-two-digit Christian calendar year information of four-digit Christian calendar year information in the file as it is and feeds the read Christian calendar year information together with date information to the application processing part 9 (Step A32).

The high-order one bit flag imparted to the read Christian calendar year information when the latter indicates the year 2000 onward serves as trigger information permitting an occurrence of interrupt upon the application processing by the application processing part 9, which will be described later.

Figure 4:
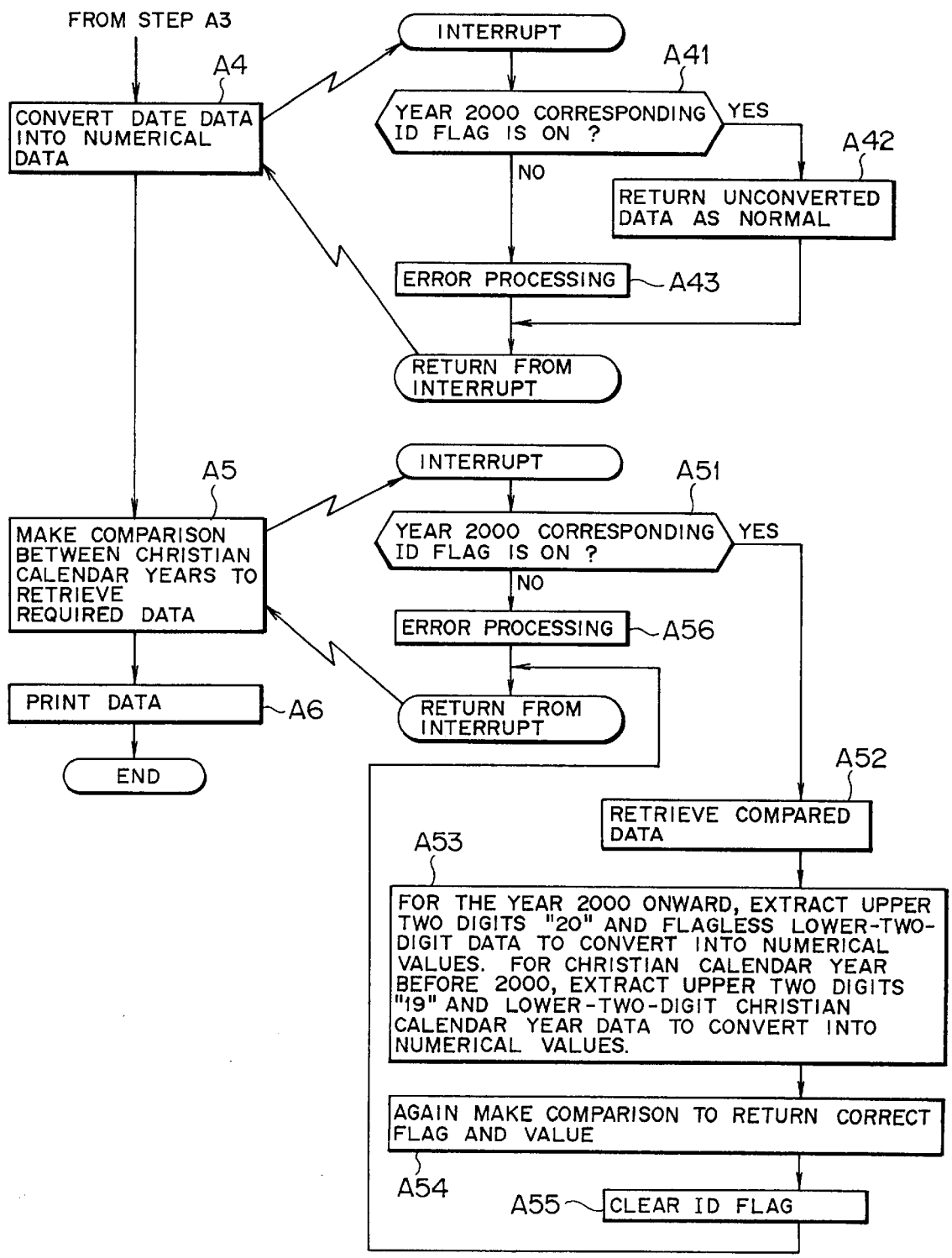

In the application processing part 9, when Christian calendar year/date information within a file is read as described above, an instruction is issued to convert the read lower-two-digit Christian calendar year information together with the date information into numerical data (step A4 in FIG. 4).

If the lower-two-digit Christian calendar year information is flagged when the Christian calendar year/date information is converted into numerical data in the above application processing part 9, there occurs an interrupt action to judge whether the flag is a flag indicating that the read file Christian calendar year information is indicative of the year 2000 onward (step A41).

If the flag imparted to the lower-two-digit Christian calendar year information indicates that the read Christian calendar year information is indicative of the year 2000 onward, then unconverted data (intact Christian calendar year information containing flag information) are returned normally to the application processing part 9, thereby allowing a return from the interrupt (from step A41 via YES route to step A42), whereas if the flag imparted to the lower-two-digit Christian calendar year information does not indicate that the read Christian calendar year information is indicative of the year 2000 onward, then error processing is performed to allow a return from the interrupt processing (from step A41 via NO route to step A43).

After the conversion of the Christian calendar year/date information into numerical data, the application processing part 9 makes a comparison between plural pieces of Christian calendar year information (data), with the comparison object being Christian calendar year information obtained as the results of conversion (the flagged Christian calendar year information becomes intactly normal conversion results) (step A5).

If the Christian calendar year information to be compared therewith is flagged Christian calendar year information when the application processing part 9 performs the comparison processing of the Christian calendar year information, then procedure goes to interrupt processing executed by the restoration processing part 10.

That is, if a flag imparted to Christian calendar year information read from a file indicates that the Christian calendar year information is indicative of the year 2000 onward (from step A51 to YES route), then plural pieces of Christian calendar year information compared are retrieved (step A52) and upper-two-digit Christian calendar year information of each Christian calendar year information is extracted from the identification mark on the CMOS, to create four-digit Christian calendar year information (step A53).

More specifically, if the retrieved Christian calendar year information is provided with a flag indicative of the year 2000 onward, then the upper-two-digit Christian calendar year information "20" together with the lower-two-digit Christian calendar year information without that flag is extracted from the identification mark on the CMOS corresponding to the flag, to thereby create four-digit Christian calendar year information.

On the contrary, if the retrieved Christian calendar year information is not provided with a flag indicative of the year 2000 onward, then a constant "19" resulting in the upper-two-digit Christian calendar year information is extracted from the predetermined area on the CMOS or the like, to create four-digit Christian calendar year information.

As a result of this, the restoration processing part 10 is capable of restoring flagged read Christian calendar year information to four-digit Christian calendar year information by creating the four-digit Christian calendar year information from the above upper-two-digit and lower-two-digit Christian calendar year information.

After the restoration of compared Christian calendar year information to four-digit Christian calendar year information as set forth hereinabove, comparison is again made to return a correct value and flag and the comparison result to the application processing part 9, the identification flag is cleared and thereafter a return from the interrupt processing is carried out, allowing procedure to go back to the application processing part 9 (steps A54 and A55).

If the flag imparted to the Christian calendar year information subjected to the Christian calendar year comparison processing by the application processing part 9 does not indicate that the read Christian calendar year information is indicative of the year 2000 onward, then an interrupt occurs for error processing and thereafter a return from the interrupt processing is carried out (from step A51 via NO route to step A56).

In cases where all pieces of Christian calendar year information subjected to the Christian calendar year comparison processing by the application processing part 9 indicates years before the year 2000, read lower-two-digit Christian calendar year information can be specified to be Christian calendar year information on 1900s, thereby making it possible to perform the comparison processing without needing any additional processing.

Subsequently, the application processing part 9 prints, if necessary, results of application processing such as results of comparison of Christian calendar year information (step A6).

According to the first embodiment of the present invention in this manner, by virtue of the provision of the file access control part 8 and the restoration processing part 10, when Christian calendar year information within a file or imparted to the file is managed in four digits and Christian calendar year information for application processing is processed in two digits, it is possible for the application processing part 9 to distinguish between the year 2000 and the year 1900 while performing the application processing using lower-two-digit Christian calendar year information, thus advantageously making it possible to use intactly lower-two-digit data in the application software which has been hitherto used, without any alteration, even after the year 2000 has been reached.

(a1) Description of First Variant of First Embodiment

Described in detail for the first embodiment is a configuration for distinguishing between Christian calendar years 1900s and 2000s when the application processing part 9 reads four-digit Christian calendar year information within a file and uses it as lower-two-digit Christian calendar year information for comparison processing. On the contrary, when two-digit Christian calendar year information in a file is read from a memory part 7A and is used as four-digit Christian calendar year information for the comparison processing by an application processing part 9A, the client unit 2 is configured as an information processing unit as shown in FIG. 5, in order to make it possible to distinguish between the Christian calendar years 1900s and 2000s.

Figure 5:
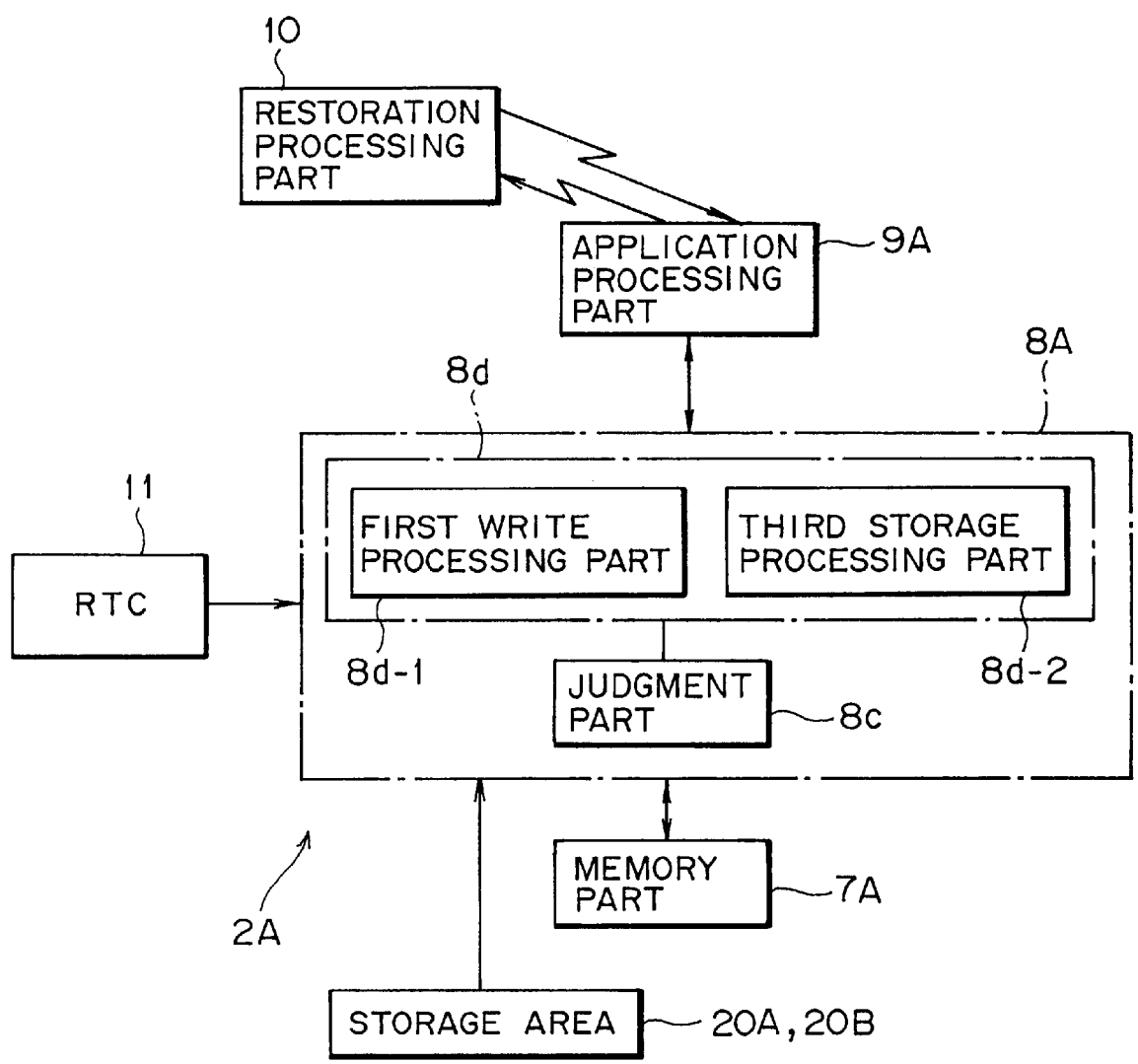
FIG. 5 is a block diagram showing a client unit in accordance with a first variant of the first embodiment of the present invention.

FIG. 5 is a block diagram showing a client unit in accordance with a first variant of the first embodiment of the present invention. The client unit 2A shown in FIG. 5 also comprises the memory part 7A, a file access control part BA and an application processing part 9A, as well as an RTC 11.

In this case, the RTC 11 generates most recent Christian calendar year information and serves as a Christian calendar year information generation part. The memory part 7A stores file format data but differs from that (see reference numeral 7) in the first embodiment in that when data are written in file format to the memory part 7A, the latter stores including only two-digit Christian calendar year information from the RTC 11.

The application processing part 9A performs application processing using four-digit Christian calendar year information together with the above data stored in the memory part 7A.

The file access control part 8A writes/reads file format data to/from the memory part 7A in response to a request from the application processing part 9A, and includes a judgment part 8c and a write Christian calendar year information output part 8d.

In response to a request to write four-digit Christian calendar year information generated by the RTC 11 from the application processing part 9A (a request to write a file to the memory part 7A), the judgment part 8c judges whether that four-digit Christian calendar year information indicates the year 2000 onward.

The write Christian calendar year information output part 8d, when it is judged in the judgment part 8c that this four-digit Christian calendar year information indicates the year 2000 onward, generates Christian calendar year information having interrupt occurrence factor information for the output as write Christian calendar year information, and includes a first write processing part 8d-1 and a third storage processing part 8d-2.

The first write processing part 8d-1 imparts a flag (e.g., "1") as the interrupt occurrence factor information like the first embodiment to lower two-digit Christian calendar year information of this four-digit Christian calendar year information and outputs it as the above write Christian calendar year information.

The third storage processing part 8d-2 correlates at least upper-two-digit (e.g., upper-two-digit) Christian calendar year information constituting this Christian calendar year information with file format data subjected to the above write request, and stores it into the predetermined storage area (an identification mark) on the CMOS or the like not shown.

In the client unit 2A shown in FIG. 5, due to such a configuration, the file access control part 8A in response to a request from the application processing part 9A writes as write data into the memory part 7A data containing lower-two-digit Christian calendar year information constituting four-digit Christian calendar year information generated by the RTC 11.

At that time, the judgment part 8c of the file access control part 8A judges whether the four-digit Christian calendar year information from the RTC 11 indicates the year 2000 onward or not. If it is judged that this four-digit Christian calendar year information indicates the year 2000 onward, then the first write processing part 8d-1 imparts a flag as interrupt occurrence factor information to lower-two-digit Christian calendar year information of this four-digit Christian calendar year information, and outputs it as write Christian calendar year information, which is in turn written to the memory part 7A.

When the application processing part 9A reads a file written to the memory part 7A as described above, the file access control part 8A reads intactly two-digit Christian calendar year information within that file in the memory part 7A, and outputs it as Christian calendar year information. That is, if the two-digit Christian calendar year information within the file is flagged, the flagged Christian calendar year information is delivered to the application processing part 9A.

Subsequently, in cases. where the application processing part 9A has read Christian calendar year information on the year 2000 onward from the file, this Christian calendar year information contains the above interrupt occurrence factor information, so that in the same manner as the first embodiment described above, the restoration processing part 10 extracts flagless lower-two digit Christian calendar year information through the interrupt processing and extracts upper-two-digit Christian calendar year information stored by the third storage processing part 8d-2 in response to this flag, to thereby restore four-digit Christian calendar year information.

Thus, according to the first variant of the first embodiment, by virtue of the provision of the file access control part 8A and the restoration processing part 10, when the Christian calendar year information within a file or imparted to the file is managed in two digits and the Christian calendar year information for the application processing is processed in four digits, it is possible for the application processing part 9A to process lower-two-digit Christian calendar year information written to the file while distinguishing between the year 2000 and the year 1900, thereby making it possible to use application software which has hitherto been used as it is without any alteration even after the year 2000 has been reached.

Although in the above client unit 2A shown in FIG. 5 the third storage processing part 8d-2 is used to write uppertwo-digit Christian calendar year information to the CMOS or the like upon write of a file to the memory part 7A, the objects may be limited to only files from the year 2000 to the year 2099 as in the first embodiment so that the upper-two-digit Christian calendar year information can be uniquely set to "20" as long as it has a flag. This will eliminate a need to write the upper-two-digit Christian calendar year information for each Christian calendar year information within a file to be written, thereby enabling the function of the third storage processing part 8d-2 to be omitted.

That is, in this case, when Christian calendar year information from the year 2000 onward is written as the intra-file Christian calendar year information to the memory part 7A, the first write processing part 8d-1 employs as write Christian calendar year information the lower-two-digit Christian calendar year information having a flag as the interrupt occurrence factor information, with the omission of storage of the upper-two-digit Christian calendar year information to the CMOS or the like.

In cases where upon a read of Christian calendar year information within a file written in this manner, the Christian calendar year information contains a flag as interrupt occurrence factor information, that flag is stored in the CMOS or the like. The use of the flag stored in this CMOS or the like allows the upper-two-digit Christian calendar year information "20" to be uniquely extracted through the interrupt processing by the subsequent restoration processing part 10.

Thus, according to the client unit 2A shown in FIG. 5, by virtue of the provision of the file access control part 8A and the restoration processing part 10, when the Christian calendar year information within a file or imparted to the file is managed in two digits and the Christian calendar year information for the application processing is processed in four digits, it is possible for the application processing part 9A to process lower-two-digit Christian calendar year information written to the file while distinguishing between the year 2000 and the year 1900, thereby making it possible to use application software which has hitherto been used as it is without any alteration even after the year 2000 has been reached.

(a2) Description of Second Variant of First Embodiment

In the above-described first embodiment of the present invention, when it is judged that Christian calendar year information which the application processing part 9 has requested to read out indicates the year 2000 onward, the first read processing part 8b-1 imparts a flag "1" to lower-two-digit Christian calendar year information for the output to the application processing part 9, whereas the first storage processing part 8b-2 correlates upper-two-digit Christian calendar year information with the above file format data requested to be read, to store it into the predetermined storage area.

On the contrary, a client unit in accordance with a second variant of the first embodiment differs from that of the first embodiment described above in that when it is judged that Christian calendar year information which the application processing part 9 has requested to read out indicates the year 2000 onward, the first read processing part 8b-1 may impart a flag "1" to upper-two-digit Christian calendar year information for the output to the application processing part 9, whereas the first storage processing part 8b-2 may correlate lower-two-digit Christian calendar year information with the above file format data requested to be read, to store it into the predetermined storage area.

Figure 6:
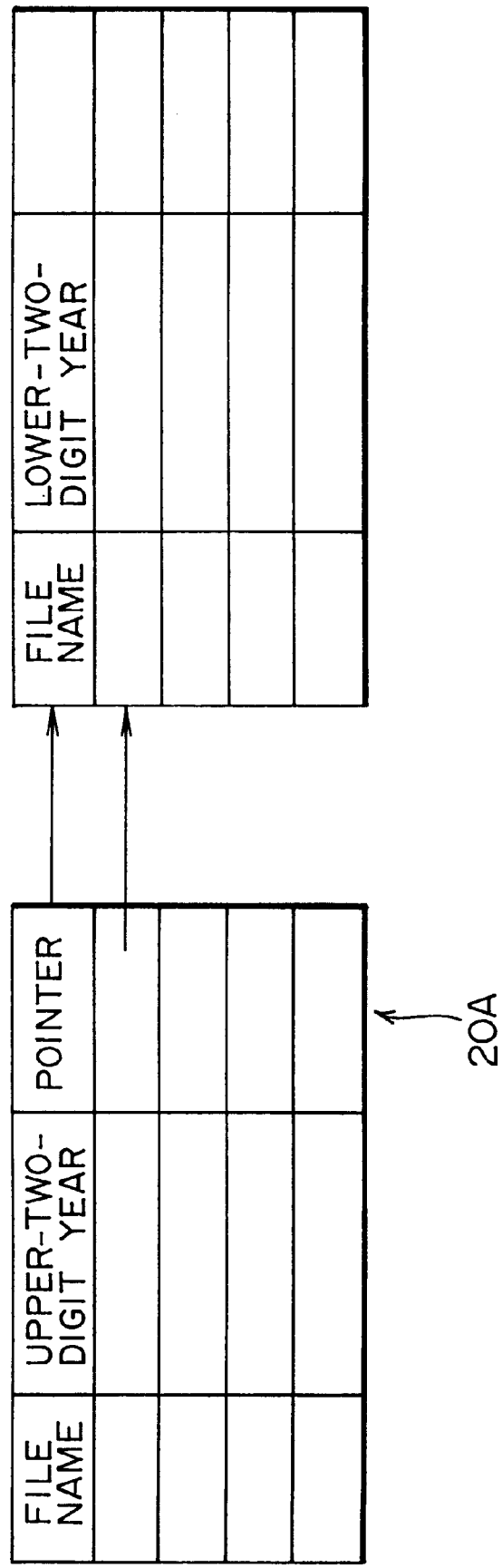
FIGS. 6 and 7 are diagrams showing storage areas in which is stored upper-two-digit Christian calendar year information and lower-two-digit Christian calendar year information in a second variant of the first embodiment of the present invention.
Figure 7:
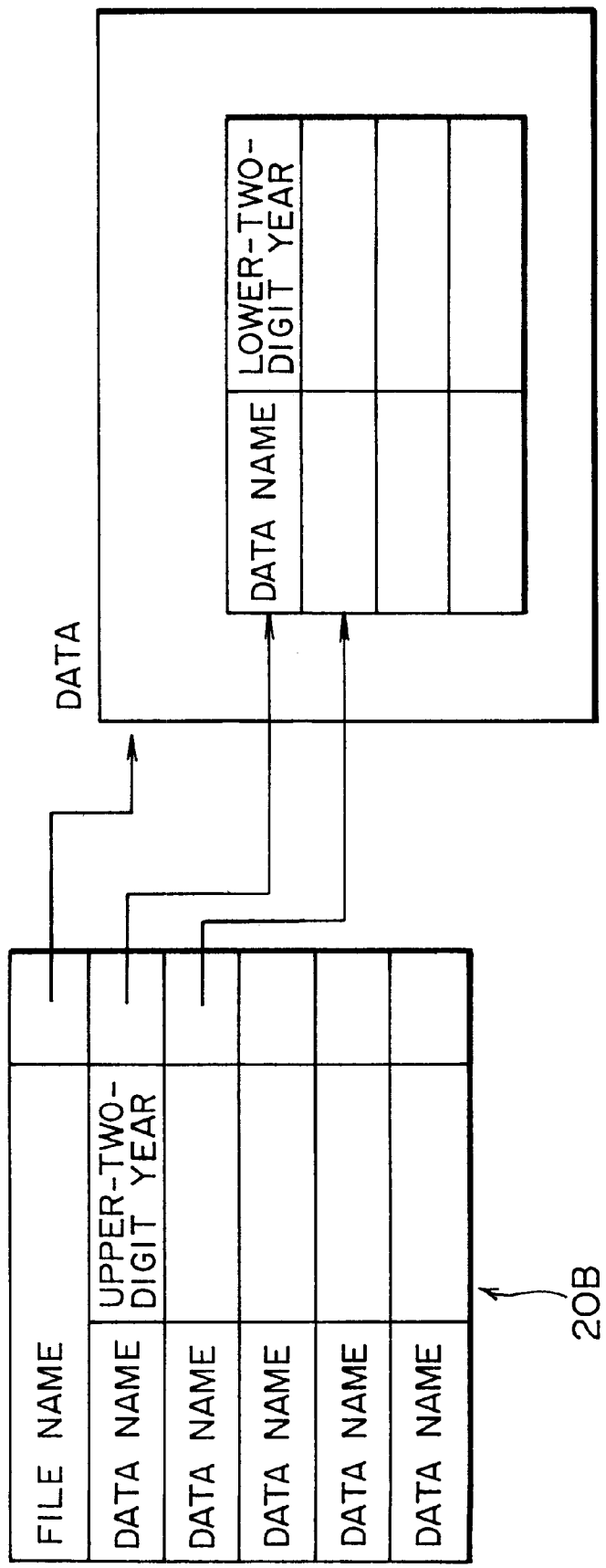

More specifically, the first storage processing part 8b-2 correlates flagged upper-two-digit Christian calendar year information and at least lower-two-digit (e.g., lower-two-digit) Christian calendar year information, which constitute the above intra-file four-digit Christian calendar year information, with Christian calendar year information requested to be read as e.g., shown in FIG. 6 or 7 (correlates them with a file requested to be read), and stores it into predetermined storage areas 20A and 20B on the CMOS or the like.

More specifically, when the first storage processing part 8b-2 reads out file registered date information (including Christian calendar year information) imparted to a file, it links (correlates), as shown in FIG. 6 for instance, lower-two-digit information constituting four-digit Christian calendar year information in this file registered date information, with upper-two-digit Christian calendar year information correspondingly to file names through pointers, and stores it into the predetermined storage area 20A on the CMOS or the like.

Also, when the first storage processing part 8b-2 reads out date information constituting data within a file, it links (correlates), as shown in FIG. 7 for instance, lower-two-digit information constituting each Christian calendar year data within the file, with upper-two-digit Christian calendar year information through pointers, and stores it into the predetermined storage area 20B on the CMOS or the like.

Thus, when comparison is made of the Christian calendar year information in the application processing part 9, the flag imparted to the upper-two-digit Christian calendar year information allows the restoration processing part 10 to generate interrupt processing, by means of which it can be restored to four-digit Christian calendar year information. That is, in this case also, the application processing part 9 is capable of distinguishing between the years 1900s and 2000s by managing only the two-digit Christian calendar year information.

Figure 8:
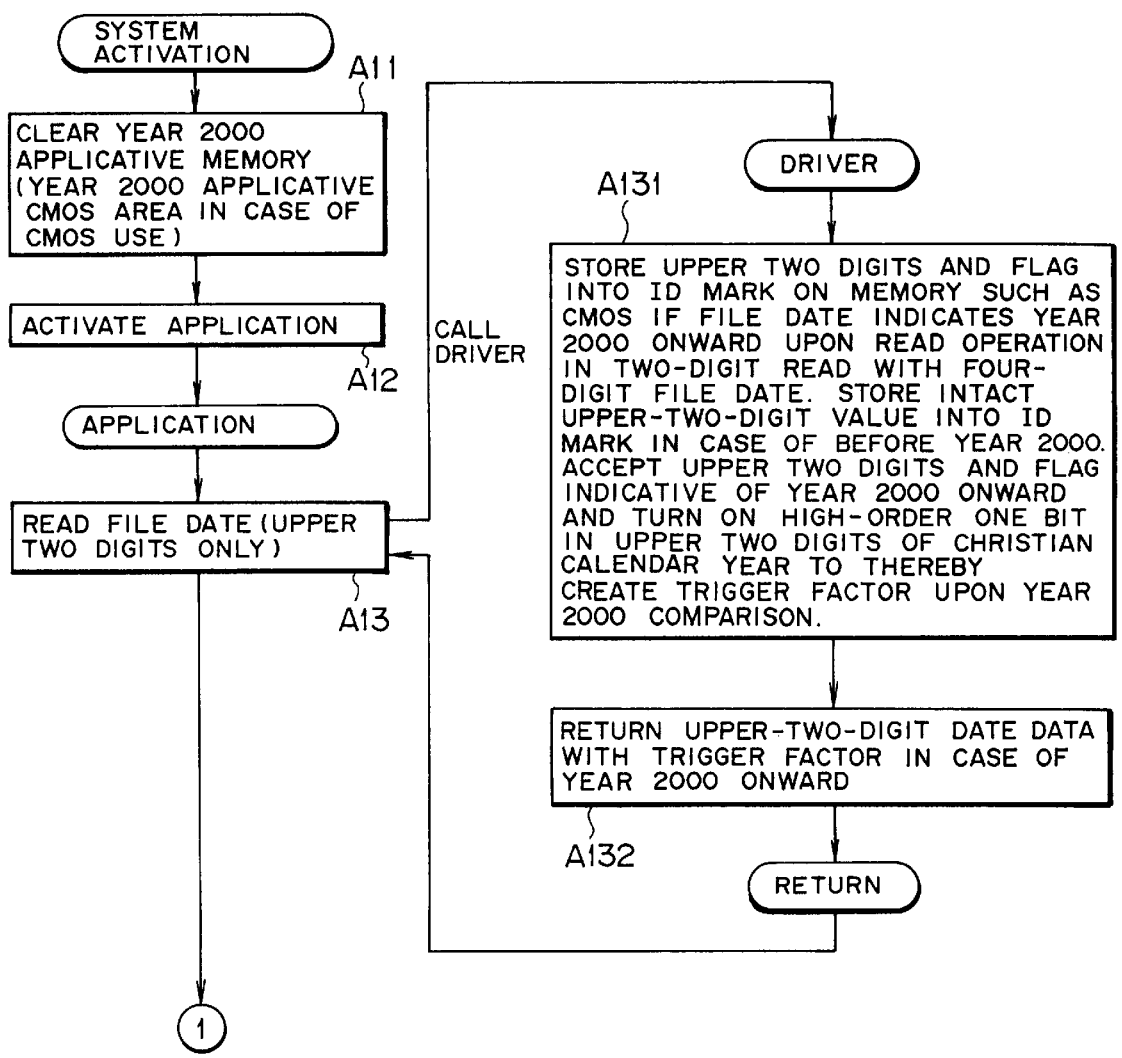
FIGS. 8 and 9 are flowcharts for explaining the operation of a client unit serving as an information processing unit in accordance with the second variant of the first embodiment of the present invention.

Operation of the client unit 2 serving as the information processing unit in this case will be described hereinafter with reference to flow charts shown in FIGS. 8 and 9.

First, the client server system is activated and each client unit 2 is initialized. In each client unit 2, for example, there is cleared a predetermined area on the memory such as the CMOS, which is utilized to distinguish between the years 1900s and 2000s (step All in FIG. 8).

After the initialization, a desired application is activated in each client unit 2 (step A12). This places the application processing part 9 in operative condition in each client unit 2.

When in the processing by the application processing part 9 there occurs a read of Christian calendar year/date information of a file stored in the memory part 7 (a file read request to the memory part 7) (step A13), the file access control part 8 serving as a driver is put into operative condition.

That is, if it is judged in the judgment part 8a of the file access control part 8 that as a result of read of Christian calendar year/date information of the file stored in the memory part 7 it indicates the year 2000 onward, then the first storage processing part 8b-2 stores a flag (e.g., "1") indicative of the above fact into the predetermined area (an identification mark) on the CMOS or the like not shown (step A131).

Furthermore, the first read processing part 8b-1 turns on the high order one bit of upper two digits constituting four-digit Christian calendar year information of the file (imparts a flag "1" indicative of the year 2000 onward), and outputs it as read Christian calendar year information together with date information (steps A131 and A132).

If it is judged in the judgment part 8a that the Christian calendar year information requested to be read indicates a year before the year 2000, the above first read processing part 8b-1 reads upper-two-digit Christian calendar year information "19" of the intra-file four-digit Christian calendar year information as it is, and delivers read Christian calendar year information together with date information to the application processing part 9 (step A132).

If the Christian calendar year information indicates the year 2000 onward, the high order one bit flag imparted to the read Christian calendar year information serves as a trigger information permitting an occurrence of interrupt processing at the time of application processing by the subsequent application processing part 9.

Figure 9:
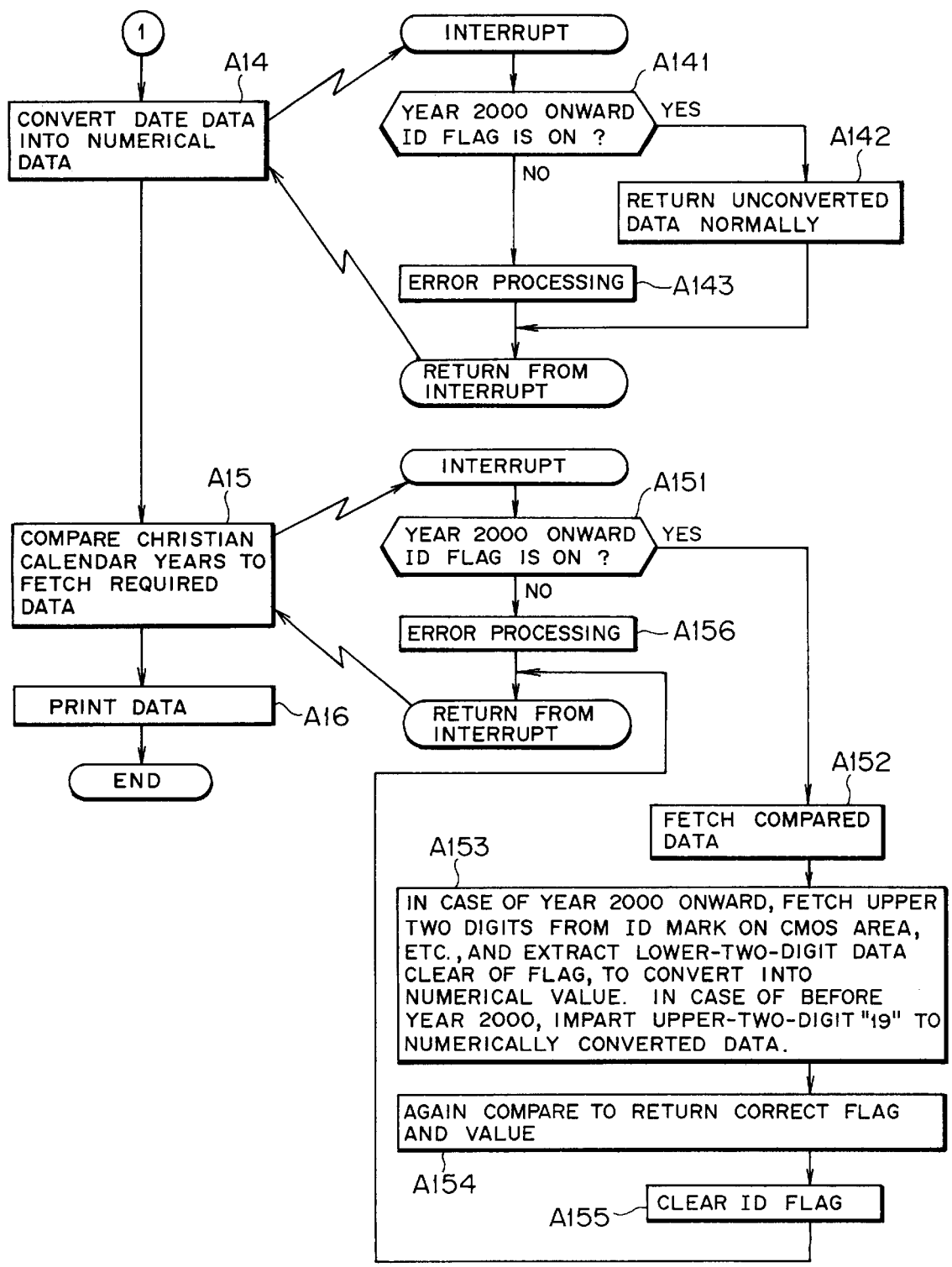

When the application processing part 9 reads the Christian calendar year/date information as described above, an instruction is issued to convert the read upper-two-digit Christian calendar year information into numerical data (step A14 in FIG. 9).

In cases where upon the conversion of the Christian calendar year/date information into numerical data in the application processing part 9 the upper-two-digit Christian calendar year information is flagged, an interrupt action occurs so that it is judged whether the flag is not a mere character information but indicates that the Christian calendar year information of the read file is indicative of the year 2000 onward (step A141).

If the flag imparted to the upper-two-digit Christian calendar year information indicates that the read Christian calendar year information is indicative of the year 2000 onward, then unconverted data are normally to the application processing part 9 to allow a return from the interruption (from step A141 via YES route to step A142), whereas if the flag imparted to the upper-two-digit Christian calendar year information is not a flag which indicates that the read Christian calendar information is indicative of the year 2000 onward, then error processing takes place to allow a return from the interrupt processing (from step A141 via NO route to step A143).

After the conversion of the Christian calendar year/date information into numerical data, the subsequent processing by the application processing part 9 subjects the Christian calendar year information obtained as a result of the conversion (for the flagged Christian calendar year information, intact information is treated as a normal conversion result), to comparison processing between a plurality of pieces of Christian calendar year information (data) (step A15).

In cases where the Christian calendar year information is provided with a flag upon the execution of the comparison processing of the Christian calendar year information by the application processing part 9, procedure goes to interrupt processing by the restoration processing part 10.

That is, if the flag imparted to Christian calendar year information indicates that the Christian calendar year information read from a file is indicative of the year 2000 onward (from step A151 to YES route), a plurality of pieces of Christian calendar year information subjected to the comparison is retrieved (step A152) and upper-two-digit Christian calendar year information of each Christian calendar year information is extracted from the identification mark on the CMOS to generate four-digit Christian calendar year information (step A153).

More specifically, if the retrieved Christian calendar year information is provided with a flag indicative of the year 2000 onward, then lower-two-digit Christian calendar year information is retrieved together with upper-two-digit Christian calendar year information without that flag from the identification mark on the CMOS corresponding to the flag, to generate four-digit Christian calendar year information.

On the contrary, if the retrieved Christian calendar year information is not provided with a flag indicative of the year 2000 onward, then lower-two-digit Christian calendar year data are retrieved from the predetermined area on the CMOS or the like, to extract four-digit Christian calendar year information.

Thus, through the generation of four-digit Christian calendar year information from lower-two-digit and upper-two-digit Christian calendar year information, the restoration processing part 10 is capable of restoring flagged read Christian calendar year information to four-digit Christian calendar year information.

After the restoration of the compared Christian calendar year information to four-digit Christian calendar year information as described above, a comparison is again made to return a correct value, flag and comparison result to the application processing part 9 and the identification flag is cleared. A return from the interrupt processing is then achieved, allowing procedure to return to the application processing part 9 (steps A154 and A155).

If the flag imparted to the Christian calendar year information subjected to the Christian calendar year comparison processing by the application processing part 9 is not a flag which indicates that the read Christian calendar year information is indicative of the year 2000 onward, then an interrupt of error processing occurs and thereafter a return from the interrupt processing is achieved (from step A151 via NO route to step A156).

If all of the Christian calendar year information subjected to the Christian calendar year comparison processing by the application processing part 9 is indicative of years before the year 2000, read lower-two-digit Christian calendar year information can be specified as Christian calendar year information on the years 1900s, allowing it to be used for the comparison processing as it is.

Afterwards, the application processing part 9 prints, if necessary, application processing results such as comparison results of Christian calendar year information (step A16).

In this manner, also in the second variant of the first embodiment, like the first embodiment described above, when Christian calendar year information within a file or imparted to the file is managed in four digits and Christian calendar year information for application processing is processed in two digits, it is possible for the application processing part 9 to distinguish between the year 2000 and the year 1900 while performing the application processing using lower-two-digit Christian calendar year information, thus advantageously making it possible to use intactly lower-two-digit data in the application software which has been hitherto used, without any alteration, even after the year 2000 has been reached.

It is to be appreciated in the second variant of the first embodiment described above that in cases where intra-file two-digit Christian calendar year information is read from the memory part 7A and is subjected as four-digit Christian calendar year information to the comparison processing in the application processing part 9A, the client unit 2 may be configured as information processing unit in conformity with the first embodiment described above so that it is possible to distinguish between the years 1900s and 2000s.

(b) Description of Second Embodiment

Figure 10:
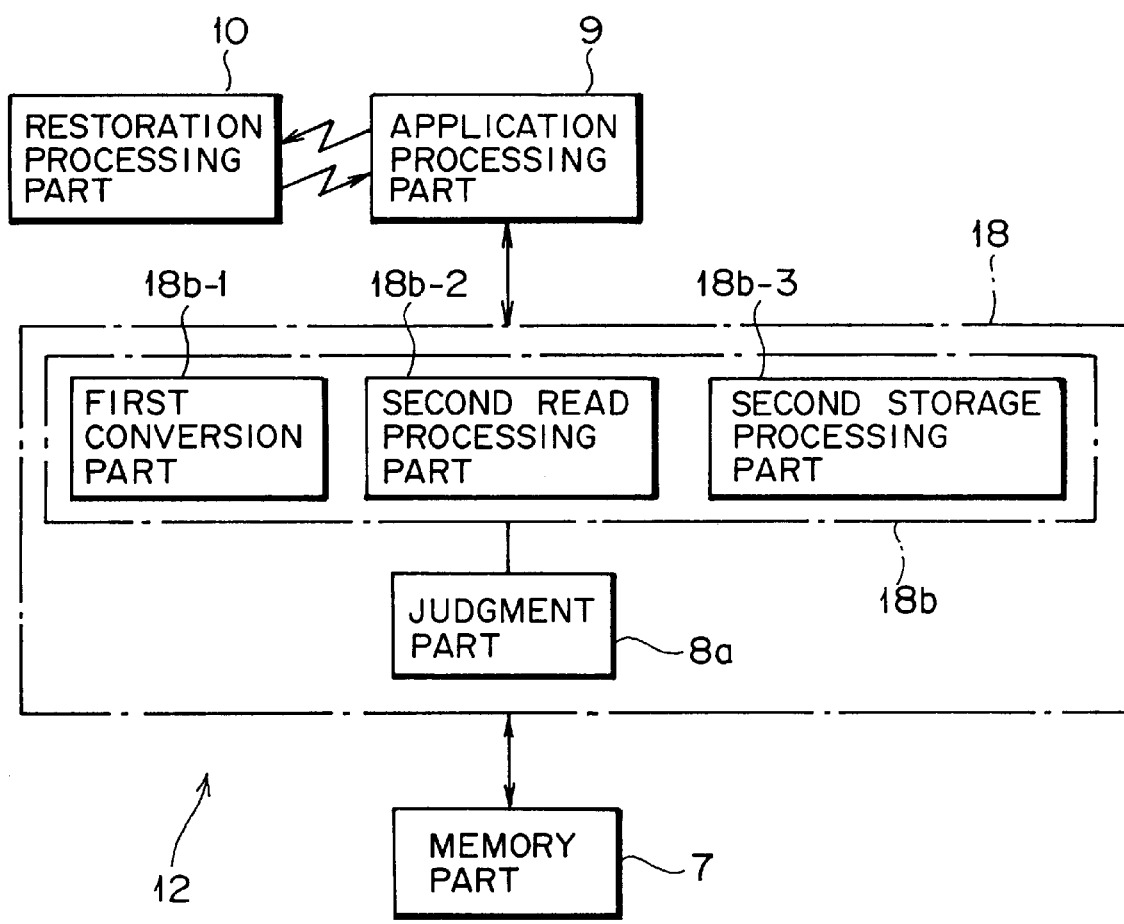
FIG. 10 is a block diagram showing an information processing unit in accordance with a second embodiment of the present invention.

FIG. 10 is a block diagram showing an information processing unit in accordance with a second embodiment of the present invention. The information processing unit shown in FIG. 10 is also usable as a client unit in the information processing system (see FIG. 2) similar to that of the first embodiment described above. This information processing unit 12 has substantially the same hardware configuration as that of the client unit 2 (see FIG. 3) in accordance with the first embodiment.

The information processing unit 12 in accordance with the second embodiment also has a function to solve the so-called year 2000 problem on Christian calendar year information imparted to a file for use in information processing, and includes the memory part 7 and application processing part 9 similar to those in the first embodiment described above, as well as a file access control part 18 which differs in configuration from that in the client unit 2 in accordance with the first embodiment.

In the same manner as the first embodiment described above, the memory part 7 stores in a file format the data for information processing containing four-digit Christian calendar year information, while the application processing part 9 performs application processing using lower-two-digit Christian calendar year information of four-digit Christian calendar year information contained in data stored in the memory part 7.

The file access control part 18 serves as a driver, which writes/reads the file format data to/from the memory part 7 in response to a request from the application processing part 9, and from functional viewpoint of the present invention in particular it includes the judgment part 8a similar to that in the first embodiment described above and a read Christian calendar year information output part 18b.

When it is judged in the judgment part 8a that the Christian calendar year information requested to be read indicates the year 2000 onward, the read Christian calendar year information output part 18b generates Christian calendar year information having interrupt occurrence factor information as identification information indicative of the above fact, and transmits the read Christian calendar year information to the memory part 7. The read Christian calendar year information output part 18b comprises a first conversion part 18b-1, a second read processing part 18b-2 and a second storage processing part 18b-3.

In cases where Christian calendar year information within a file (or imparted to the file) which the application processing part 9 has requested to read out indicates the year 2000 onward, the first conversion part 18b-1 converts upper-two-digit Christian calendar year information of four-digit Christian calendar year information within that file, into information containing interrupt occurrence factor information (information causing an occurrence of interruption upon the processing by the application processing part 9).

More specifically, the first conversion part 18b-1 sets upper-two-digit Christian calendar year information to "A0" for the year 2000, "A1" for the year 2100, and "B0" for the year 3000, to thereby generate upper-two-digit Christian calendar year information with the most significant digit containing interrupt occurrence factor information such as "A" or "B".

To the application processing part 9, the second read processing part 18b-2 sends Christian calendar year information which has been converted by the first conversion part 18b-1, as Christian calendar year information constituting the file format data requested to be read.

The second storage processing part 18b-3 correlates at least lower-two-digit (e.g., lower-two-digit) Christian calendar year information constituting the four-digit Christian calendar year information within the file, with the Christian calendar year information requested to be read as shown in e.g., FIG. 6 or 7 described hereinbefore (correlates it with the file requested to be read), and stores it into predetermined storage areas 20A and 20B on the CMOS or the like.

More specifically, at the time when the second storage processing part 18b-3 reads file registered date information (including Christian calendar year information) imparted to a file, it links as shown in FIG. 6 for instance, lower-two-digit information constituting four-digit Christian calendar year information in this file registered date information, with upper-two-digit Christian calendar year information correspondingly with file names through pointers, and stores it into the predetermined storage area 20A on the CMOS or the like.

At the time when the second storage processing part 18b-3 reads date information constituting data within a file, it links (correlates) as shown in FIG. 7 described above for instance, lower-two-digit information constituting each Christian calendar year data within the file, with upper-two-digit Christian calendar year information through the pointers, and stores it into the predetermined storage area 20B on the CMOS or the like.

In cases where it is judged in the judgment part 8a that Christian calendar year information requested to be read indicates a year before the year 2000, the above second read processing part 18b-2 reads intactly lower-two-digit Christian calendar year information of four-digit Christian calendar year information within a file and feeds it as read Christian calendar year information to the application processing part 9.

Incidentally, when the application processing part 9 writes data to the memory part 7, the data, together with four-digit Christian calendar year/time information from the RTC constituted by, e.g., a register within the client unit 2, are recorded in a file through the control by the file access control part 18.

In the same manner as the first embodiment described above, when interrupt occurrence factor information is contained in Christian calendar year information constituting file format data in the memory part 7 which has been read in the application processing part 9, the restoration processing part 10 restores it to four-digit Christian calendar year information through the interrupt processing.

More specifically, when the interrupt occurrence factor information is contained in Christian calendar year information within a read file upon the execution of, e.g., comparison of the Christian calendar year information through the processing in the application processing part 9, there occurs interrupt processing by the restoration processing part 10, thus allowing restoration to four-digit Christian calendar year information. In other words, the application processing part 9 distinguishes between the years 1900s and 2000s even when it manages only lower-two-digit Christian calendar year information.

Figure 11:
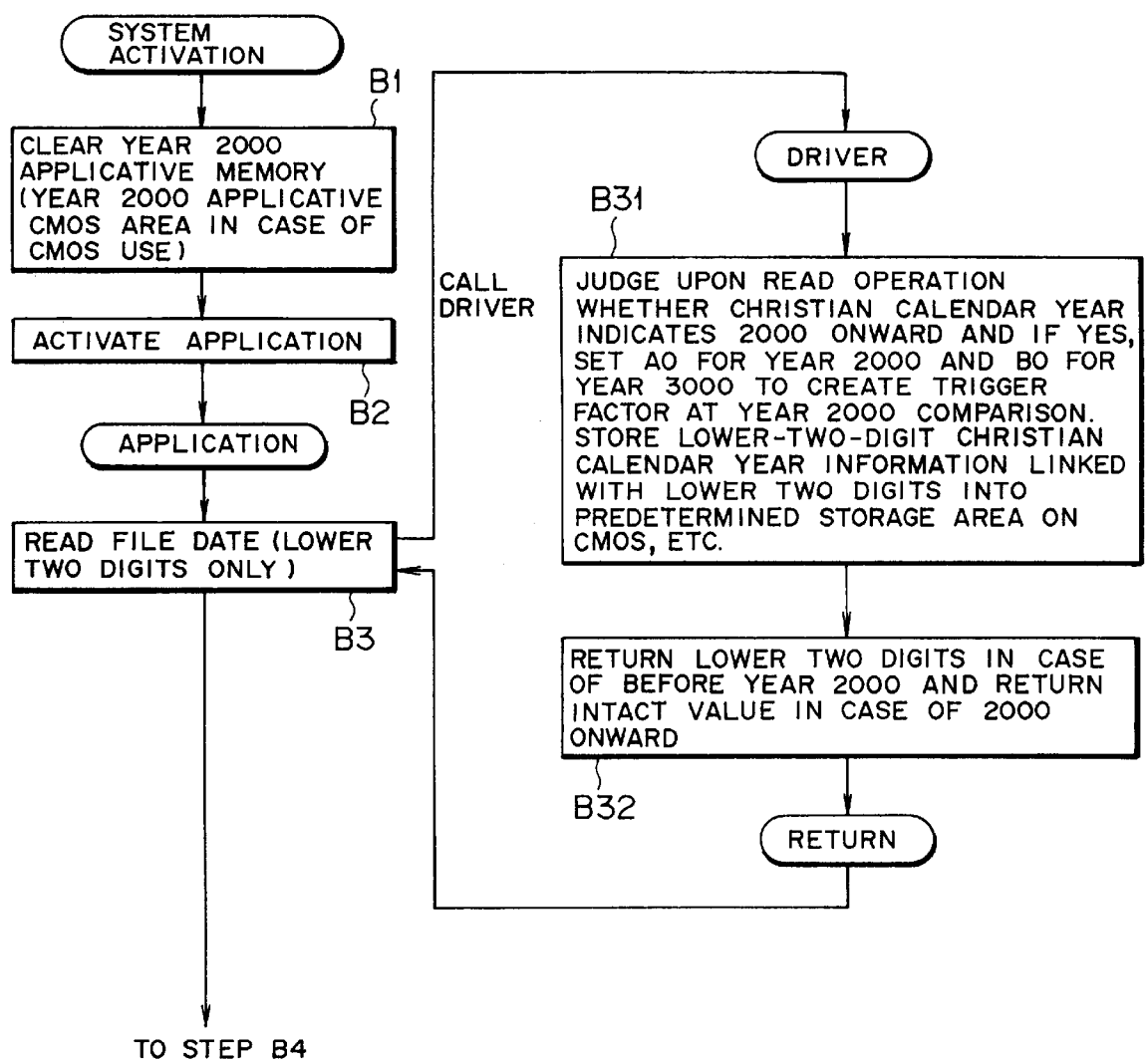
FIGS. 11 and 12 are flowcharts for explaining the operation of the second embodiment of the present invention.
Figure 12:
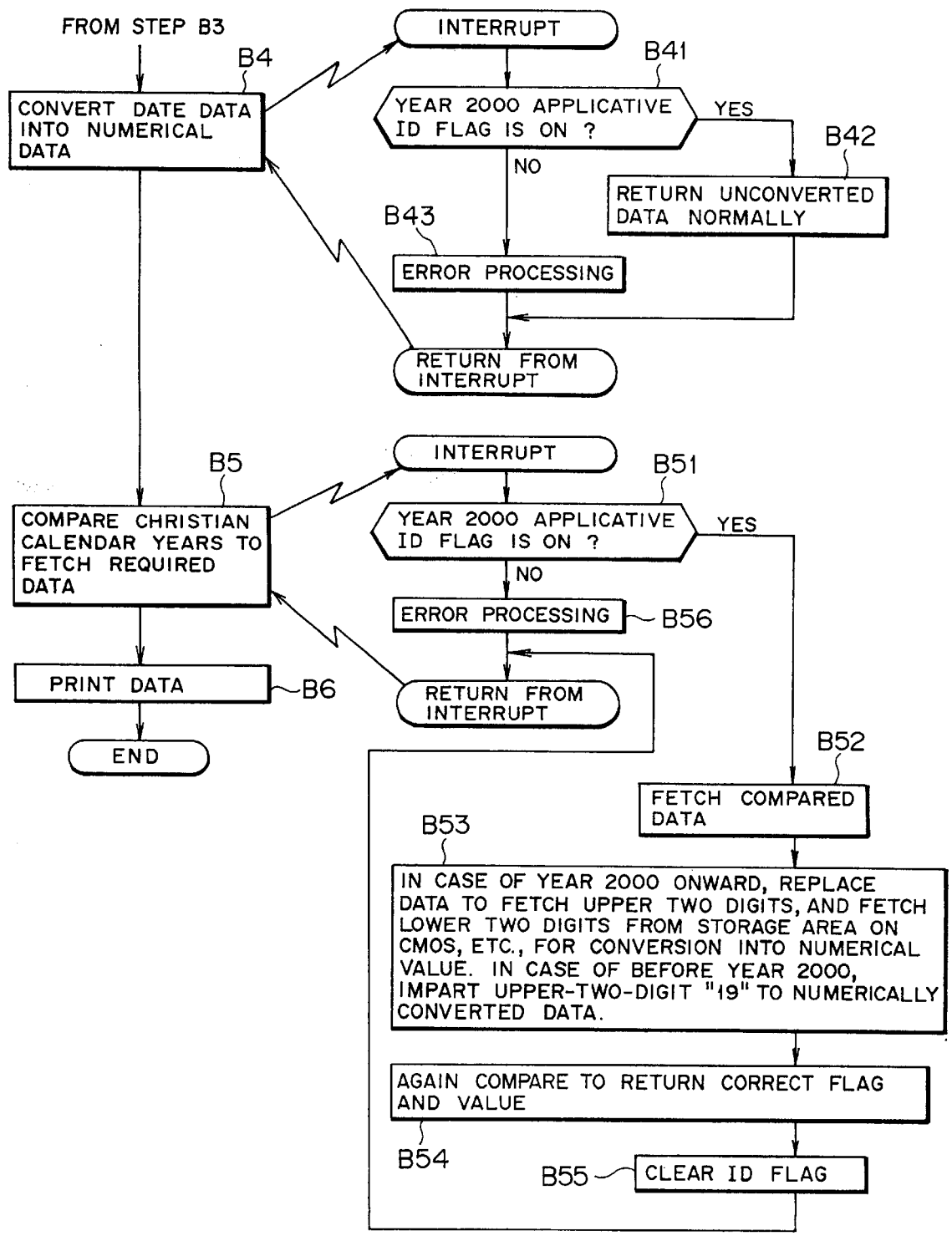

Reference is now made to flowcharts of FIGS. 11 and 12 to explain the operation of the second embodiment of the present invention having the above configuration.

First, in response to the activation of the client server system in accordance with the second embodiment, various programs are developed as described above into the main storage 4 in the information processing unit 12 serving as the client unit, allowing a migration to a program operating state. At that time, there is cleared a predetermined area on the memory such as the CMOS, which is utilized to distinguish between the years 1900s and 2000s (step B1 in FIG. 11).

When the information processing unit 12 is initialized to activate a desired application (step B2), the application processing part 9 is put into operative condition.

When through the processing by the application processing part 9 there occurs a read of Christian calendar year/date information of a file stored in the memory part 7 (a file read request to the memory part 7) (step B3), the file access control part 18 serving as a driver becomes operative.

In cases where it is judged in the judgment part 8a of the file access control part 18 that as a result of read of the Christian calendar year/date information of the file stored in the memory part 7 it indicates the year 2000 onward, the first conversion part 18b-1 converts upper-two-digit Christian calendar year information of four-digit Christian calendar year information within that file into information containing interrupt occurrence factor information, whereas the second read processing part 18b-2 passes the thus converted Christian calendar year information as read Christian calendar year information to the application processing part 9.

More specifically, the first conversion part 18b-1 sets upper-two-digit Christian calendar year information to "A0" for the year 2000, "A1" for the year 2100, and "B0" for the year 3000, to generate upper-two-digit Christian calendar year information containing interrupt occurrence factor information such as "A" or "B" in the most significant digit. Such an interrupt occurrence factor information acts as trigger information allowing an occurrence of interruption upon the application processing by the subsequent application processing part 9.

In this case, the second storage processing part 18b-3 links at least lower-two-digit (e.g., lower-two-digit) Christian calendar year information constituting the intra-file four-digit Christian calendar year information with the Christian calendar year information requested to be read, and stores it into the predetermined storage areas 20A and 20B on the CMOS or the like (steps B31 and B32).

If it is judged in the judgment part 8a that the Christian calendar year information requested to be read indicates a year before the year 2000, the above second read processing part 18b-2 feeds lower-two-digit Christian calendar year information of the intra-file four-digit Christian calendar year information intactly as read Christian calendar year information together with date information to the application processing part 9 (step B32).

When the application processing part 9 reads Christian calendar year/date information of the file as described above, an instruction is issued to convert read two-digit Christian calendar year information into numerical data (step B4 in FIG. 12).

In cases where the interrupt occurrence factor information is contained in the two-digit Christian calendar year information to be converted, there occurs an interrupt action to judge whether the interrupt occurrence factor information indicates that read intra-file Christian calendar year information is indicative of the year 2000 onward (step B41).

If the interrupt occurrence factor information contained in two-digit Christian calendar year information is not a mere character information but indicates that the read Christian calendar year information is indicative of the year 2000 onward, then intact Christian calendar year information containing this interrupt occurrence factor information is returned normally to the application processing part 9, allowing a return from the interrupt (from step B41 via YES route to step B42). On the contrary, if the interrupt occurrence factor information contained in two-digit Christian calendar year information does not indicate that the read Christian calendar year information is indicative of the year 200 onward, then error processing is performed to allow a return from the interrupt processing (from step B41 via NO route to step B43).

When Christian calendar year/date information is converted into numerical data, the Christian calendar year information obtained as a result of the conversion is subjected through the subsequent processing by the application processing part 9 to comparison processing for making a comparison between a plurality of pieces of Christian calendar year information (data) (step B5).

In cases where upon the execution of the comparison processing of Christian calendar year information by the application processing part 9 the Christian calendar year information to be compared contains interrupt occurrence factor information, procedure goes to interrupt processing by the restoration processing part 10.

That is, if interrupt occurrence factor information contained in Christian calendar year information indicates that the Christian calendar year information read from the file is indicative of the year 2000 onward (from step B51 to YES route), the restoration processing part 10 fetches a plurality of pieces of Christian calendar year information subjected to the comparison (step B52), and extracts upper and lower two-digit Christian calendar year information of each Christian calendar year information while referring to the identification marks of the predetermined areas 20A and 20B on the CMOS, to generate four-digit Christian calendar year information (step B53).

More specifically, when the Christian calendar year information fetched for the comparison contains interrupt occurrence factor information indicative of the year 2000 onward, it is converted into original upper-two-digit Christian calendar year information and corresponding lower-two-digit Christian calendar year information is retrieved from the predetermined areas 20A, 20B on the CMOS, to generate four-digit Christian calendar year information.

On the contrary, when the Christian calendar year information fetched for the comparison does not contain interrupt occurrence factor information indicative of the year 2000 onward, this Christian calendar year information is lower-two-digit Christian calendar year information constituting Christian calendar year information on a year before the year 2000, and four-digit Christian calendar year information is extracted using this Christian calendar year information as well as the constant "19" retrieved from the predetermined area on the CMOS or the like.

Thus, by generating four-digit Christian calendar year information from upper-two-digit and lower-two-digit Christian calendar year information as described above, the restoration processing part 10 is capable of restoring read Christian calendar year information containing interrupt occurrence factor information into four-digit Christian calendar year information.

After the restoration of the compared Christian calendar year information into four-digit Christian calendar year information as set forth hereinabove, a comparison is again made to return a correct value, flag and comparison result to the application processing part 9, the identification flag is cleared and thereafter a return from the interrupt processing is effected, allowing procedure to go back to the application processing part 9 (steps B54 and B55).

If interrupt occurrence factor information contained in Christian calendar year information subjected to the Christian calendar year comparison processing by the application processing part 9 does not indicate that the read Christian calendar year information is indicative of the year 2000 onward, procedure returns through the interrupt for the error processing to the original application processing (from step B51 via NO route to step B56).

On the contrary, if all of the Christian calendar year information subjected to the Christian calendar year comparison processing by the application processing part 9 is associated with years before the year 2000, read lower-two-digit Christian calendar year information can be specified to be Christian calendar year information on the years 1900s, thereby making it possible to perform the comparison processing without needing any additional processing.

Afterwards, the application processing part 9 prints if necessary results of the application processing such as results of the comparison of Christian calendar year information (step B6).

In this manner, according to the second embodiment of the present invention, by virtue of the provision of the file access control part 18 and the restoration processing part 10, when the Christian calendar year information within a file or imparted to the file is managed in four digit and the Christian calendar year information for application processing is processed in two digits, it is possible for the application processing part 9 to distinguish between the year 2000 and the year 1900 while performing the application processing using lower-two-digit Christian calendar year information, thus advantageously making it possible to use intactly lower-two-digit data in the application software which has been hitherto used, without any alteration, even after the year 2000 has been reached.

Furthermore, according to the second embodiment of the present invention, even when upper two digits of Christian calendar year change at the year 2100 or onward after the year 2000, each Christian calendar year can be recognized by two-digit information containing interrupt occurrence factor information so that it is possible to distinguish not only between the year 2000 and the year 1900 but also between Christian calendar years after the year 2100.

(b1) Description of Variant of Second Embodiment

Figure 13:
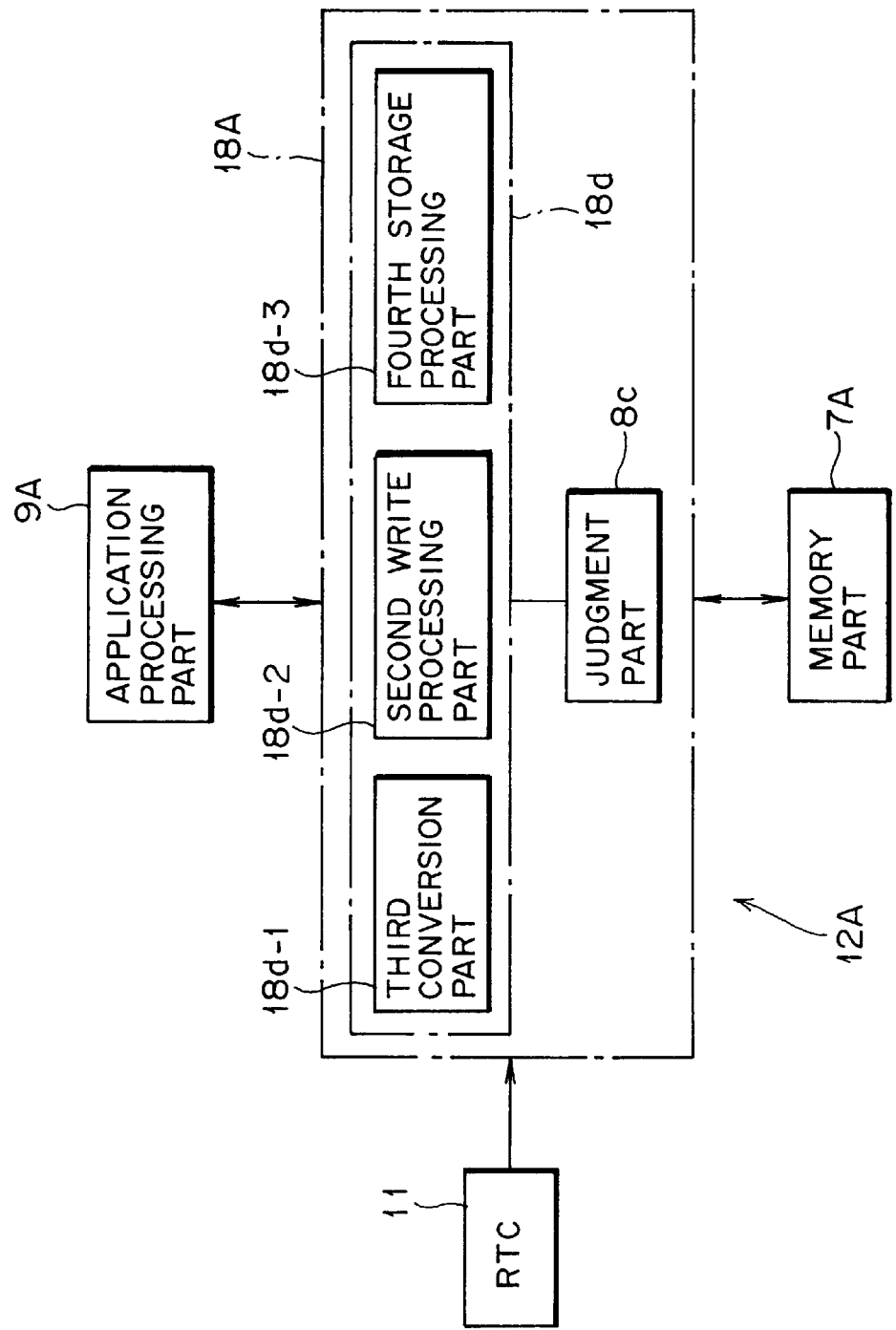
FIG. 13 is a block diagram showing an information processing unit serving as a client unit in accordance with a variant of the second embodiment of the present invention.

Although there has been described in detail the configuration of the second embodiment for distinguishing between the years 1900s and 2000s when the application processing part 9 reads four-digit Christian calendar year information within a file and uses it as lower-two-digit Christian calendar year information for the comparison processing, the years 1900s and 2000s may be distinguished from each other by configuring an information processing unit as shown in FIG. 13 when two-digit Christian calendar year information within the file is read from the memory part 7A and is used as four-digit Christian calendar year information for, e.g., comparison processing in an application processing part 9A.

FIG. 13 is a block diagram showing the information processing unit serving as a client unit in accordance with a variant of the second embodiment of the present invention. The information processing unit 12A shown in FIG. 13 comprises the memory part 7A, a file access control part 18A and the application processing part 9A, as well as the RTC 11.

The information processing unit 12A shown in FIG. 13 has basically the same configuration as that shown in FIG. 5 described above, excepting the file access control part 18A. In FIG. 13, the same reference numerals as in FIG. 5 designate similar parts.

The file access control part 18A, in response to a request from the application processing part 9A, writes/reads file format data to/from the memory part 7A, and includes the judgment part 8c and a write Christian calendar year information output part 18d.

In the same manner as that in the client unit 2A shown in FIG. 5 described above, in response to a request from the application processing unit 9A to write four-digit Christian calendar year information generated by the RTC 11 (a request to write a file to the memory 7A), the judgment part 8c judges whether that four-digit Christian calendar year information is indicative of the year 2000 onward.

The write Christian calendar year information output part 18d, when it is judged in the judgment part 8c that the above four-digit Christian calendar year information requested to be written is indicative of the year 2000 onward, generates Christian calendar year information having interrupt occurrence factor information for the output as write Christian calendar year information, and includes a third conversion part 18d-1, a second write processing part 18d-2 and a fourth storage processing part 18d-3.

The third conversion part 18d-1, when the above four-digit Christian calendar year information requested to be written is indicative of the year 2000 onward, converts upper-two-digit Christian calendar year information into information containing interrupt occurrence factor information (identification information indicative of the year 2000 onward). The second write processing part 18d-2 writes to the memory part 7A the Christian calendar year information which has been converted by the third conversion part 18d-1.

The fourth storage processing part 18d-3 correlates at least lower-two-digit Christian calendar year information constituting the Christian calendar year information on the year 2000 onward with the Christian calendar year information requested to be written (links it with a file requested to be written), and stores it into a predetermined storage area on a CMOS, in the same manner as FIG. 6 or 7 described above for instance.

In the thus configured client unit 12A shown in FIG. 13, the file access control part 18A in response to a request from the application processing part 9A, writes data including lower-two-digit Christian calendar year information constituting four-digit Christian calendar year information generated by the RTC 11, as write data, to the memory part 7A.

The judgment part 8c of the file access control part 18A judges whether four-digit Christian calendar year information from the RTC 11 is indicative of the year 2000 onward or not. If it is judged in the judgment part 8c that the four-digit Christian calendar year information is indicative of the year 2000 onward, the third conversion part 18d-1 of the write Christian calendar year information output part 18d converts upper-two-digit Christian calendar year information into information containing interrupt occurrence factor information, and the second write processing part 18d-2 writes the thus converted Christian calendar year information to the memory part 7A.

The fourth storage processing part 18d-3 correlates at least lower-two-digit Christian calendar year information constituting the above Christian calendar year information on the year 2000 onward with the Christian calendar year information requested to be written, and stores it into a predetermined storage area on a CMOS or the like.

When the application processing part 9A thereafter reads a file written to the memory part 7A as described above, the file access control part 18A outputs as read Christian calendar year information intactly the Christian calendar year information within that file in the memory part 7A.

When the application processing part 9A reads Christian calendar year information indicative of the year 2000 onward from the file, this Christian calendar year information contains the above interrupt occurrence factor information, so that in the same manner as the second embodiment, interrupt processing by the restoration processing part 10 is effected to convert and extract the original lower-two-digit Christian calendar year information and to extract upper-two-digit Christian calendar year information stored on the CMOS so as to be correlated with the file, thereby restoring four-digit Christian calendar year information.

Thus, in this case also, like the first variant of the first embodiment described earlier, by virtue of the provision of the file access control part 18A and the restoration processing part 10, when Christian calendar year information within a file or imparted to the file is managed in two digits and Christian calendar year information for application processing is processed in four digits, it is possible for the application processing part 9A to process lower-two-digit Christian calendar year information written to the file while distinguishing between the year 2000 and the year 1900, thus advantageously making it possible to use intactly lower-two-digit data in the application software which has been hitherto used, without any alteration, even after the year 2000 has been reached.

(c) Description of Third Embodiment

Figure 14:
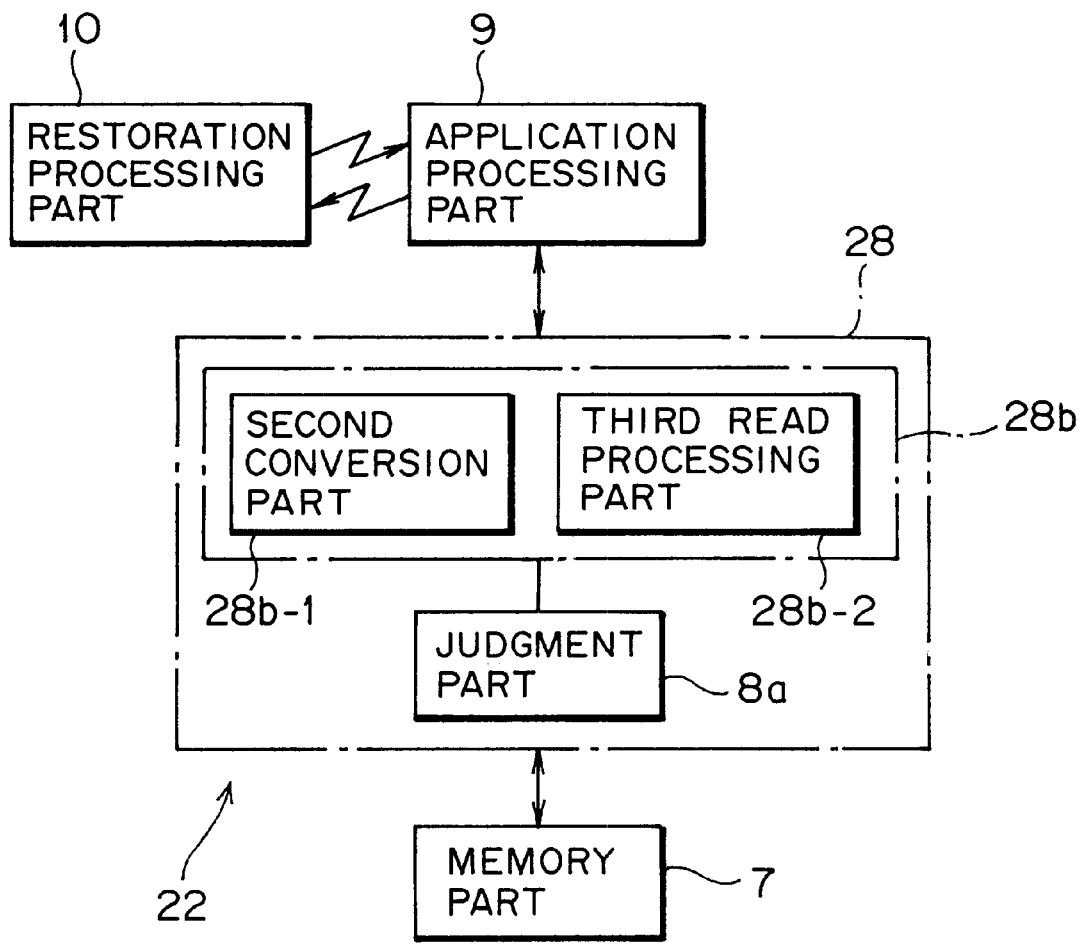
FIG. 14 is a block diagram showing an information processing unit in accordance with a third embodiment of the present invention.

FIG. 14 is a block diagram showing an information processing unit in accordance with a third embodiment of the present invention. The information processing unit 22 shown in Fig.14 is also used as a client unit in the same information processing system (see FIG. 2) as in the first embodiment and has the basically same hardware configuration as that of the client unit 2 (see FIG. 2) in accordance with the first embodiment.

The information processing unit 22 in accordance with the third embodiment also has a function to solve the so-called year 2000 problem on Christian calendar year information imparted to a file for use in information processing. It comprises the memory part 7 and the application processing part 9, identical to those of the first embodiment described earlier, as well as a file access control part 28 which differs in configuration from that of the client unit 2 and the information processing unit 12 in accordance with the first and second embodiment, respectively.

In the same manner as the first and second embodiments described above, the memory part 7 stores in file format the data for information processing containing four-digit Christian calendar year information, and the application processing part 9 performs application processing using lower-two-digit Christian calendar year information of four-digit Christian calendar year information contained in the data stored in the memory part 7.

The file access control unit 28 serves as a driver, which in response to a request from the application processing unit 9, writes/reads file format data to/from the memory part 7, and from the functional viewpoint of the present invention, includes a judgment part 8a similar to that of the first embodiment, as well as a read Christian calendar year information output part 28b.

When it is judged in the judgment part 8a that the Christian calendar year information requested to be read indicates the year 2000 onward, the read Christian calendar year information output part 28b generates Christian calendar year information having interrupt occurrence factor information as identification information indicative of the above fact, and feeds it as read Christian calendar year information to the memory part 7. The read Christian calendar year information output part 28b includes a second conversion part 28b-1 and a third read processing part 28b-2.

The second conversion part 28b-1 converts four-digit Christian calendar year information within a file which the application processing unit 9 has requested to read, into two-digit information containing interrupt occurrence factor information.

More specifically, as shown in FIG. 15, the second conversion part 28b-1 generates upper-two-digit Christian calendar year information containing interrupt occurrence factor information (character information other than "0" to "9") such as "F" to "A" in the most significant digit, by representing two-digit Christian calendar year information as "F0" in hexadecimal numeral for the year 2000, "F9" in two-digit hexadecimal numeral for the year 2009, "E0" in two-digit hexadecimal numeral for the year 2010 and so forth, "A0" in two-digit hexadecimal numeral for the year 2060, and "A9" in two-digit hexadecimal numeral for the year 2069.

The third read processing part 28b-2 feeds Christian calendar year information converted by the second conversion part 28b-1, as Christian calendar year information constituting the file format data requested to be read, to the application processing part 9.

Incidentally, when the application processing part 9 writes data to the memory part 7, the data, together with four-digit Christian calendar year/time information from the RTC constituted by e.g., the register within the client unit 2, are recorded in a file through the control by the file access control part 28.

In the same manner as the first embodiment described hereinbefore, when interrupt occurrence factor information is contained in Christian calendar year information constituting file format data in the memory part 7 read by the application processing part 9, the restoration processing part 10 restores it to four-digit Christian calendar year information through the interrupt processing.

More specifically, when interrupt occurrence factor information is contained in read intra-file Christian calendar year information upon, e.g., the comparison of Christian calendar year information through the processing within the application processing part 9, there occurs interrupt processing by the restoration processing part 10, thereby allowing a restoration to four-digit Christian calendar year information. In other words, the application processing part 9 distinguishes between the years 1900s and 2000s even when it manages only lower two digits of Christian calendar year information.

Figure 16:
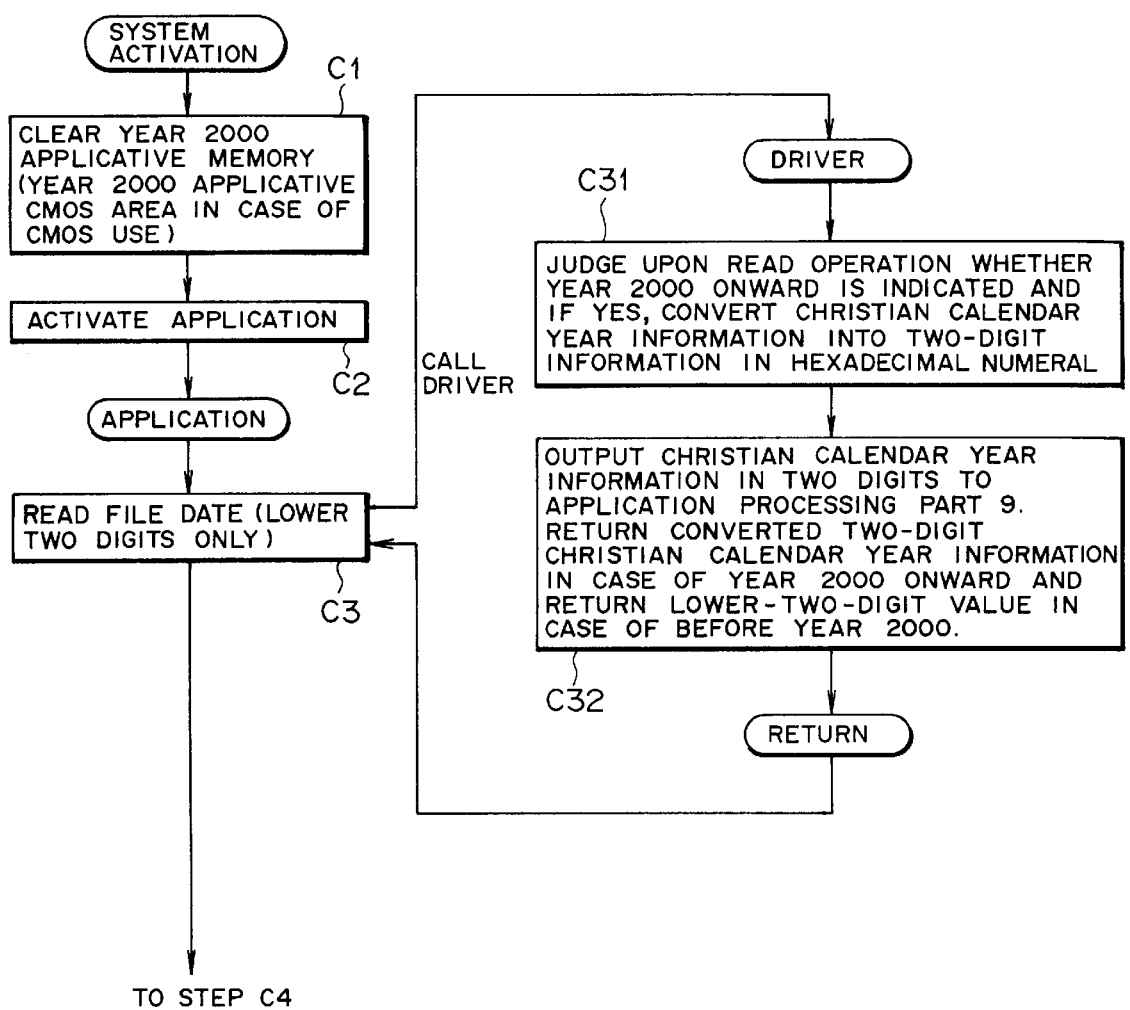
FIGS. 16 and 17 are flowcharts for explaining the operation of the third embodiment of the present invention.

Referring to flow charts of FIGS. 16 and 17, description will be made of the operation of a third embodiment of the present invention having the above configuration.

First, when a client server system in accordance with the third embodiment is activated, various programs are developed as described hereinbefore into the main storage 4 in the information processing unit 22 serving as a client unit, allowing a migration to a program running status. At that time, there is cleared a predetermined area on a memory such as a CMOS, which is utilized to distinguish between the years 1900s and 2000s (step C1 in FIG. 16).

When the information processing unit 22 is initialized, a desired application is activated (step C2), allowing the application processing part 9 to become operative.

At that time, when through the processing by the application processing part 9 there occurs a read of Christian calendar year/date information of a file stored in the memory part 7 (a request to read a file from the memory part 7) (step C3), the file access control part 28 serving as a driver is put into operative condition.

If it is judged in the judgment part 8a of the file access control part 28a that as a result of a read of Christian calendar year/date information of the file stored in the memory part 7 it indicates the year 2000 onward, then the second conversion part 28b-1 of the read Christian calendar year information output part 28b converts four-digit Christian calendar year information within the file requested to be read by the application processing part 9, into two-digit Christian calendar year information (hexadecimal numeral) containing interrupt occurrence factor information. The third read processing part 28b-2 sends this conversion result as read Christian calendar year information to the application processing part 9 (step C32).

Figure 17:
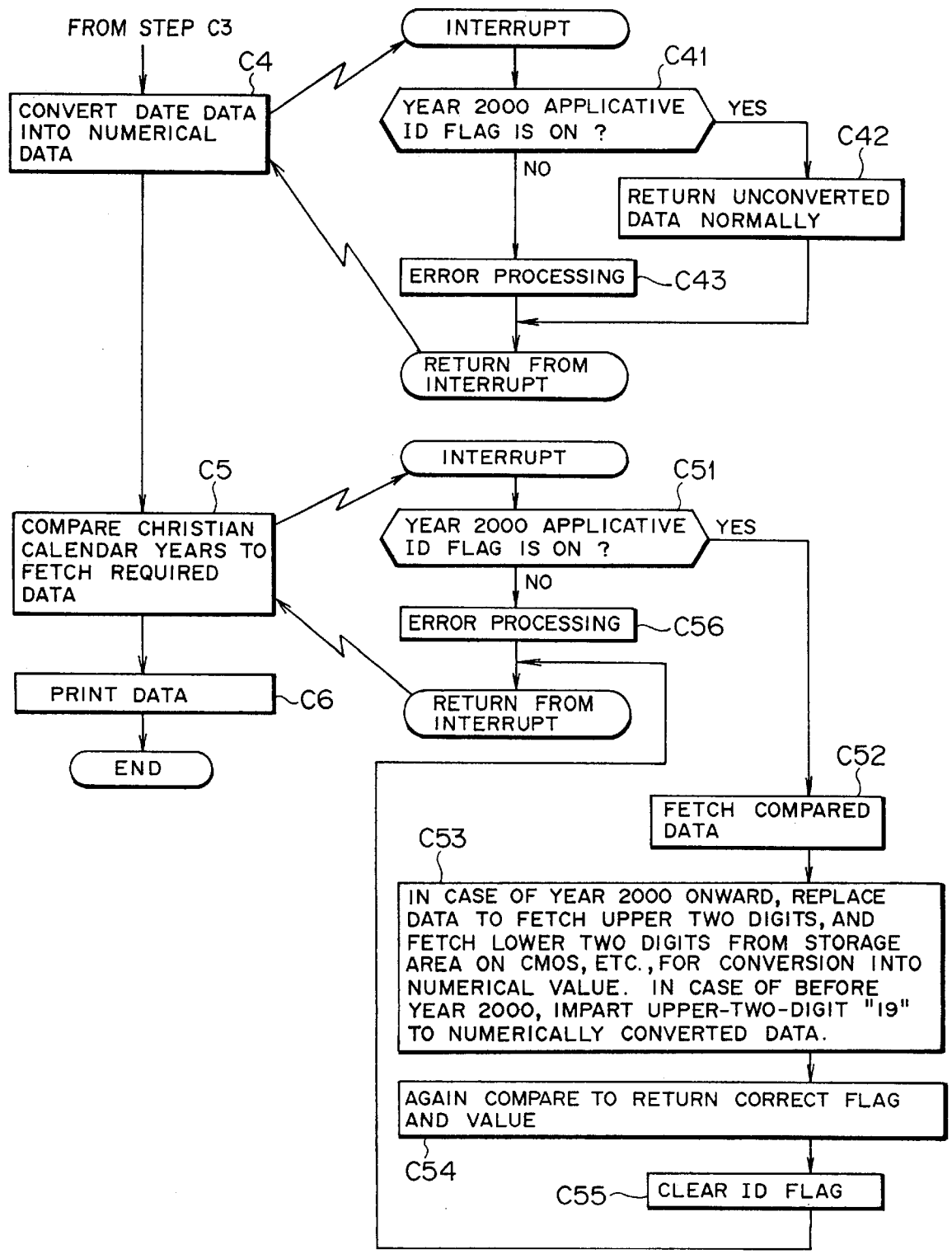

When the application processing part 9 reads Christian calendar year/date information of the file as described above, an instruction is issued to convert the read two-digit Christian calendar year information into numerical data (step C4 in FIG. 17).

In cases where interrupt occurrence factor information is contained in two-digit Christian calendar year information to be converted, there occurs an interrupt action to judge whether the interrupt occurrence factor information indicates that Christian calendar year information of the read file is indicative of the year 2000 onward (step C41).

If the interrupt occurrence factor information contained in the two-digit Christian calendar year information indicates that the read Christian calendar year information is indicative of the year 2000 onward, then intact unconverted data are normally returned to the application processing part 9, allowing a return from the interrupt (from step C41 via YES route to step C42). On the contrary, if the interrupt occurrence factor information contained in the two-digit Christian calendar year information does not indicate that the read Christian calendar year information is indicative of the year 2000 onward, then error processing is performed before a return from the interrupt processing is effected (from step C41 via NO route to step C43).

After the conversion of Christian calendar year/date information into numerical data, the application processing part 9 subjects the Christian calendar year information obtained as a result of conversion to comparison processing between a plurality of pieces of Christian calendar year information (data) through the subsequent processing (step C5).

If interrupt occurrence factor information is contained in the Christian calendar year information to be compared, the procedure goes to interrupt processing by the restoration processing part 10.

That is, if interrupt occurrence factor information contained in the Christian calendar year information indicates that the Christian calendar year information read from the file is indicative of the year 2000 onward (from step C51 to YES route), then the restoration processing part 10 fetches a plurality of pieces of Christian calendar year information compared (step C52) to convert and restore each Christian calendar year information to original four-digit Christian calendar year information (step C53).

More specifically, in cases where Christian calendar year information extracted for comparison contains interrupt occurrence factor information indicative of the year 2000 onward, two-digit Christian calendar year information containing this interrupt occurrence factor information is converted into original four-digit Christian calendar year information. On the contrary, in cases where Christian calendar year information extracted for comparison does not contain interrupt occurrence factor information indicative of the year 2000 onward, this Christian calendar year information is lower-two-digit Christian calendar year information constituting Christian calendar year information on a year before the year 2000, which can be uniquely converted into four-digit Christian calendar year information.

Thus, through the generation of four-digit Christian calendar year information from the upper-two-digit and lower-two-digit Christian calendar year information described above, it is possible for the restoration processing part 10 to restore read Christian calendar year information provided with interrupt occurrence factor information into four-digit Christian calendar year information.

After the restoration of compared Christian calendar year information into four-digit Christian calendar year information as described above, a comparison is again made to return a correct value, flag and comparison result to the application processing part 9. The identification flag is cleared and then a return from the interrupt processing is effected, allowing the procedure to return to the application processing part 9 (steps C54 and C55).

In cases where interrupt occurrence factor information contained in Christian calendar year information subjected to Christian calendar year comparison processing by the application processing part 9 does not indicate that the read Christian calendar year information is indicative of the year 2000 onward, there occurs an interrupt for error processing, to thereafter allow a return from the interrupt processing (from step C51 via NO route to step C56).

In cases where all of the Christian calendar year information subjected to Christian calendar year comparison processing by the application processing part 9 is associated with years before the year 2000, the read lower-two-digit Christian calendar year information can be specified to be Christian calendar year information on the years 1900s, thereby making it possible to perform the comparison processing without needing any additional processing.

Afterwards, the application processing part 9 prints, if necessary, application processing results such as Christian calendar year comparison results (step C6).

According to the third embodiment of the present invention in this manner, by virtue of the provision of the file access control part 28 and the restoration processing part 10, when Christian calendar year information within a file or imparted to the file is managed in four digits and Christian calendar year information for application processing is processed in two digits, it is possible for the application processing part 9 to distinguish between the year 2000 and the year 1900 while performing the application processing using lower-two-digit Christian calendar year information, thus advantageously making it possible to use intactly lower-two-digit data in the application software which has been hitherto used, without any alteration, even after the year 2000 has been reached.

(c1) Description of Variant of Third Embodiment

Figure 18:
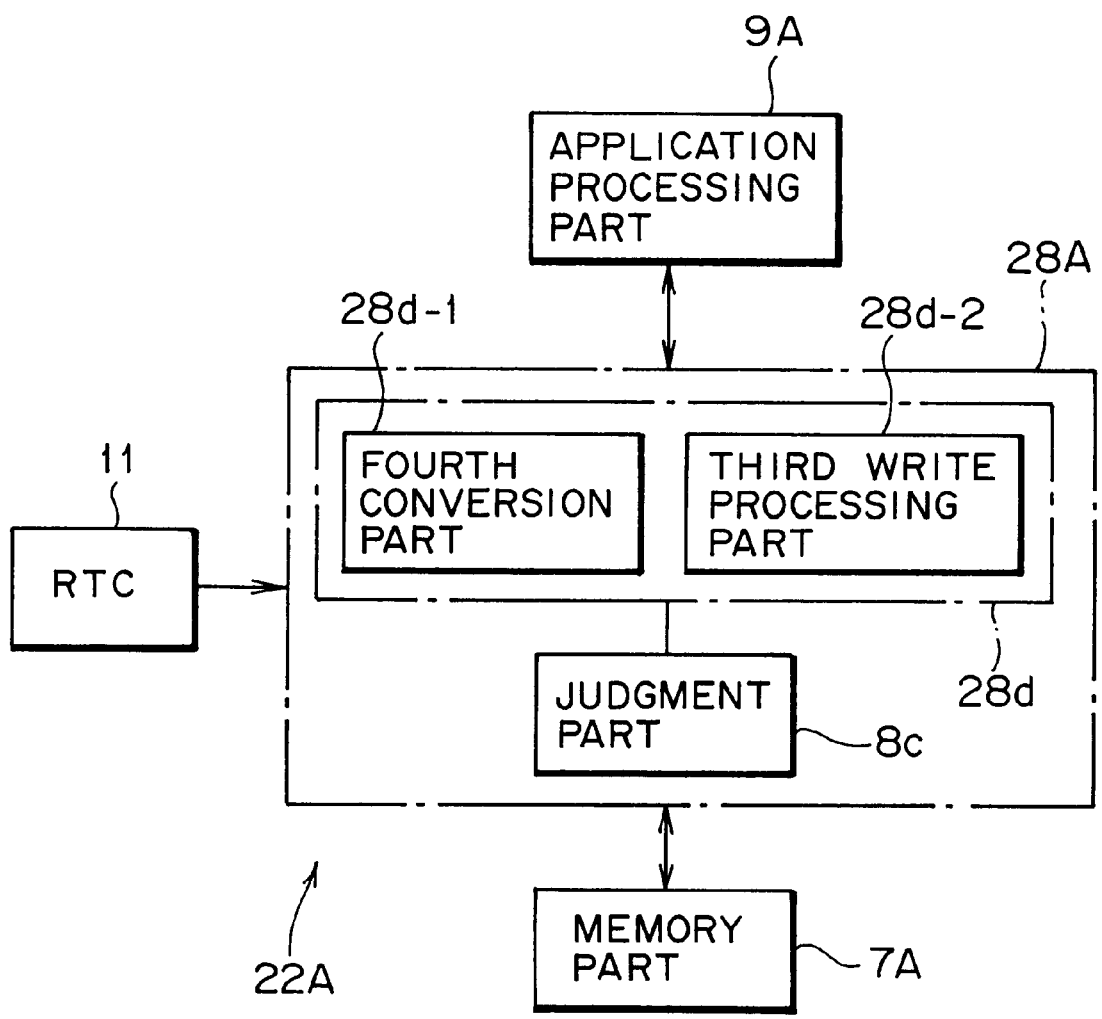
FIG. 18 is a block diagram showing an information processing unit serving as a client unit in accordance with a variant of the third embodiment of the present invention.

Although in the third embodiment there has been described in detail the configuration of the information processing unit for distinguishing between the years 1900s and 2000s when the file access control part 28 reads four-digit Christian calendar year information within a file, which in turn is subjected as lower-two-digit Christian calendar year information to comparison processing or the like by the application processing part 9, the information processing unit may be configured as shown in FIG. 18 to distinguish between the year 1900s and 2000s when two-digit Christian calendar year information within the file is read from the memory 7A and is subjected as four-digit Christian calendar year information to the comparison processing or the like by the application processing part 9A.

FIG. 18 is a block diagram showing an information processing unit serving as a client unit in accordance with a variant of the third embodiment of the present invention. The information processing unit 22A shown in FIG. 18 comprises the memory part 7A, a file access control part 28A and the application processing part 9A, as well as the RTC (Real Time Clock) 11. (The RTC 11 is not visible in FIG. 18).

Excepting the file access control part 28A, the information processing unit 22A shown in FIG. 18 has basically the same configuration as that of the information processing units of FIGS. 5 and 13 described above. In FIG. 18, the same reference numerals as those in FIGS. 5 and 13 designate the same parts.

The file access control part 28A writes/reads file format data to/from the memory part 7A in response to a request from the application processing part 9A, and includes the judgment part 8c and a write Christian calendar year information output part 28d.

In the same manner as that in the client unit 2A shown in FIG. 5 described above, when the judgment part 8c accepts a request to write four-digit Christian calendar year information generated by the RTC 11 from the application processing part 9A (a request to write a file to the memory part 7A), it judges whether that four-digit Christian calendar year information is indicative of the year 2000 onward or not.

When it is judged in the judgment part 8c that the four-digit Christian calendar year information requested to be written is indicative of the year 2000 onward, the write Christian calendar year information output part 28d generates Christian calendar year information having interrupt occurrence factor information and outputs it as write Christian calendar year information. The write Christian calendar year information output part 28d includes a fourth conversion part 28d-1 and a third write processing part 28d-2.

The fourth conversion part 28d-1 converts the four-digit Christian calendar year information requested to be written, into two-digit Christian calendar year information containing interrupt occurrence factor information as identification information, and the third write processing unit 28d-2 writes Christian calendar year information converted by the fourth conversion part 28d-1 into the memory part 7A.

Due to such a configuration, when the file access control part 28A of the client unit 22A shown in FIG. 18 accepts a request to write Christian calendar year information from the application processing part 9A, it converts four-digit Christian calendar year information generated by the RTC 11 into two-digit Christian calendar year information (containing interrupt occurrence factor information) and writes it as write data to the memory part 7A.

Then, the judgment part 8c of the file access control part 28A judges whether the four-digit Christian calendar year information from the RTC 11 is indicative of the year 2000 onward. Furthermore, when it is judged in the judgment part 8c that four-digit Christian calendar year information is indicative of the year 2000 onward, the fourth conversion part 28d-1 of the write Christian calendar year information output part 28d converts that four-digit Christian calendar year information into two-digit information containing interrupt occurrence factor information, and the third write processing part 28d-2 writes the thus converted Christian calendar year information to the memory part 7A.

Afterwards, in cases where the application processing part 9A reads a file written to the memory part 7A as described above, the file access control part 28A reads Christian calendar year information within that file in the memory part 7A as it is for the output as read Christian calendar year information.

Although it is possible for the application processing part 9A to read Christian calendar year information on the year 2000 onward from a file, this Christian calendar year information contains the above interrupt occurrence factor information so that it can be converted and restored to its original four-digit Christian calendar year information through the interrupt processing by the restoration processing part 10 in the same manner as in the third embodiment descried above.

Thus, in this case also, like the variants of the first and second embodiments described above, by virtue of the provision of the file access control part 28A and the restoration processing part 10, when Christian calendar year information within a file or imparted to the file is managed in two digits and Christian calendar year information for application processing is processed in four digits, it is possible for the application processing part 9A to process lower-two-digit Christian calendar year information written to the file while distinguishing between the year 2000 and the year 1900, thereby advantageously making it possible to use intactly the application software which has been hitherto used, without any alteration, even after the year 2000 has been reached.

(d) Description of Fourth Embodiment

Figure 19:
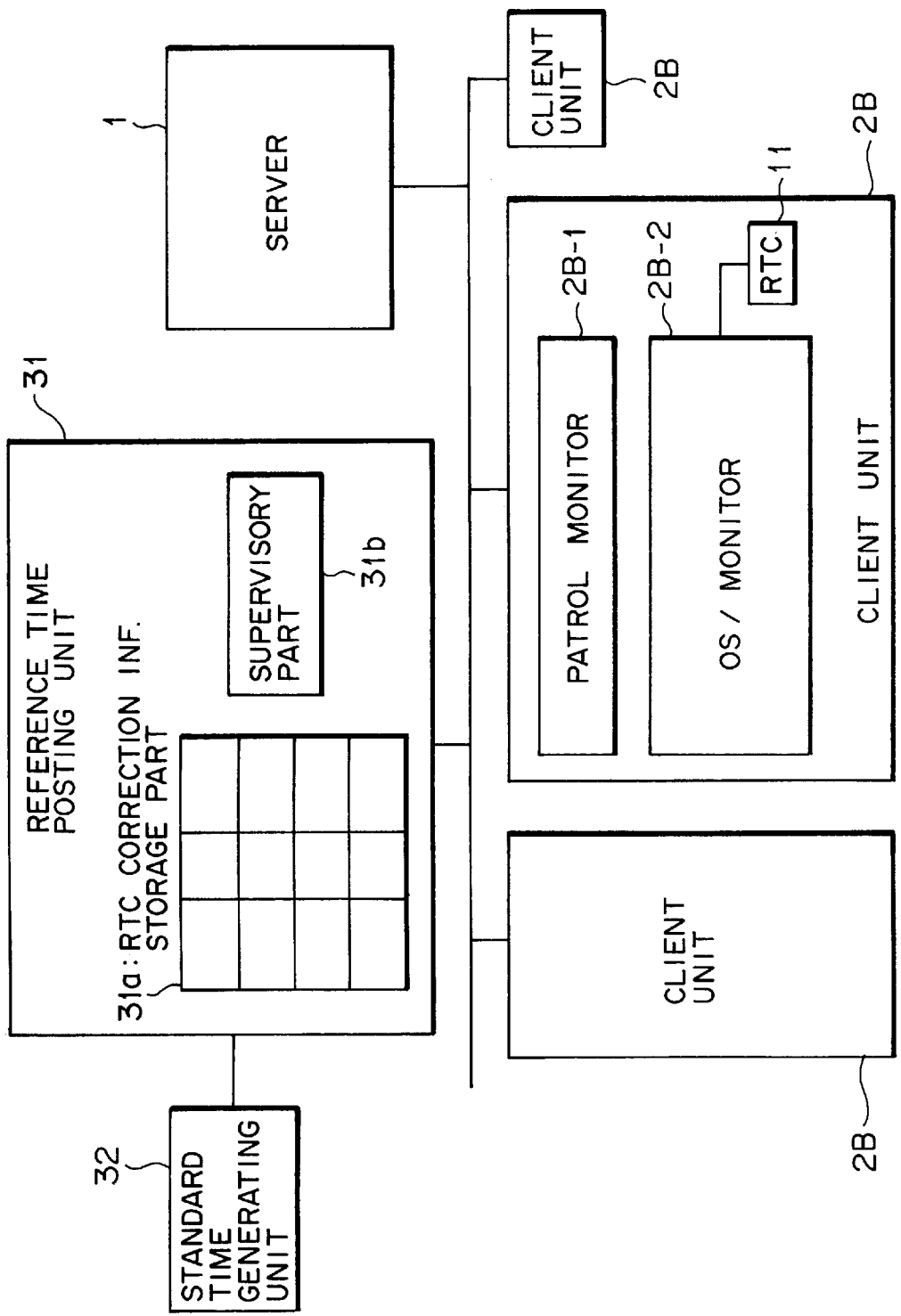
FIG. 19 is a block diagram showing a client server system serving as an information processing system in accordance with a fourth embodiment of the present invention.

FIG. 19 is a block diagram showing a client server system acting as an information processing system in accordance with a fourth embodiment of the present invention. In the same manner as the first embodiment, the information processing system shown in FIG. 19 comprises a server unit 1 and a plurality of client units (information processing units) 2B housed in the server unit 1. The server unit 1 takes control of a reference time posting unit 31 and a standard time generating unit 32.

All these server unit 1, client unit 2B and supervisory unit 31 may be constituted as hardware for instance by personal computers each comprising a CPU, a main storage and a disk unit 6.

The information processing system in accordance with the fourth embodiment is similar to that of the first embodiment as described hereinbefore in that each client unit 2B functions as an information processing system for solving the so-called year 2000 problem on Christian calendar year information imparted to a file (or constituting data within the file) for use in information processing, but differs from that of the first embodiment described earlier in that it has a mechanism for supervising time lag of the RTC 11 itself within each client unit 2B.

The reference time posting unit 31 fetches Christian calendar year/date information as reference time generated by the standard time generating unit 32 and posts each client unit 2B on the Christian calendar year/date information as the reference time, which acts as information for supervising and automatically correcting abnormality in Christian calendar year/date information generated by the RTC 11 serving as Christian calendar year/date information generation part in each client unit 2B. The reference time posting unit 31 includes from functional viewpoint an RTC correction information storage part 31a and a supervisory part 31b.

The RTC correction information storage part 31a stores in the form of a table the information for correcting Christian calendar year/date information generated by the RTC 11 of each client unit 2B, and serves as an abnormality occurrence timing storage part for previously storing therein information on timing at which abnormality occurs in the Christian calendar year/date information generated by the RTC 11 of each client unit 2B.

As shown in FIG. 20 in detail, the RTC correction information storage part 31a stores for each client unit 2B number (machine No.) year 2000 problem correction information 31a-1, leap year problem correction information 31a-2, date correction wanted/unwanted information 31a-3, date correction information 31a-4, time correction wanted/unwanted information 31a-5 and time correction information 31a-6.

The year 2000 problem correction information 31a-1 is used to distinguish between the years 2000s and 1900s about Christian calendar year/date information generated by the RTC 11. As will be described later, upon a receipt of the year 2000 problem correction information 31a-1 stored in the RTC correction information storage part 31a, it is possible for the client unit 2B having the RTC 11 for managing Christian calendar years in lower two digits to distinguish between the years 2000s and 1900s about the Christian calendar year/date information from the RTC 11.

The leap year problem correction information 31a-2 is used to correct an error caused by the leap year in Christian calendar year/date information generated by the RTC 11 described above. As will be described later, upon a receipt of the leap year problem correction information 31a-2 stored in the RTC correction information storage part 31a, it is possible for the client unit 2B having the RTC 11 which does not deal with the leap year (date information gains by one day every four years) to correct the RTC 11 so as to correspond to the leap year.

The date correction wanted/unwanted information 31a-3 is used to identify whether or not date information is to be corrected at certain intervals (e.g., date information to be corrected at the turn of the month) from the nature intrinsic to the RTC 11 itself in each client unit 2B. The date correction information 31a-4 indicates intervals (periods) at which date correction is to be made based on the date correction wanted/unwanted information 31a-3.

The time correction wanted/unwanted information 31a-5 is used to identify whether or not time information is to be corrected at certain intervals from the nature such as reliability of the RTC11 itself in each client unit 2B. The time correction information 31a-6 indicates intervals at which time correction is to be made based on the time correction wanted/unwanted information 31a-5.

The supervisory part 31b supervises the state of the RTC 11 in each client unit 2B, and on the basis of the contents of the RTC correction information storage part 31a, posts each client unit 2B on information for correcting Christian calendar year/date information generated by the associated RTC 11.

The standard time generating unit 32 is constituted as hardware by, e.g., a circuit board or a card-type circuit and is loaded for operation into, e.g., an expansion slot or a card slot not shown in the client unit 2B.

The client unit 2B has a configuration for solving the so-called year 2000 problem on Christian calendar year information imparted to a file (or constituting data within the file), similar to the first embodiment described above, and has a corrective function for correcting its own RTC 11 on the basis of post information from the supervisory part 31b of the above reference time posting unit 31.

In other words, while each client unit 2B in accordance with the fourth embodiment also includes functional parts (see reference numerals 7 to 10 in FIG. 1) similar to those of the client unit 2 in the first embodiment described above, it further includes from the viewpoint of the above corrective function, a patrol monitor 2B-1 and an OS/monitor 2B-2 shown in FIG. 19.

Figure 25:
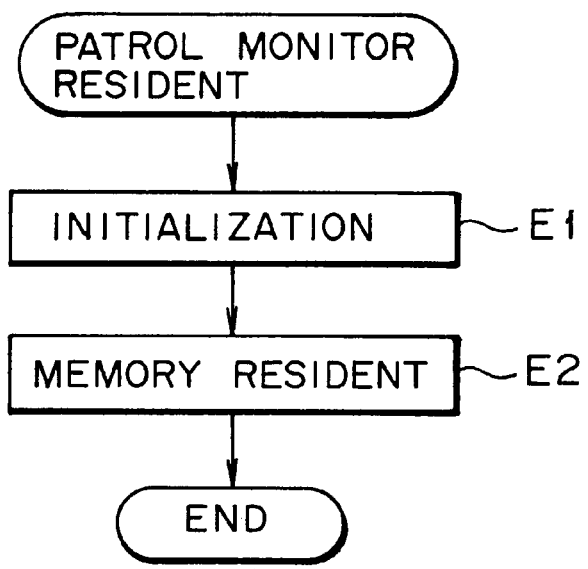

The patrol monitor 2B-1 sends/receives information to/from the above-described reference time posting unit 31. A program for implementing the function as the patrol monitor may be initialized upon the drive of the client unit 2B and thereafter be resident in a memory not shown (see steps E1 and E2 in FIG. 25).

Figure 26:
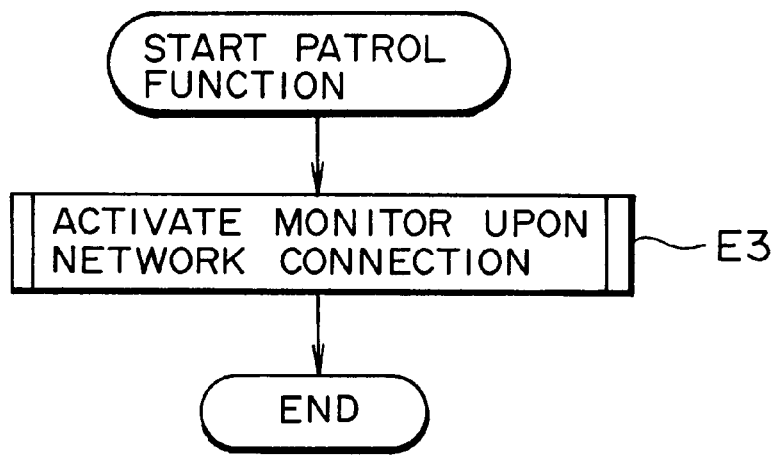

When the client unit 2B is connected to a network as the information processing system in accordance with the fourth embodiment, the patrol monitor 2B-1 activates the OS/monitor 2B-2 (see step E3 in FIG. 26).

The OS/monitor 2B-2 corrects the RTC 11 on the basis of post information received through the patrol monitor 2B-1, and updates or deletes via the patrol monitor 2B-1 the RTC correction information on its own unit stored in the RTC correction information storage part 31a of the reference time posting unit 31.

In the case of the client units 2B located at sites having different standard time from each other, it is possible for the OS/monitor 2B-2 of each client unit 2B to correct Christian calendar year/date information generated by the RTC 11, taking into consideration a difference in time between post information from the reference time posting unit 31 (standard time from the standard time generating unit 32) and the standard time at the site where it is located.

In other words, each client unit 2B is so configured that the reference time on which the reference time posting unit 31 posts it corresponds to the reference time of the country in which that unit is located.

It is also possible to collectively hold within the RTC correction information storage part 31a differences in time between the standard time at sites where the client units 2B lie and the standard time generated by the standard time generating unit 32, so that there can be obtained post information from the supervisory part 31b allowing for the differences in time depending on the sites where the client units 2B are arranged.

Referring to flowcharts shown in FIGS. 21 to 29, description will be made hereinbelow of the operation of the information processing system in accordance with the fourth embodiment of the present invention having the above configuration.

Figure 21:
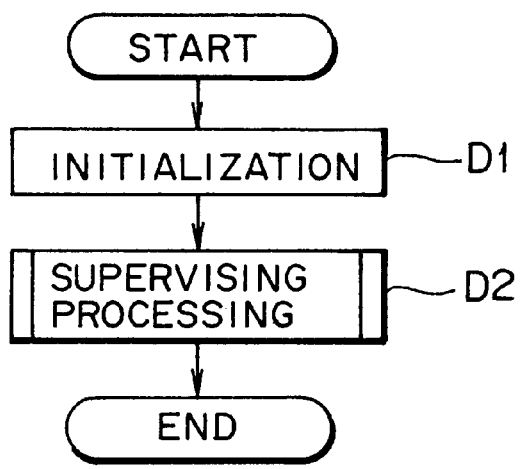
FIGS. 21 to 29 are flowcharts for explaining the operation of the information processing system in accordance with the fourth embodiment of the present invention.

In the former step in which the supervisory part 31b of the reference time posting unit 31 supervises the condition of the RTC 11 of each client unit 2B from the content stored in the RTC correction information storage part 31a, initialization is carried out including registration of RTC correction information for each client unit 2B connected to the server unit 1, into the RTC correction information storage part 31a (step D1 in FIG. 21).

Figure 22:
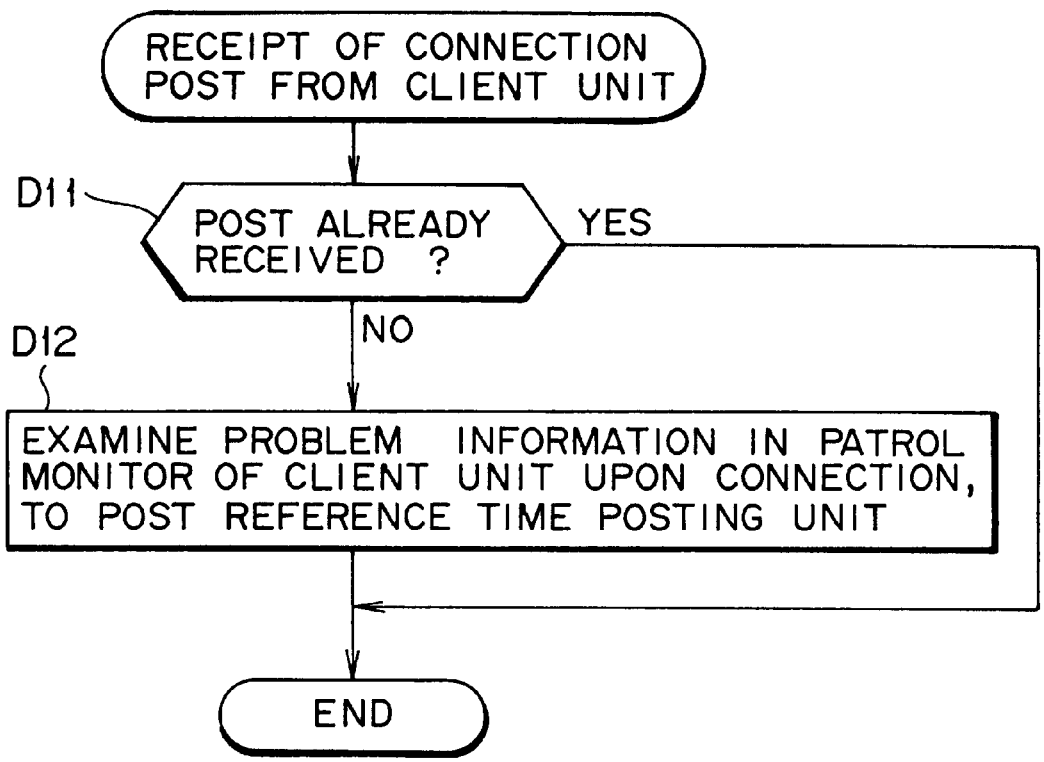

Upon a request from a client unit 2B for the connection to the server unit 1, as shown in FIG. 22, if the RTC correction information storage part 31a does not store therein RTC correction information to be used for the correction of the RTC 11 in that client unit 2B (from step D11 to NO route), then the reference time posting unit 31 is posted by the patrol monitor 2B-1 of that client unit 2B on the problem information which may cause any abnormality in the RTC 11 (step D12).

Figure 27:
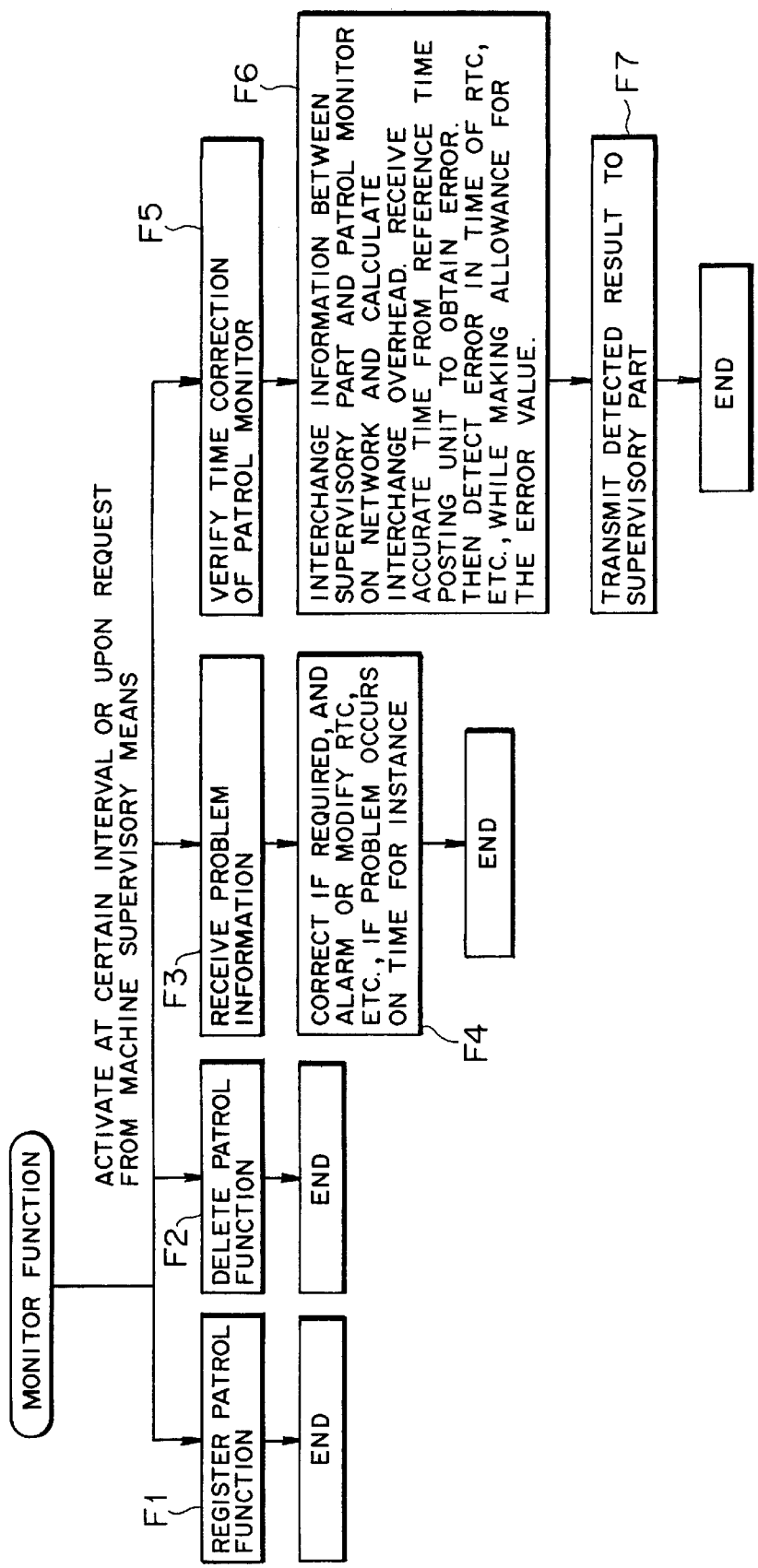
Figure 28:
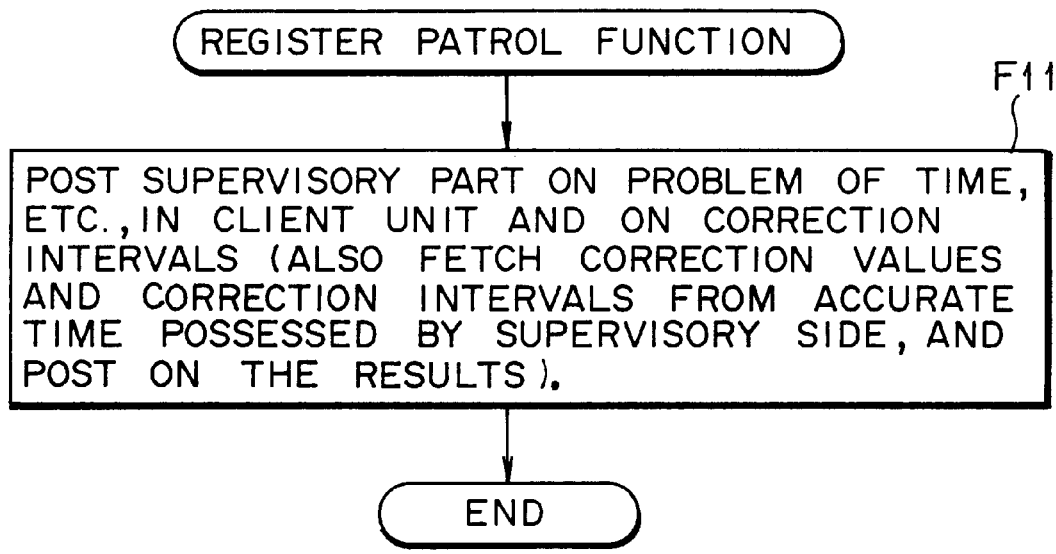

In other words, when the Christian calendar year/time corrective function (patrol function) by the client unit 2B is registered into the reference time posting unit 31, the OS/monitor 2B-2 posts the supervisory part 31b of the reference time posting unit 31 via the patrol monitor 2B-1 on RTC correction information to be used for the correction of the RTC 11 in that client unit 2B (see step F1 in FIG. 27 and step F11 in FIG. 28).

At that time, when the supervisory part 31b is posted on Christian calendar year/date information generated by the associated RTC 11, it calculates a difference between the Christian calendar year/date information and standard time generated by the standard time generating unit 32, so that the difference can be registered as the above-described date correction information 31a-4 or the time correction information 31a-6.

After the registration of RTC correction information on the RTC 11 of the client unit 2B connected to the server unit 1 into the RTC correction information storage part 31a in this manner, the supervisory part 31b supervises the RTC 11 of each client unit 2B on the basis of the RTC correction information stored in the RTC correction information storage part 31a (step D2 in FIG. 21).

Figure 24:
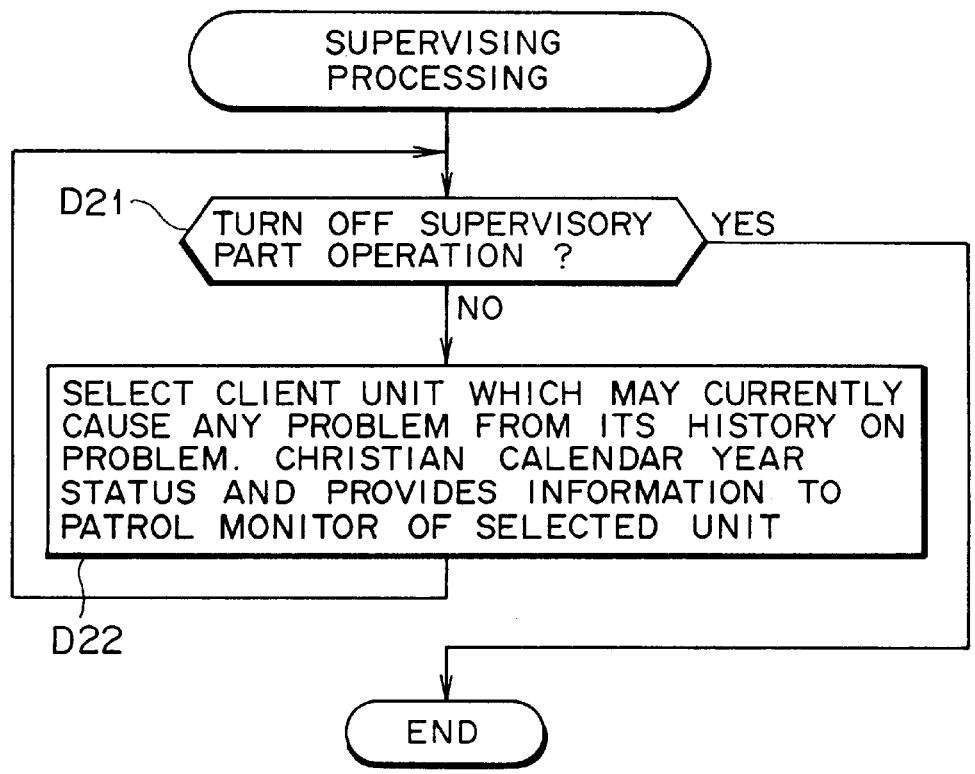

That is, as shown in FIG. 24, if the supervisory part 31b is put in operative condition (from step D21 to NO route), it selects a client unit 2B in which a problem is currently likely to occur (it is anticipated that abnormality may occur in Christian calendar year/date information generated by the RTC 11) on the basis of the standard time from the standard time generating unit 32 and of the content stored in the RTC correction information storage part 31a, and posts the patrol monitor 2B-1 of the thus selected client unit 2B on information for correcting Christian calendar year/date information (step D22).

After a receipt of the post information (problem information) from the supervisory part 31b, as shown in FIG. 27, the OS/monitor 2B-2 of the client unit 2B performs, on the basis of the post information received via the patrol monitor 2B-1 (step F3), a correction when the RTC 11 is corrected but an alarm display when only alarm is effected (step F4).

The OS/monitor 2B-2 calculates an overhead (a difference between time information on which the supervisory part 31b posts and time information at the time of correction by the OS/monitor 2B-2 after the receipt by the patrol monitor 2B-1 of information transmitted from the supervisory part 31b) required for the interchange of information between the supervisory part 31b and the patrol monitor 2B-1, and allows for this overhead when correcting the RTC 11 on the basis of subsequent post information from the supervisory part 31b (steps F5 and F6).

In cases where the client unit 2B which has received post information is located at a site (or in a country) where time elapses with a standard time different from the standard time generated by the standard time generating unit 32, the OS/monitor 2B-2 corrects Christian calendar year/date information generated by the RTC 11 while allowing for a difference in time between post information from the reference time posting unit 31 (standard time from the standard time generating unit 32) and the standard time at the site where it is located.

Thus, the supervisory part 31b supervises abnormality of the Christian calendar year/date information generated by the RTC 11 on the basis of timing information at which abnormality occurs in Christian calendar year/date information generated by the RTC 11, which has been stored in the RTC correction information storage part 31a, enabling the OS/monitor 2B-2 to correct this abnormality (step F7).

As a result of this, the user of each client unit 2B need not perform adjustment of time by the RTC 11 each time the user moves, and even though the user uses a file without becoming conscious of the accuracy of time obtained by the RTC 11 there is no occurrence of abnormality of the RTC 11 attributable at least to the content stored in the RTC correction information storage unit 31a, thus suppressing error in control about the Christian calendar year and time to a minimum.

Figure 23:
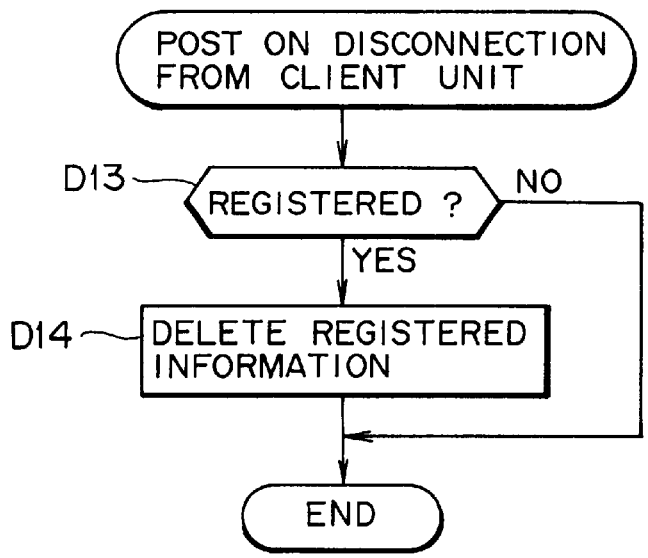

Afterward, when there occurs a request to release the connection from a client unit 2B connected to the server unit 1, as shown in FIG. 23, if the RTC correction information storage part 31a holds RTC correction information to be used upon the correction of the RTC 11 in that client unit 2B (from step D13 to YES route), then that RTC correction information is deleted (step D14).

Figure 29:
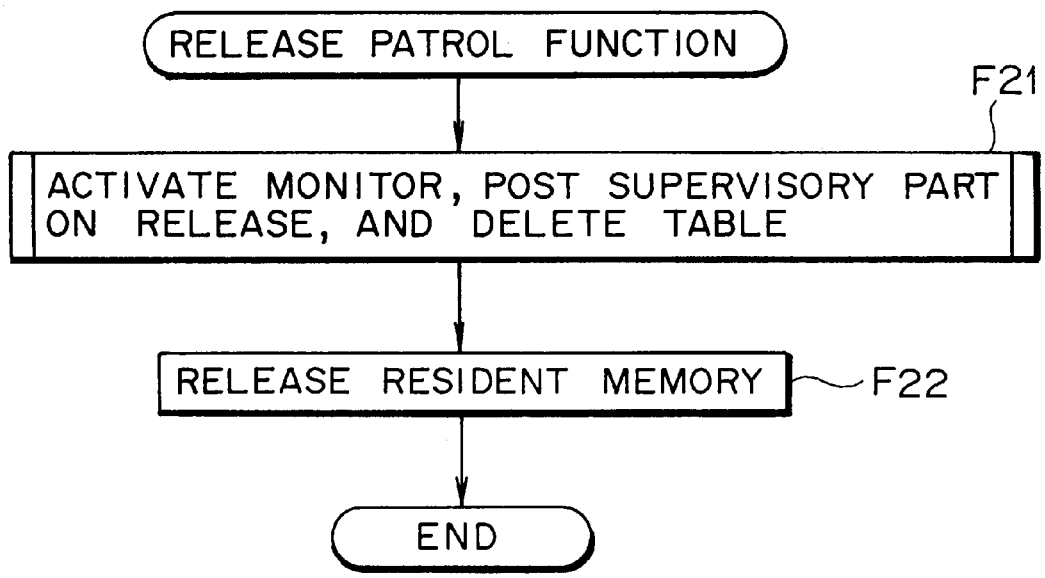

In other words, when a client unit 2B connected to the server unit 1 issues a request to release the connection, the OS/monitor 2B-2 posts the supervisory part 31b to free the RTC correction information held in the RTC correction information storage part 31a in that client unit 2B, while simultaneously releasing the function of the patrol monitor 2B-1 which is resident in a memory not shown within the client unit 2B (see step F2 in FIG. 27 and steps F21, F22 in FIG. 29).

Thus, in addition to the same advantages as those achieved by the embodiments described hereinabove, the information processing system in accordance with the fourth embodiment of the present invention has the following advantages. That is, it is possible for the reference time posting unit 31 to post a client unit 2B on periodic abnormality in Christian calendar year/date information which may occur in the RTC 11 of that client unit 2B, thereby making it possible to deal with not only the so-called year 2000 problem and the leap problem but also with the correction for summer time or winter time on country-to-country or state-to-state basis, without becoming conscious of the unit hardware specifications, software versions, etc., as well as ensuring, even when the user uses a client unit 2B while moving frequently between sites having different standard time, an easy time control in conformity with the standard time at that site (in respective countries).

Furthermore, by virtue of having a mechanism to automatically correct errors in time possessed by the RTC 11 of the client unit 2B, it is possible to operate an accurately time conscious system, thus contributing to data processing or data compensation through accurate utilization of time while simultaneously preventing any breakage of file which may be attributable to time.

It is to be appreciated that the reference time posting unit 31 may be so set as to post, as a single universal time, on time generated by the standard time generating unit 32 so that there can be eliminated a necessity to become conscious of the standard time at a site where the client unit 2B is used, as well as a necessity to allow for a difference in time when the user moves to another site having different standard time set, thereby enhancing the convenience of the operators.

Furthermore, the above-described reference time posting unit 31 can be arranged on a network, so that it is possible to architect a system which remote supervises the RTC 11 of each client unit 2B on the network with accurate time consciousness, in conformity with the site where each client unit 2B lies.

(e) Description of Fifth Embodiment

Figure 30:
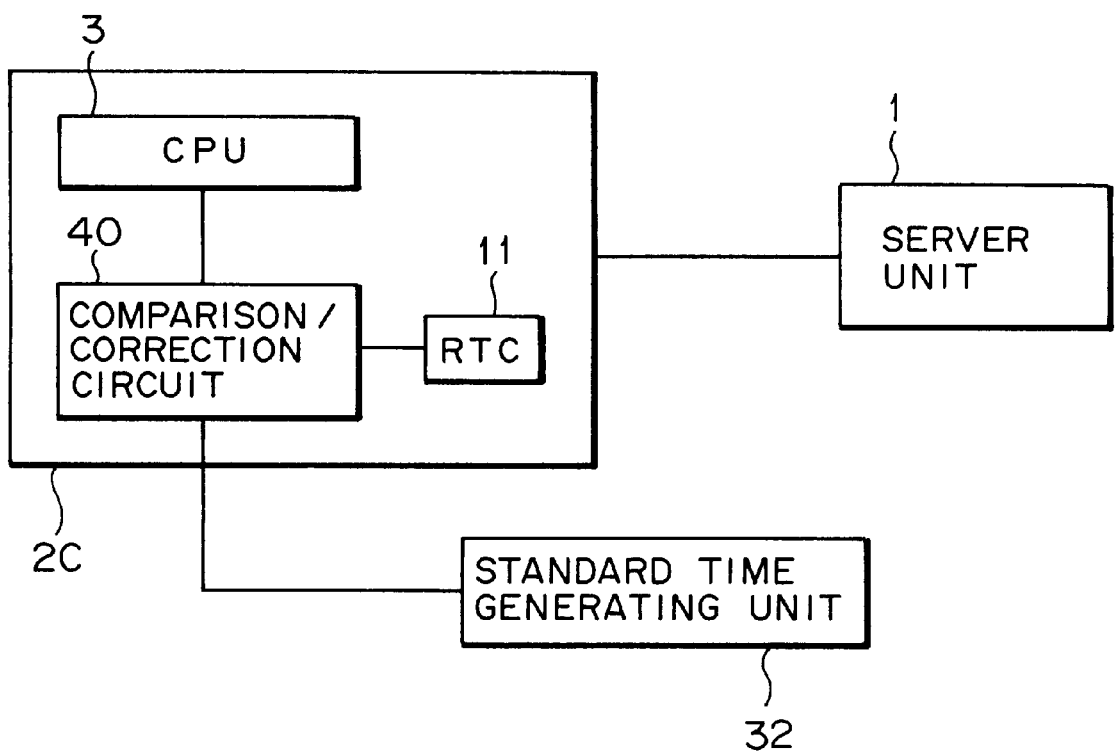
FIG. 30 is a block diagram showing a client server system using as its client unit an information processing unit in accordance with a fifth embodiment of the present invention.

FIG. 30 is a block diagram showing a client server system to which an information processing unit in accordance with a fifth embodiment of the present invention is applied as a client unit. In the same manner as the embodiments described hereinabove, the system of FIG. 30 also comprises the server unit 1 and a plurality of client units 2C accommodated within the server unit 1.

Each client unit 2C differs from the above embodiments in that it is provided with a mechanism for supervising a time difference of the RTC 11 itself within the client unit 2C, on the basis of the standard time in the client unit 2C.

That is, in the same manner as the first embodiment described above, the client unit 2C in accordance with the fifth embodiment is constituted as hardware by the CPU 3, the main storage (not shown), etc. From the aspect of the function of the present invention in particular, as shown in FIG. 30, it comprises, in addition to the CPU 3, the RTC 11 and a comparison/correction circuit 40, as well as the standard time generating unit 32 connected to the comparison/correction circuit 40.

The standard time generating unit 32 and the comparison/correction circuit 40 are constituted as hardware by circuit boards, card-type circuits, etc., and are loaded for operation into an expansion slot, a card slot, etc., not shown in the client unit 2C.

The RTC 11 functions as Christian calendar year/date information generation part for generating most recent Christian calendar year/date information on the basis of an internal clock, and the CPU 3 functions as a processing part which accesses the RTC 11 to fetch current Christian calendar year/date information for desired information processing (for instance, file write/read processing as shown in the first to third embodiments described earlier).

Figure 31:
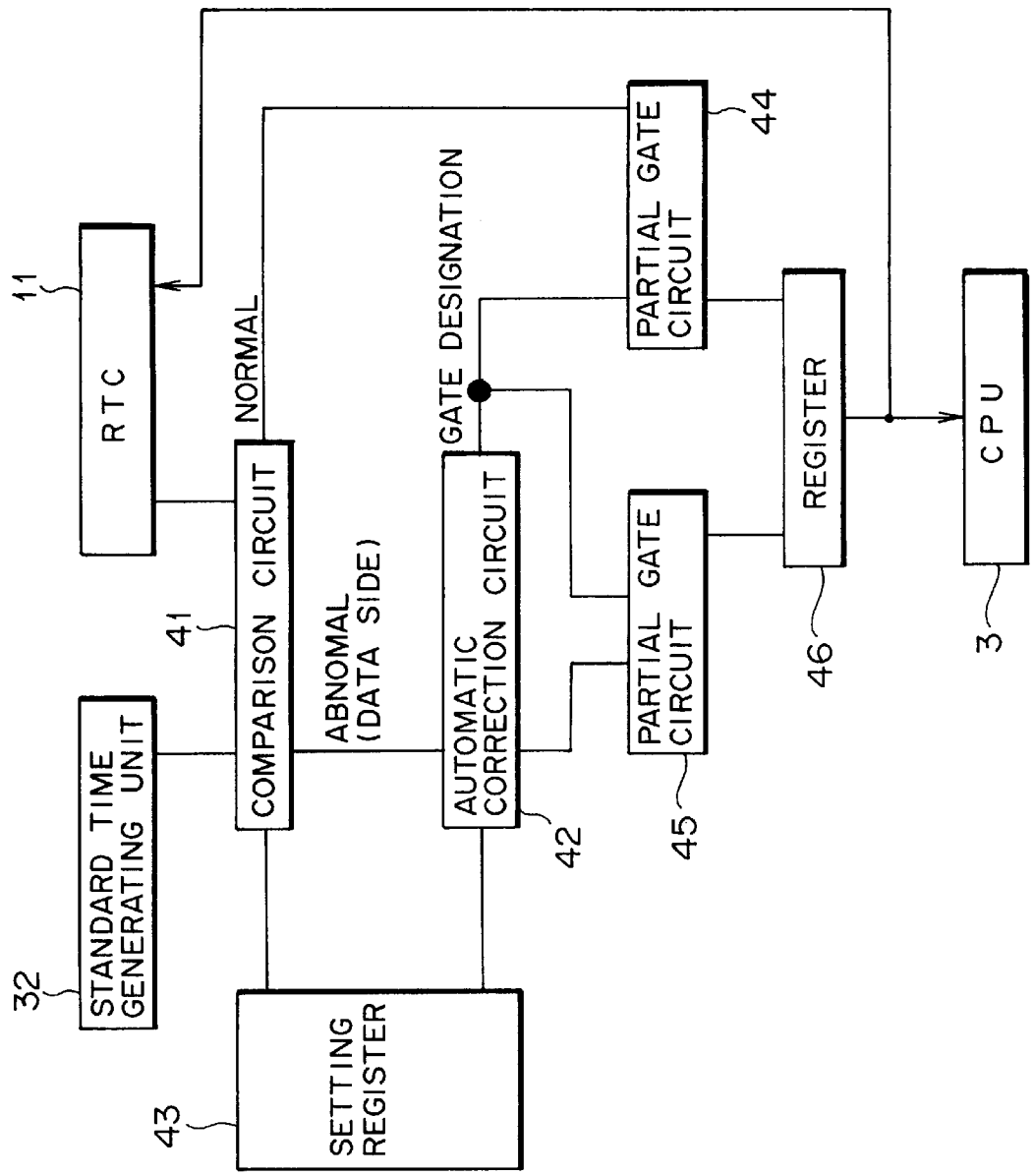
FIG. 31 is a block diagram showing a principal part of the information processing unit in accordance with the fifth embodiment of the present invention.

The standard time generating unit 32 is connected externally to the client unit 2C to generate the standard time at a site (or in a country) where the client unit 2C is located, while the comparison/correction circuit 40 supervises Christian calendar year/date information generated by the RTC 11 and is configured as shown in FIG. 31 in detail.

The comparison/correction circuit 40 shown in FIG. 31 includes a comparison circuit 41, an automatic correction circuit 42, a setting register 43, partial gate circuits 44 and 45, and a register 46.

In response to an access to the RTC 11, the comparison circuit 41 compares standard time information fetched from the standard time generating unit 32, with Christian calendar year/date information (including day-of-week information and other information) generated by the RTC 11.

Upon a receipt of abnormal comparison results from the comparison circuit 41, the automatic correction circuit 42 corrects for the output the information obtained as a result of access from the RTC 11 on the basis of the standard time from the standard time generating unit 32 and performs a gate designation for the subsequent gate circuits 44 and 45 on the basis of a value from the setting register 43.

The setting register 43 serves to set the state of the above comparison circuit 41 and automatic correction circuit 42 and enables the objects for comparison in the comparison circuit 41 to be arbitrarily selected from among Christian calendar year, date (day-of-week) and time on the basis of a value set by this setting register 43. Furthermore, by setting the state of the subsequent partial gate circuits 44 and 45 by way of the automatic correction circuit 42, the output values (access results) to the CPU 3 can be either corrected Christian calendar year/date information or alarm information.

The partial gate circuit 44 switches connection/disconnection between the comparison circuit 41 and the register 46, and the partial gate circuit 45 switches connection/disconnection between the automatic correction circuit 42 and the register 46. These partial gate circuits 44 and 45 receive gate designation from the automatic correction circuit 42 to switch the connection/disconnection of the register 46 to the above comparison circuit 41 and automatic correction circuit 42.

For instance, if the partial gate circuit 44 is in the connected state and the partial gate circuit 45 is in the disconnected state, then a result of comparison from the comparison circuit 41 is provided as output to the subsequent register 46, whereas if the partial gate circuit 44 is in the disconnected state and the partial gate circuit 45 is in the connected state, then a result of correction from the automatic correction circuit 42 is provided as output to the subsequent register 46.

The register 46 allows Christian calendar year/date information to be set therein byway of either the partial gate circuit 44 or the partial gate circuit 45, making it possible for the CPU 3 to read directly the thus set Christian calendar year/date information therefrom.

In other words, when the partial gate circuit 44 is in the connected state and the partial gate circuit 45 is in the disconnected state, it is possible for the CPU 3 as a result of access to the RTC 11 to read out an intact value from the register 46 if the RTC 11 is normal but to read alarm information generated by the comparison circuit 41 from the register 46 if the RTC 11 is abnormal.

In the same manner, when the partial gate circuit 44 is in the disconnected state and the partial gate circuit 45 is in the connected state, it is possible for the CPU 3 as a result of access to the RTC 11 to read out an intact value from the register 46 if the RTC 11 is normal but to read out information corrected by the automatic correction circuit 42 from the register 46 if the RTC 11 is abnormal.

Accordingly, the above-descried automatic correction circuit 42, setting register 43, partial gate circuits 44, 45 and register 46 serve in cooperation as a gate circuit which sets the result of access of the CPU 3 to the RTC 11 on the basis of the result of comparison by the comparison circuit 41 and posts the CPU 3.

Due to the above configuration, in the fifth embodiment of the present invention, at the time when the CPU 3 of the client unit 2C has gained access to the RTC 11 (access to the RTC 11 has occurred), the comparison circuit 41 of the comparison/correction circuit 40 compares Christian calendar year/date information from the RTC 11 with the standard time from the standard time generating unit 32.

In cases where the Christian calendar year/date information from the RTC 11 involves any abnormality as a result of comparison in the comparison circuit 41, set into the register 46 as the access result is either Christian calendar year/date information automatically corrected in compliance with the setting of the setting register 43 or alarm information indicating that abnormality has occurred in the Christian calendar year/date information from the RTC 11, and then the CPU 3 is posted on it.

Through addition of simple hardware, according to the fifth embodiment of the present invention in this manner, provision of the comparison/correction circuit 40 makes it possible when the CPU 3 gains access to the RTC 11 to provide as access result the time information corrected to have accurate time based on the standard time while apparently using the RTC 11, so that a system accurately conscious of Christian calendar year, date and time can be operated through the automatic correction in case of occurrence of abnormality in the Christian calendar year/date information generated by the RTC 11. In particular, this will contribute to execution of data processing and data compensation by making use of accurate time, and further to prevention of any breakage of a file attributable to time.

Although in the above fifth embodiment the hardware-dependent circuits (see reference numerals 32 and 40) are employed to implement the mechanism for supervising in the client unit 2C the abnormality (time difference) of the RTC 11 within each client unit 2C, this is not limitative, and the above mechanism may be implemented through software-dependent processing by a trap monitor which is resident in a memory or by the patrol monitor similar to the that of the fourth embodiment described above.

In the same manner as in the fifth embodiment described above, this case also ensures an operation of a system conscious accurately of Christian calendar year, date and time, through the execution of automatic correction in case of occurrence of abnormality in Christian calendar year/date information generated by the RTC 11. In particular, this will contribute to execution of data processing and data compensation by making use of accurate time, and further to prevention of any breakage of a file attributable to time.

Figure 32:
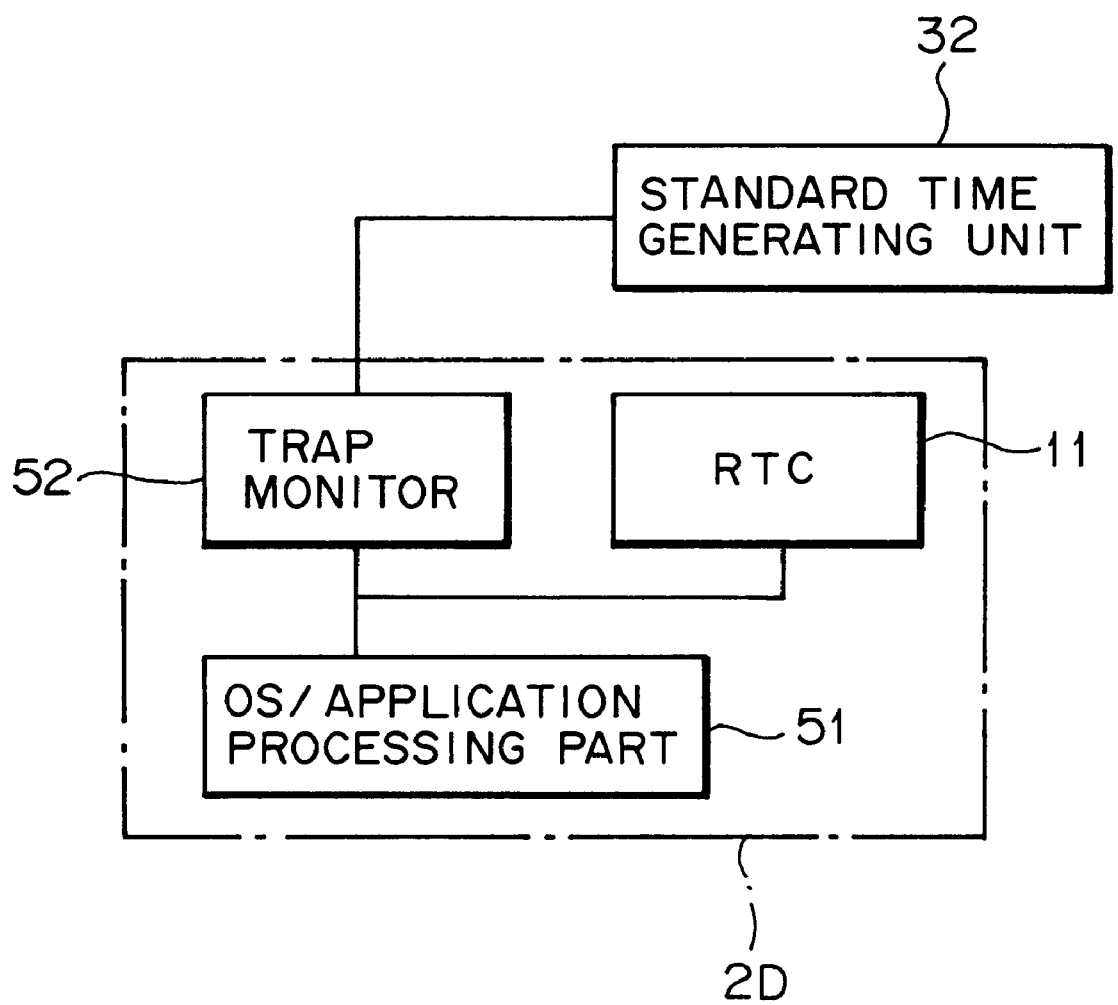
FIG. 32 is a block diagram showing a client unit serving as an information processing unit in accordance with a variant of the fifth embodiment of the present invention.

As shown in FIG. 32, for instance, the client unit 2D may be provided with an OS/application processing part 51 for ordinary data processing, as well as a trap monitor 52, by means of which the RTC 11 can have accurate time based on the standard time from the standard time generating unit 32 at the time when the RTC 11 has been accessed by the OS/application processing part 51.

Figure 33A:
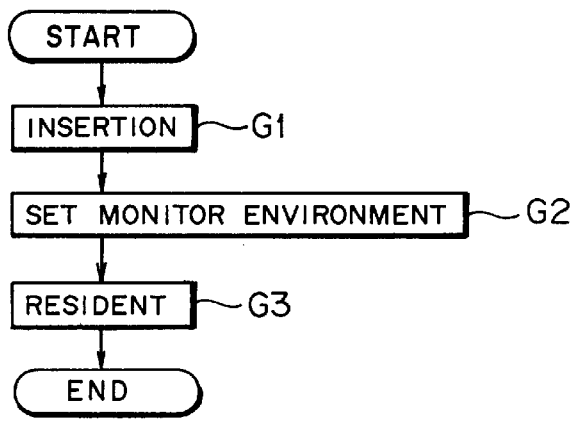
FIGS. 33(*a*) to 33(*c*) are flowcharts for explaining the operation of a client unit serving as an information processing unit in accordance with the variant of the fifth embodiment of the present invention.

Regarding the trap monitor 52, as shown in FIG. 33(a), when the standard time generating unit 32 is loaded into a card slot or the like of the client unit 2C (step G1), written to the main storage are program data for operating the trap monitor 52 stored in that standard time generating unit 32 (monitor environment setting; step G2). Such program data are intended to be resident for operation during the time when the standard time generating unit 32 remains loaded therein (step G3).

Figure 33B:
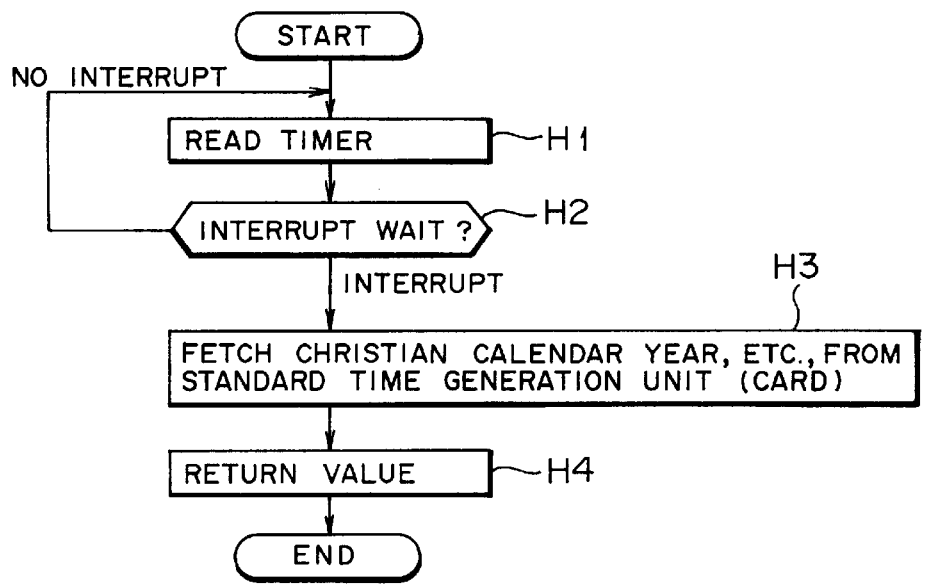

During the time when the trap monitor 52 remains resident in the main storage, as shown in FIG. 33(b), the instant that the OS/application processing part 51 has accessed the RTC 11 acting as a timer (step H1), the OS/application processing part 51 is trapped to allow an interrupt to occur (step H2), so that the RTC 11 can have accurate time based on the standard time from the standard time generating unit 32 (step H3).

Figure 33C:
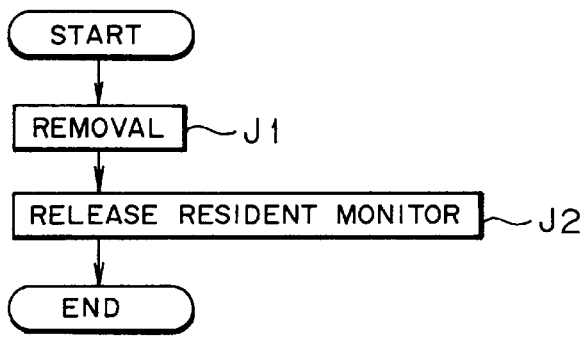

As shown in FIG. 33(c), when the above standard time generating unit 32 is removed from the card slot (step J1), the trap monitor 52 is released from the main storage (step J2).

This trap monitor 52 may generate a trap upon access to a predetermined register in response to a data read command on an I/O unit not shown, to thereby set accurate time in the RTC 11 before the return of read data. In this case, the trap monitor may be activated at certain intervals and generate the trap in response to the data read command while verifying whether the trap monitor is coupled to the system.

Figure 34:
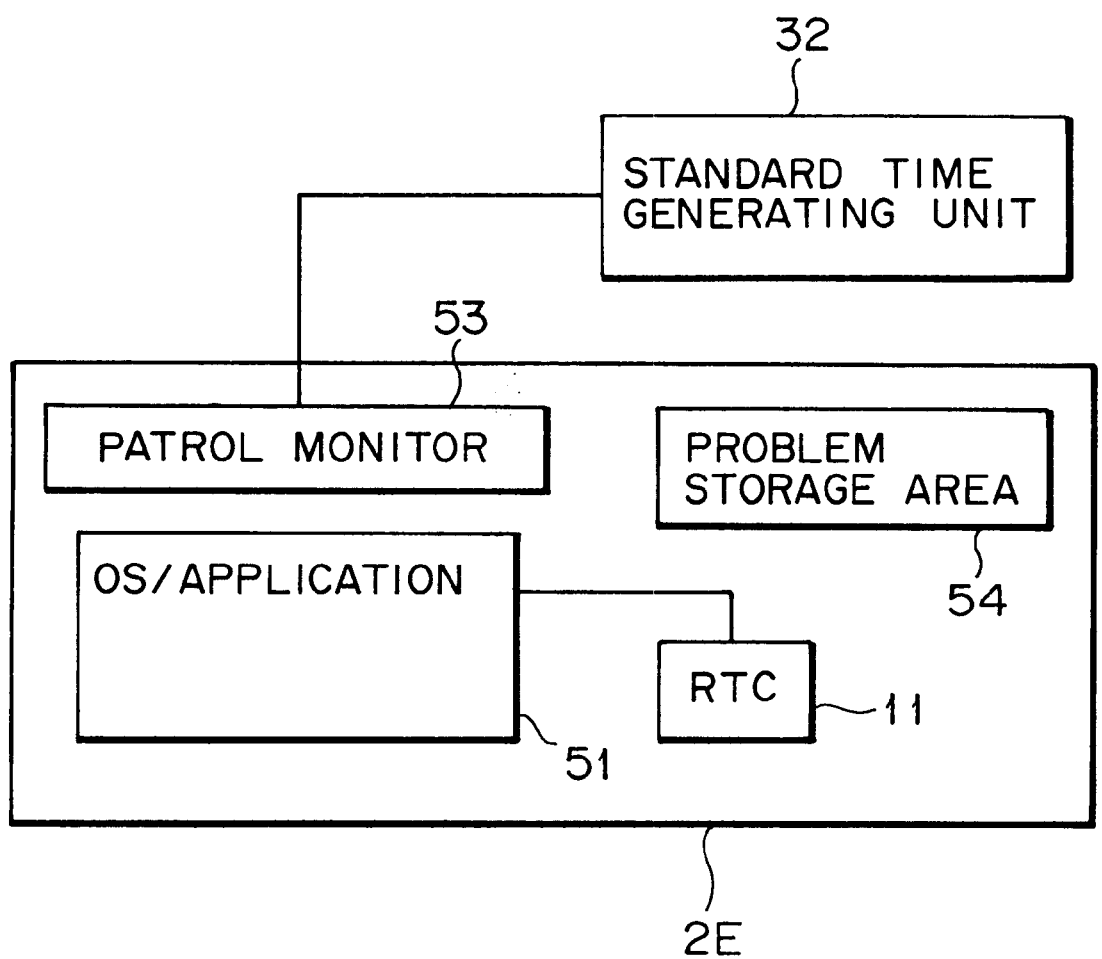
FIG. 34 is a block diagram showing a client unit serving as an information processing unit in accordance with the variant of the fifth embodiment of the present invention.

Furthermore, as shown in FIG. 34, the client unit 2E may have the function possessed by the server unit in accordance with the fourth embodiment so that abnormality (time difference) of the RTC 11 within the client unit 2E can be supervised in the client unit 2E.

To this end, the client unit 2E shown in FIG. 34 comprises, in addition to the OS/application part 51 for ordinary data processing, a patrol monitor 53 and a problem storage area 54, which patrol monitor 53 corrects on the basis of information stored in the problem storage area 54 the Christian calendar year/date information generated by the RTC 11 of the client unit 2E.

The problem storage area 54 holds in advance information on timing at which abnormality occurs in the Christian calendar year/date information generated by the RTC 11 of the client unit 2E, and information on the amount of correction for correcting the abnormality. The manner of occurrence of any abnormality in the RTC 11 can include for instance one attributable to the clock error of the RTC 11 itself or one attributable to the year 2000 problem or leap year problem, in the same manner as the fourth embodiment described above.

This makes it possible for the patrol monitor 53 to supervise the RTC 11 on the basis of information stored in the problem storage area 54 and to correct the value of the RTC 11 when the current time has reached the timing (point of time) at which any abnormality occurs, on the basis of the amount of correction for correcting the abnormality.

Figure 35:
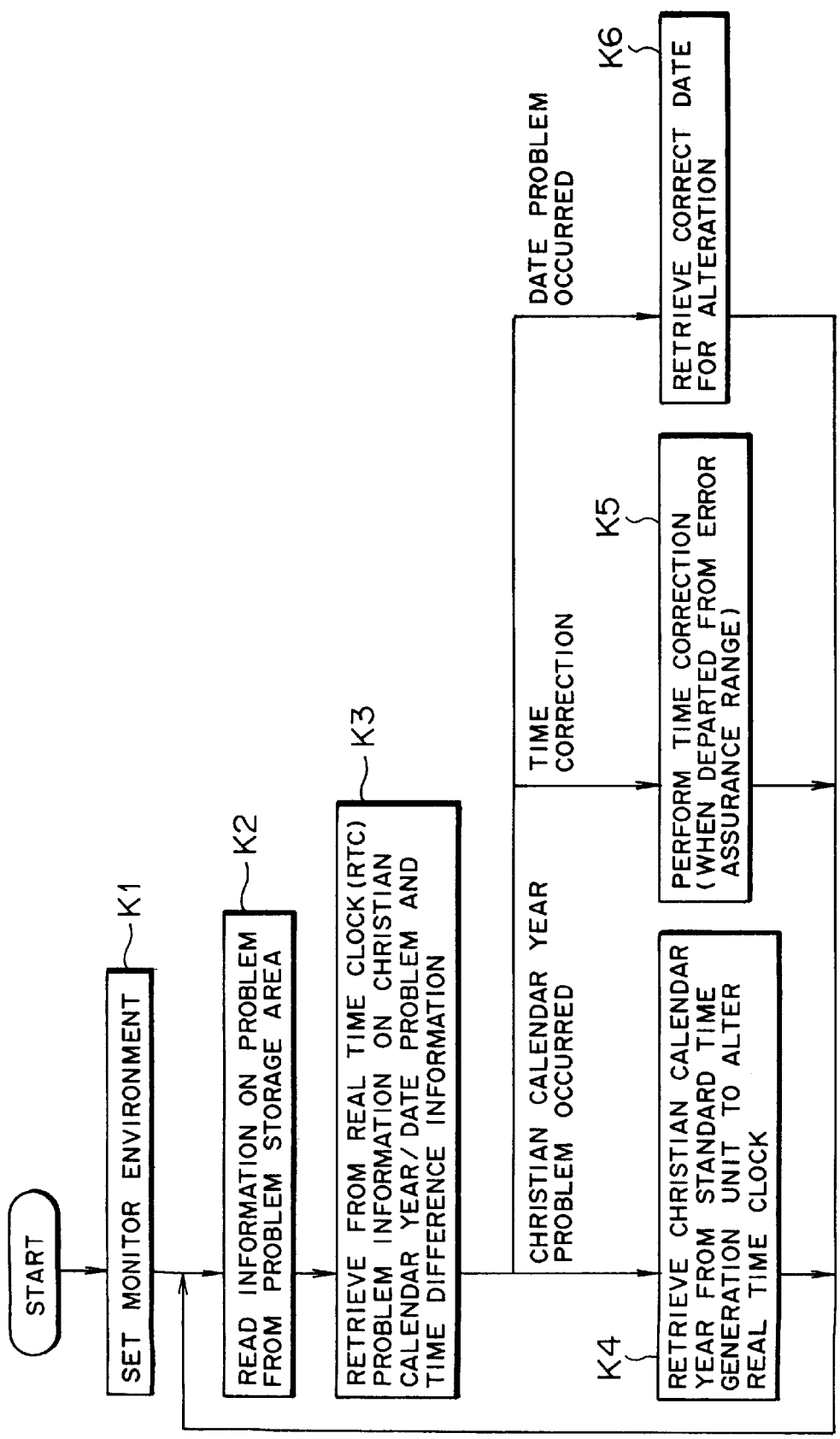
FIG. 35 is a flowchart for explaining the operation of a client unit serving as an information processing unit in accordance with the variant of the fifth embodiment of the present invention.

More specifically, as shown in FIG. 35, the patrol monitor 53 is put into operative condition through the setting of its initial environment (step K1), reads information stored in the problem storage area 54 (step K2), and fetches problematic information in compliance with the manner of abnormality of the RTC 11 the instant that a point of time has been reached at which any abnormality may occur in the time information generated by the RTC 11 itself (step K3).

In cases where the Christian calendar year/date changes from Dec. 31, 1999 to Jan. 1, 2000 for instance, the patrol monitor 53 may read information on the year 2000 stored in the problem storage area 54, to thereby render any abnormal Christian calendar year information generated by the RTC 11 normal (step K4).

Furthermore, in case there occurs any need to correct time information as a result of error compensation of the RTC 11, the patrol monitor 53 may read information stored in the problem storage area 54, to correct the time information generated by the RTC 11 (step K5).

Also, in case there occurs any abnormality in date information from the RTC 11 at the turn of the month for instance, the patrol monitor 53 may read information stored in the problem storage area 54 to render the abnormal date information from the RTC 11 normal (step K6).

(f) Others

Although in the embodiments described hereinabove the function of the present invention has been applied to a client unit in the client server system consisting of a server unit and a plurality of client units accommodated in the server unit, this is not limitative, and the server unit may be provided with the function of the client unit in the above embodiments. Alternatively, the present invention is also applicable to a single computer not constituting the client server system.

What is claimed is:

1. An information processing apparatus that executes existing application programs that treat every two-decimal-digit Christian calendar year information as 1900s, if such information to be processed is not error data, irrespective of whether a four-decimal-digit Christian calendar year information is truly 1900s, comprising:

a Christian calendar year information generating section to generate Christian calendar year information using a format of four decimal digits;

a storage section to store data files, each containing Christian calendar year information in a format of two decimal digits;

an application processing section to execute the existing application programs by using the data file and using lower two decimal digits of the Christian calendar year information generated by the Christian calendar year information generating section;

a restoration processing section in communication with the application processing section to restore the four-decimal-digit Christian calendar year information from the lower-two-decimal-digit Christian calendar year information; and a file access controlling section in communication with the storage section, the application processing section and the Christian calendar year information generating section, responsive to a request by said application processing section, to control said storage section for reading/writing of the two-decimal digit Christian calendar year Information, said file access controlling section including:

a judging section to judge whether the generated four-decimal-digit Christian calendar year information to be processed by the application processing section represents 2000s year of Christian calendar, and to judge the generated four-decimal-digit Christian calendar year information as error data if result of the judging is positive; and a Christian calendar year information outputting section to convert the generated four-decimal-digit Christian calendar year information into the lower-two-decimal-digit Christian calendar year information, and to output the converted lower-two-decimal-digit Christian calendar year information to the application processing section, said Christian calendar year information outputting section responsive to said judging section to add an interruption information signal to the converted lower-two-decimal-digit Christian calendar year information if the generated four-decimal-digit Christian calendar year information has been judged as error data by the judging section, and to output the converted lower-two-decimal-digit Christian calendar year information with the interruption information signal to the application processing section;

said application processing section, responsive to the interruption information signal, transfers the converted lower-two-decimal-digit Christian calendar year information with the interruption information signal to said restoration processing section to reconvert the converted lower-two-decimal-digit Christian calendar year information into the generated four-decimal-digit Christian calendar year information, to process the generated four-decimal-digit Christian calendar year information to represent 2000s as a correct date value to be processed by the existing application program. and to output the correct value to said application processing section.

2. An information processing apparatus according to claim 1, further comprising a memory device and wherein said Christian calendar year information outputting section includes:

a storage processing section to correlate at least upper-two-digit of the four-decimal-digit Christian calendar year information with the converted lower-two-decimal-digit Christian calendar year information and to store the at least upper-two-digit into said memory device.

3. An information processing apparatus according to claim 1, wherein said Christian calendar year information generating section further generates date information, and wherein said Christian calendar year information generating section comprises a supervisory correction section to fetch Christian calendar year/date information as reference time and on the basis of said reference time automatically corrects any abnormality in the Christian calendar year/date information generated by said Christian calendar year information generation section.

4. An information processing apparatus according to claim 3, wherein said supervisory correction section fetches reference time for each country and on the basis of said reference time for each country automatically corrects any abnormality in said Christian calendar year/date information generated by said Christian calendar year information generation section.

5. An information processing apparatus according to claim 3 wherein said supervisory correction section lies on a network.

6. An information processing apparatus having a Christian calendar year/date information generating section to generate current Christian calendar year/date information in a format of two decimal digits on the basis of an internal clock, and a processing section to access said Christian calendar year/date information generating section to fetch current Christian calendar year/date information to execute, using lower-two-decimal-digits of Christian calendar year information, existing application programs that treat every two-decimal-digit Christian calendar year information as 1900s irrespective of whether a four-decimal-digit Christian calendar year information is truly 1900s, said processing section comprising:

a standard time generating section to generate standard time in a format of four decimal digits;

a comparison circuit to compare the standard time fetched from said standard time generating section with the Christian calendar year/date information generated by said Christian calendar year/date information generating section when in said processing section there occurs an access to said Christian calendar year information generating section by an existing application program;

a correction circuit to process the Christian calendar year/date information from the Christian calendar year/date information generating section to represent 2000s as a correct two-decimal-digit date value, responsive to the comparing; and a gate circuit to set a result of the access to said Christian calendar year/date information generating section by said processing section based upon a result of the correction and to post said processing section to output the correct date value to the existing application program.

7. An information processing system comprising:

information processing apparatuses each having a memory storage section to store data files containing Christian calendar year/date information in a format of four decimal digits, an application processing section to execute, using lower-two-decimal-digits of Christian calendar year information, existing application programs that treat every two-decimal digit Christian calendar year information as 1900s, if such information to be processed is not error data, irrespective of whether a four-decimal-digit Christian calendar year information is truly 1900s, a Christian calendar year/date information generating section to generate Christian calendar year/date information in a format of two decimal digits, a restoration processing section in communication with the application processing section to restore the four-decimal digit Christian calendar year information from the lower-two-decimal-digit Christian calendar year information, and a file access controlling section responsive to a request by said application processing section to control the storage section for reading/writing of the four-decimal digit Christian calendar year information; and a reference time posting section to fetch Christian calendar year/date information in a format of four decimal digits as reference time and to generate information on the basis of the reference time to automatically process the two-decimal-digit Christian calendar year/date information generated by the Christian calendar year/date information generating section to represent 2000s as a correct date value and to post each processing section to output the correct date value to the existing application programs;

said file access controlling section of each information processing section including:

a judging section to judge whether the four-decimal digit Christian calendar year/date information, which is read from the storage section and to be processed by the application processing section, represents 2000s year of Christian calendar, and to judge the read four-decimal-digit Christian calendar year information as error data if result of the judging is positive, and a Christian calendar year/date information output section to convert the read four-decimal-digit Christian calendar year information into the lower-two-decimal-digit Christian calendar year information, and to output the lower-two-decimal-digit Christian calendar year information to said application processing section, said Christian calendar year/date information output section responsive to said judging section to add an interruption information signal to the converted lower-two-decimal-digit-Christian calendar year information if the read four-decimal-digit Christian calendar year information has been judged as error data by the judging section, and to output the converted lower-two-decimal-digit Christian calendar year information with the interruption information signal to the application processing section:

said application processing section responsive to the interruption information signal transfers the converted lower-two-decimal-digit Christian calendar year information with the interruption information signal to said restoration processing section, each restoration processing section to reconvert the converted lower-two-decimal digit Christian calendar year/date information to the read four-decimal-digit Christian calendar year/date information to process the read four-decimal digit Christian calendar year information to represent 2000s as a correct date value to be processed by the existing application programs, and to output the correct date value to the application processing section.

8. An information processing system according to claim 7, wherein said reference time based on which said reference time posting section posts each information processing section corresponds to reference time of a country where each information processing section is located.

9. An information processing system according to claim 7, wherein said reference time posting section includes an abnormality occurrence timing storage section storing previous timing information at which abnormality occurred in the Christian calendar year/date information generated by said Christian calendar year/date information generation section of each information processing apparatus; and abnormality in the Christian calendar year/date information generated by said Christian calendar year/date information generation section is automatically corrected based on said timing information.

10. A method of correcting abnormality of Christian calendar year information in an information processing apparatus upon processing existing application software that treats every two-decimal-digit Christian calendar year information as 1900s, if such information to be processed is not error data, irrespective of whether a four-decimal-digit Christian calendar year information is truly 1900s, using a data file stored in a memory in said information processing apparatus, which contains Christian calendar year information and using lower-two-decimal-digits of Christian calendar year information, said method comprising:

receiving a request during processing of the existing application software to read from the data file Christian calendar year information in a format of four decimal digits;

reading from the data file the four-decimal-digit Christian calendar year information;

judging whether the four-decimal-digit Christian calendar year information read from the data file represents 2000s year of Christian calendar and to judge the read four-decimal-digit Christian calendar year information as error data if result of the judging is positive;

converting the four-decimal-digit Christian calendar year information into a lower-two-decimal-digit Christian calendar year information;

adding interruption information signal to the converted lower-two-decimal-digit Christian calendar year information when the result of the judging is positive;

outputting the converted lower-two-decimal-digit Christian calendar year information to the application processing section;

reconverting, responsive to the interruption information signal in the converted lower-two-decimal-digit Christian calendar year information received in said application processing, the converted lower-two-decimal-digit Christian calendar year information into the four-decimal-digit Christian calendar year information read from the data file; and correcting the four-decimal-digit Christian calendar year information to represent 2000s as a correct date value to be processed by the existing application software.

11. A computer readable recording medium having a Christian calendar year abnormality correction program recorded therein, comprising a process of:

processing, using lower-two-decimal-digits of Christian calendar year information, an existing application program that treats every two-decimal-digit Christian calendar year information as 1900s irrespective of whether the two-decimal-digit Christian calendar year information truly represents 1900s;

receiving a request during processing of the existing application to read from a data file including Christian calendar year information in a format of four decimal digits;

reading from the data file the four-decimal-digit Christian calendar year information;

judging whether the four-decimal-digit Christian calendar year information read from the data file represent 2000s year of Christian calendar and to judge the read four-decimal-digit Christian calendar year information as error data if result of the judging is positive;

converting the four-decimal-digit Christian calendar year information into a lower-two-decimal-digit Christian calendar year information;

adding interruption information signal to the converted lower-two-decimal-digit Christian calendar year information when the result of the judging is positive;

outputting the converted lower-two-decimal-digit Christian calendar year information to the application processing section;

reconverting, responsive to the interruption information signal in the converted lower-two-decimal-digit Christian calendar year information received in said application processing, the converted lower-to-decimal-digit Christian calendar year information into the four-decimal-digit Christian calendar year information read from the data file; and correcting the four-decimal-digit Christian calendar year information to represent 2000s as a correct two-decimal-digit date value to be used by the existing application program.

12. A system, comprising:

a storage section to store a data file including Christian calendar year information in a format of four decimal digits;

a processing section to process, using lower-two-decimal-digits of Christian calendar year information, an application program that treats every two-decimal-digit Christian calendar year information as 1900s;

a file access section in communication with the processing section and the storage section, the file access section, responsive to a request from the processing section to read the four-decimal-digit Christian calendar year information from the data file, to read the four-decimal-digit Christian calendar year information from the data file and to determine if the read four-decimal-digit Christian calendar year information represents 2000s year of Christian calendar; and a restoration processing section in communication with the processing section, the restoration section to correct a four-decimal-digit Christian calendar year information determined to represent 2000s year of Christian calendar to represent 2000s as a correct two-decimal-digit date value, and to output the correct date value to the processing section, which provides the correct date value to the application program.

13. An information processing apparatus that executes existing application software that treats every two-decimal-digit Christian calendar year information as 1900s, if such information to be processed is not error data, irrespective of whether a four-decimal-digit Christian calendar year information is truly 19000s, comprising:

(a) a storage section to store data files, each containing Christian calendar year information in a format of four decimal digits;

(b) an application processing section to execute the existing application software by using the data files and using lower two decimal digits of the Christian calendar year information in the data files;

(c) a restoration processing section operatively connected with said application processing section, to restore the four-decimal digit Christian calendar year information from the lower-two-decimal-digit Christian calendar year information; and (d) a file access controlling section, responsive to a request by said application processing section, to control said storage section for reading/writing of the four-decimal digit Christian calendar year information; said file access controlling section including, (d-I) a judgment section to discriminate whether the four-decimal-digit Christian calendar year information, which is read from said storage section and to be processed by the application processing section, represents 2000s year of Christian calendar, and to judge the read four-decimal-digit Christian calendar year information as error data if result of the discrimination is positive, and (d-II) a Christian calendar year information outputting section to convert the read four-decimal-digit Christian calendar year information, into the lower-two-decimal-digit Christian calendar year information and to output the lower-two-decimal-digit Christian calendar year information to said application processing section, said Christian calendar year information outputting section being responsive to said judgment section to add an interruption information signal to the lower-two-decimal-digit Christian calendar year information if said read four decimal digit Christian calendar year information has been judged as error data by said judgment section, and to output said lower-two-decimal-digit Christian calendar information, which has been converted from such error-data-four-decimal-digit Christian calendar year information, along with said interruption information signal, to said application processing section;

said application processing section responsive to said interruption information signal transferring said lower-two-decimal-digit Christian calendar year information with the interruption information signal to said restoration processing section, said restoration processing section to reconvert the converted lower-two-decimal-digit Christian calendar information into the four-decimal-digit Christian calendar year information read from the storage section, to process the read four-decimal digit Christian calendar year information to represent 2000s as a correct date value to be processed by the existing application software, and to output the correct date value to said application processing section.

14. An information processing apparatus according to claim 13, further comprising (e) a memory device and wherein said Christian calendar year information outputting section includes:

(d-II-i) a storage processing section to correlate at least upper-two-digit of the four-decimal-digit Christian calendar year information with the converted lower-two-decimal-digit Christian calendar year information, and to store the at least upper-two-digit into said memory device.

* * * * *

UNITED STATES PATENT AND TRADEMARK OFFICE
CERTIFICATE OF CORRECTION

PATENT NO.   : 6,446,067 B2
DATED        : September 3, 2002
INVENTOR(S)  : Yoshifusa Togawa It is certified that error appears in the above-identified patent and that said Letters Patent is hereby corrected as shown below:

<u>Column 41,</u>
Line 12, change "Information" to -- information --.

<u>Column 45,</u>
Line 21, change "to" to -- two --; and
Line 60, change "19000s" to -- 1900s --.

Signed and Sealed this

Eighth Day of April, 2003

JAMES E. ROGAN
*Director of the United States Patent and Trademark Office*